(12) United States Patent
Watt

(10) Patent No.: US 7,613,773 B2
(45) Date of Patent: Nov. 3, 2009

(54) ASYNCHRONOUS NETWORK AUDIO/VISUAL COLLABORATION SYSTEM

(75) Inventor: James H. Watt, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 769 days.

(21) Appl. No.: 10/750,605

(22) Filed: Dec. 31, 2003

(65) Prior Publication Data

US 2004/0221323 A1 Nov. 4, 2004

Related U.S. Application Data

(60) Provisional application No. 60/437,256, filed on Dec. 31, 2002.

(51) Int. Cl.
*G06F 15/16* (2006.01)
(52) U.S. Cl. .................. 709/205; 709/206; 709/207
(58) Field of Classification Search .................. 709/203, 709/231, 236, 245, 246, 248, 206, 207, 205; 707/7, 204
See application file for complete search history.

(56) References Cited

U.S. PATENT DOCUMENTS

| | | | | |
|---|---|---|---|---|
| 4,827,462 A | * | 5/1989 | Flannagan et al. | 369/30.09 |
| 5,619,257 A | * | 4/1997 | Reele et al. | 348/64 |
| 5,812,773 A | * | 9/1998 | Norin | 709/204 |
| 5,822,527 A | * | 10/1998 | Post | 709/206 |
| 5,915,091 A | | 6/1999 | Ludwig et al. | |
| 5,948,057 A | * | 9/1999 | Berger et al. | 709/205 |
| 6,003,030 A | * | 12/1999 | Kenner et al. | 707/10 |
| 6,006,227 A | * | 12/1999 | Freeman et al. | 707/7 |
| 6,072,942 A | * | 6/2000 | Stockwell et al. | 709/206 |
| 6,105,055 A | | 8/2000 | Pizano et al. | |
| 6,167,402 A | * | 12/2000 | Yeager | 707/10 |
| 6,237,025 B1 | | 5/2001 | Ludwig et al. | |
| 6,298,356 B1 | | 10/2001 | Jawahar et al. | |
| 6,301,608 B1 | * | 10/2001 | Rochkind | 709/206 |
| 6,304,898 B1 | | 10/2001 | Shiigi | |
| 6,317,777 B1 | | 11/2001 | Skarbo et al. | |
| 6,324,569 B1 | * | 11/2001 | Ogilvie et al. | 709/206 |

(Continued)

OTHER PUBLICATIONS

Cleo Sgouropoulou, Anastasios Koutoumanos, Peter Goodyear, Emmanuel Skordalakis, Acquiring Working Knowledge through Asynchronous Multimedia Conferencing , Educational Technology & Society 3(3) 2000. ISSN 1436-4522, pp. 105-111.

(Continued)

*Primary Examiner*—Michael Won
(74) *Attorney, Agent, or Firm*—RatnerPrestia

(57) ABSTRACT

A method and a system for synchronizing audio/video messages and message-related information stored in a workstation with audio/video messages and message-related information stored in a server. A copy of the message-related information stored in the workstation is transferred to the server. The workstation identifies workstation messages that have not been transferred from the workstation to the server. A copy of the identified messages are transferred to the server. The server identifies messages in the server that have not been transferred to the workstation. The server transfers to the workstation the messages identified by the server. The server merges the message-related information transferred to it by the workstation and transfers a copy of the merged message-related information to the workstation.

17 Claims, 43 Drawing Sheets

U.S. PATENT DOCUMENTS

| | | | |
|---|---|---|---|
| 6,324,654 B1* | 11/2001 | Wahl et al. | 714/6 |
| 6,330,589 B1 | 12/2001 | Kennedy | |
| 6,332,154 B2* | 12/2001 | Beck et al. | 709/204 |
| 6,411,605 B1 | 6/2002 | Vance et al. | |
| 6,453,337 B2 | 9/2002 | Miller et al. | |
| 6,463,461 B1 | 10/2002 | Hanson et al. | |
| 6,484,156 B1 | 11/2002 | Gupta et al. | |
| 6,484,196 B1 | 11/2002 | Maurille | |
| 6,490,614 B1 | 12/2002 | Shaffer et al. | |
| 6,496,849 B1 | 12/2002 | Hanson et al. | |
| 6,505,233 B1 | 1/2003 | Hanson et al. | |
| 6,507,865 B1 | 1/2003 | Hanson et al. | |
| 6,523,063 B1 | 2/2003 | Miller et al. | |
| 6,535,909 B1 | 3/2003 | Rust | |
| 6,578,201 B1 | 6/2003 | LaRocca et al. | |
| 6,583,806 B2 | 6/2003 | Ludwig et al. | |
| 6,598,074 B1 | 7/2003 | Moller et al. | |
| 6,636,889 B1 | 10/2003 | Estrada et al. | |
| 6,640,241 B1 | 10/2003 | Ozzie et al. | |
| 6,662,198 B2* | 12/2003 | Satyanarayanan et al. | 707/204 |
| 6,732,125 B1* | 5/2004 | Autrey et al. | 707/204 |
| 6,732,152 B2* | 5/2004 | Lockhart et al. | 709/206 |
| 6,738,800 B1* | 5/2004 | Aquilon et al. | 709/206 |
| 6,748,403 B1* | 6/2004 | Lemke | 707/202 |
| 6,879,996 B1* | 4/2005 | Laves | 709/206 |
| 6,959,310 B2* | 10/2005 | Eshel et al. | 707/200 |
| 6,981,023 B1* | 12/2005 | Hamilton et al. | 709/206 |
| 7,047,256 B2* | 5/2006 | Miki et al. | 707/200 |
| 7,085,785 B2* | 8/2006 | Sawdon et al. | 707/204 |
| 2002/0065912 A1* | 5/2002 | Catchpole et al. | 709/224 |
| 2002/0112134 A1* | 8/2002 | Ohran et al. | 711/162 |
| 2003/0037335 A1* | 2/2003 | Gatto et al. | 725/86 |
| 2004/0098456 A1* | 5/2004 | Krzyzanowski et al. | 709/204 |
| 2004/0205214 A1* | 10/2004 | Bång et al. | 709/231 |

OTHER PUBLICATIONS

IBM Content Manager CommonStore for Lotus Domino, Version 8; IBM Corporation, 2002 Silicon Valley Laboratory, 4 pages.

IBM DB2 Content Manager for Multiplatforms V8.2 and DB2 Information Integrator for Content V8.2 Support On-Demand Access to Critical Business Information IBM Offering Information pp. 2-32 corrected Jun. 9, 2003.

IBM Content Manager VideoCharger, Version 8 IBM Corporation, 2002 Silicon Valley Laboratory.

IBM DB2 Content Manager VideoCharger; IBM Web site Dec. 8, 2003 www- 306.ibmdotcom/software/data/videocharger Product Overview, IBM Software.

* cited by examiner

| Day | Local Time | | | | Person Posting Message | Message Number | Message Content |
|---|---|---|---|---|---|---|---|
| | Person A-NY | Person B-LA | Person C-London | Person D-Tokyo | | | |
| 1 | 9:00:00 AM | 6:00:00 AM | 2:00:00 PM | 11:00:00 PM | A | 1 | Suggestion for color |
| 1 | 9:10:00 AM | 6:10:00 AM | 2:10:00 PM | 11:10:00 PM | D | 2 | Responds with alternative suggestion |
| 1 | 1:00:00 PM | 10:00:00 AM | 6:00:00 PM | 3:00:00 AM | B | 3 | Replies to both Message 1 and 2 and asks Person C's opinion |
| 2 | 6:00:00 AM | 3:00:00 AM | 11:00:00 AM | 8:00:00 PM | C | 4 | Replies to Message 3 with opinion |
| 2 | 6:30:00 AM | 3:30:00 AM | 11:30:00 AM | 8:30:00 PM | D | 5 | Raises new problem with dimensions |
| 2 | 7:15:00 AM | 4:15:00 AM | 12:15:00 PM | 9:15:00 PM | C | 6 | Suggests two possible solutions to Message 5 problem |
| 2 | 9:20:00 AM | 6:20:00 AM | 2:20:00 PM | 11:20:00 PM | A | 7 | Replies to Message 4 with another color option |
| 2 | 9:25:00 AM | 6:25:00 AM | 2:25:00 PM | 11:25:00 PM | A | 8 | Replies to Message 6 with cost of dimensional change |
| 3 | 2:00:00 PM | 11:00:00 AM | 7:00:00 PM | 4:00:00 AM | C | 9 | Has been traveling and prepared response to Message 7 on plane. Logs on now and posts it. |
| 3 | 3:00:00 PM | 12:00:00 PM | 8:00:00 PM | 5:00:00 AM | A | 10 | Responds to Message 8 |

FIG. 1

| Field | Contents |
|---|---|
| 110 AIDFileName | Unique AID file name containing userID and time/date information |
| 112 Description | Text field entered by discussion participant when creating the comment contained in the AID file named above. This field is used by the TIC Workstation software to search for specific topics to play back. |
| 114 LastPlaybackDate | This field records the date/time that the discussion participant last played the AID file. It is used to identify new, unviewed content. |
| 116 Authorization | A security and access code field that defines the rights of the discussion participant to manipulate the AID file named (e.g. to delete or archive the file). |
| 118 ParentItem | This field contains the ID of the logical parent of this entry. This field can be used to organize the discussion in a differing logical order, e.g. by topic or participant. |
| 120 ChildItem | This field contains the ID of the logical parent of this entry. This field can be used to organize the discussion in a differing logical order, e.g. by topic or participant. |
| 122 LeftSiblingItem | This field contains the ID of the logical sibling preceding this entry. If the discussion is organized in pseudo-chronological form, this is the DSOB item immediately preceding this item in the chronology. |
| 124 RightSiblingItem | This field contains the ID of the logical sibling following this entry. If the discussion is organized in pseudo-chronological form, this is the DSOB item immediately following this item in the chronology. |
| 126 Status | This is an internal field used by the TIC Server to identify the state of this item, e.g. archived or active. |

FIG. 5

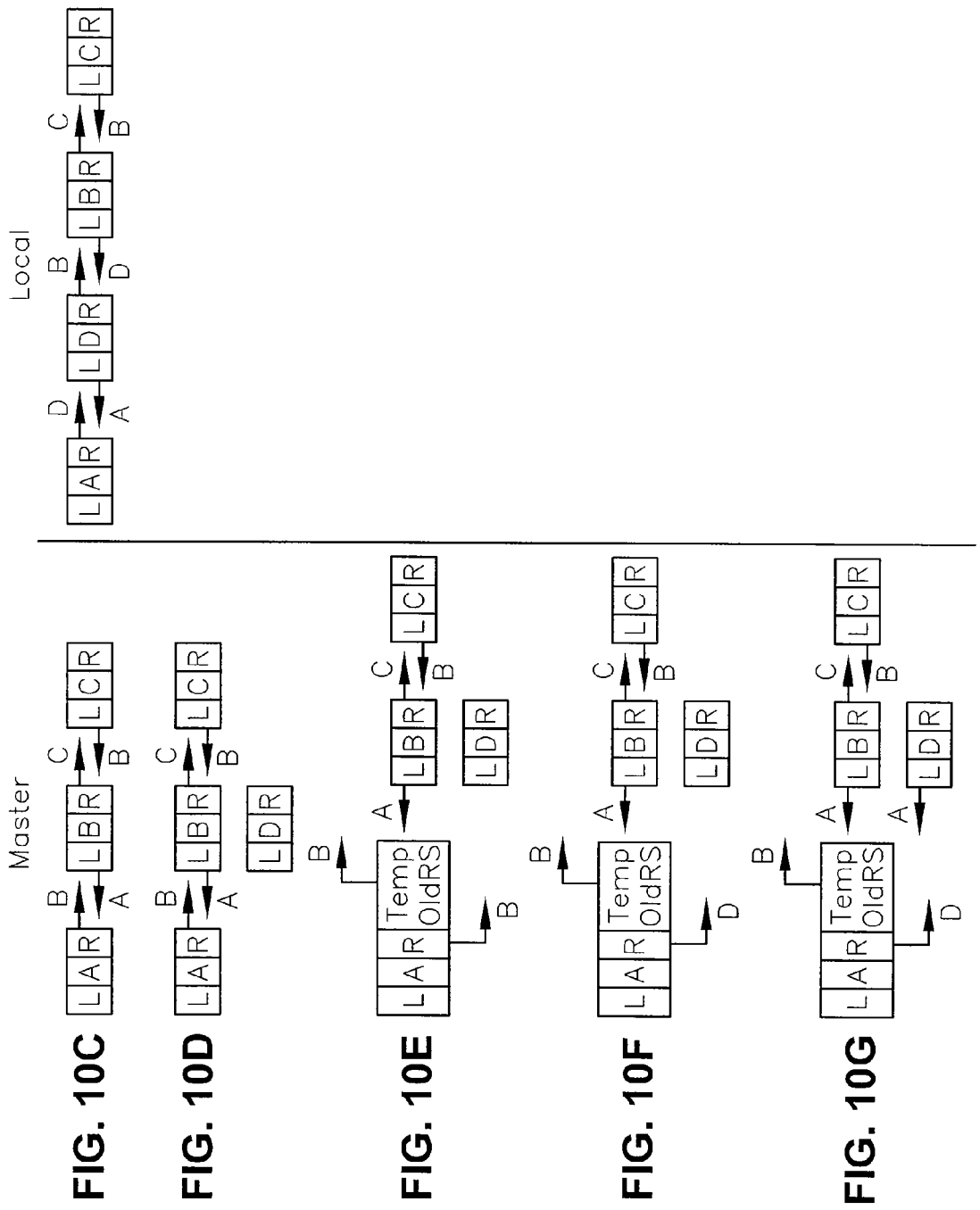

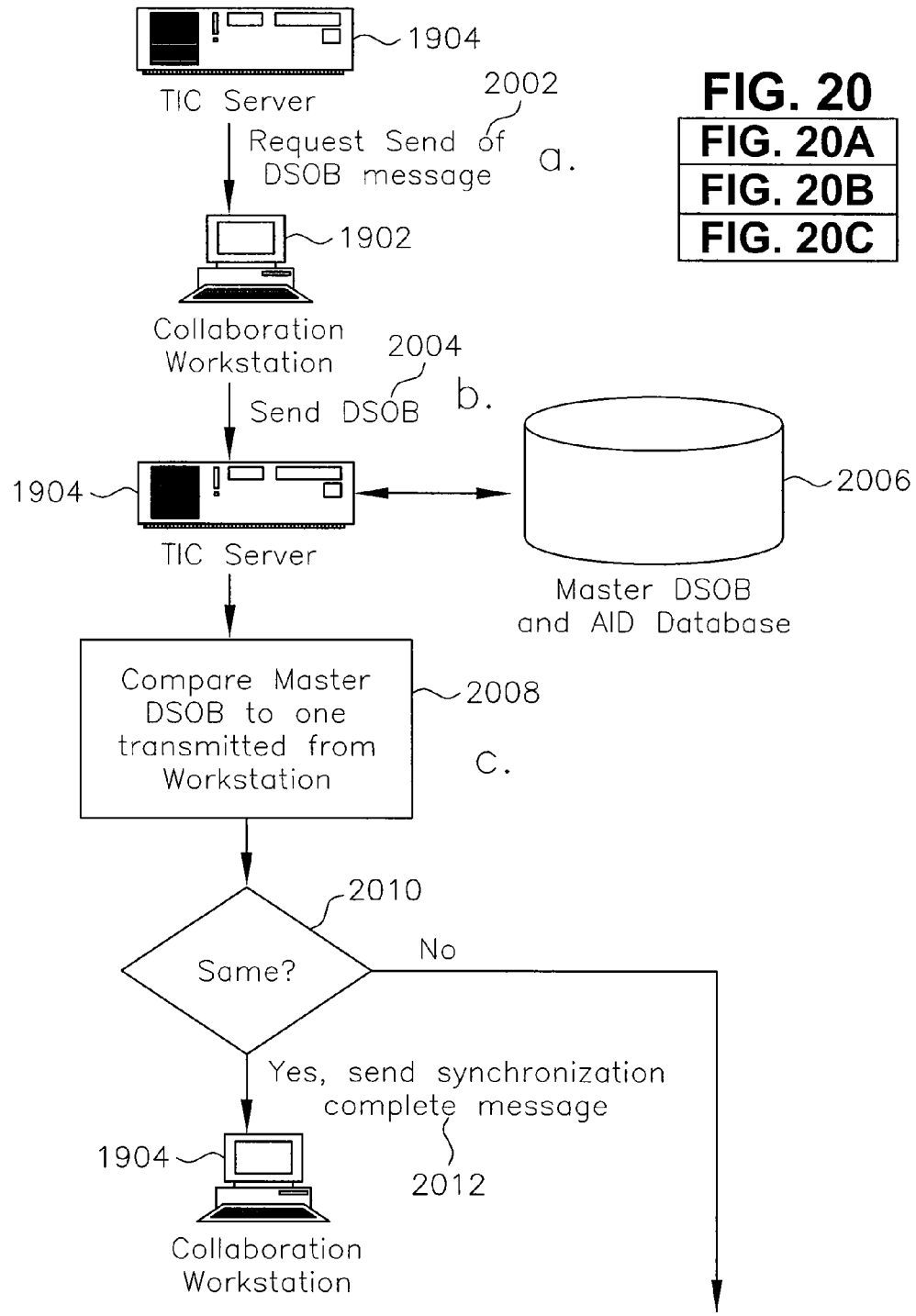

DSOB Entries a. After first posting from Allison 2100

| Field | Contents |
|---|---|
| AIDFileName | PersonA2003-05-01-9-00-00 |
| Description | Hello from Allison |
| LastPlaybackDate | (different for each workstation) |
| Authorization | LD |
| ParentItem | (null) |
| ChildItem | (null) |
| LeftSiblingItem | (null) |
| RightSiblingItem | (null) |
| Status | Archived |

FIG. 21A b. After second posting from Dave 2110

| Field | Contents |
|---|---|
| AIDFileName | PersonA2003-05-01-9-00-00 |
| Description | Hello from Allison |
| LastPlaybackDate | (different for each workstation) |
| Authorization | LD |
| ParentItem | (null) |
| Child Item | (null) |
| LeftSiblingItem | (null) |
| RightSiblingItem | PersonD2003-05-01-11-10-00 |
| Status | Archived |

2120

| Field | Contents |
|---|---|
| AIDFileName | PersonD2003-05-01-11-10-00 |
| Description | Denver Dave says hi, too |
| LastPlaybackDate | (different for each workstation) |
| Authorization | LD |
| ParentItem | (null) |
| ChildItem | (null) |
| LeftSiblingItem | PersonA2003-05-01-9-00-00 |
| RightSiblingItem | (null) |
| Status | Archived |

FIG. 21B c. After third posting from Cynthia    2130

| Field | Contents |
|---|---|
| AIDFileName | PersonA2003-05-01-9-00-00 |
| Description | Hello from Allison |
| LastPlaybackDate | (different for each workstation) |
| Authorization | LD |
| ParentItem | (null) |
| ChildItem | (null) |
| LeftSiblingItem | (null) |
| RightSiblingItem | PersonC2003-05-01-10-00-00 |
| Status | Archived |

2140

| Field | Contents |
|---|---|
| AIDFileName | PersonD2003-05-01-11-10-00 |
| Description | Denver Dave says hi, too |
| LastPlaybackDate | (different for each workstation) |
| Authorization | LD |
| ParentItem | (null) |
| ChildItem | (null) |
| LeftSiblingItem | PersonC2003-05-01-10-00-00 |
| RightSiblingItem | (null) |
| Status | Archived |

2150

| Field | Contents |
|---|---|
| AIDFileName | PersonC2003-05-01-10-00-00 |
| Description | Are you Allison from Marketing? |
| LastPlaybackDate | (different for each workstation) |
| Authorization | LD |
| ParentItem | (null) |
| ChildItem | (null) |
| LeftSiblingItem | PersonA2003-05-01-9-00-00 |
| RightSiblingItem | PersonD2003-05-01-11-10-00 |
| Status | Archived |

FIG. 21C d. After fourth posting from Bill  
(Bill's local DSOB only)

| Field | Contents |
|---|---|
| AIDFileName | PersonA2003-05-01-9-00-00 |
| Description | Hello from Allison |
| LastPlaybackDate | (different for each workstation) |
| Authorization | LD |
| ParentItem | (null) |
| ChildItem | (null) |
| LeftSiblingItem | (null) |
| RightSiblingItem | PersonC2003-05-01-10-00-00 |
| Status | Archived |

2170

| Field | Contents |
|---|---|
| AIDFileName | PersonD2003-05-01-11-10-00 |
| Description | Denver Dave says hi, too |
| LastPlaybackDate | (different for each workstation) |
| Authorization | LD |
| ParentItem | (null) |
| ChildItem | (null) |
| LeftSiblingItem | PersonB2003-05-02-08-30-00 |
| RightSiblingItem | (null) |
| Status | Archived |

2180

| Field | Contents |
|---|---|
| AIDFileName | PersonC2003-05-01-10-00-00 |
| Description | Are you Allison from Marketing? |
| LastPlaybackDate | (different for each workstation) |
| Authorization | LD |
| Parent Item | (null) |
| Child Item | (null) |
| LeftSiblingItem | PersonA2003-05-01-9-00-00 |
| RightSiblingItem | PersonB2003-05-02-08-30-00 |
| Status | Archived |

FIG. 21D'

| Field | Contents |
|---|---|
| AIDFileName | PersonB2003-05-02-08-30-00 |
| Description | That Allison was downsized |
| LastPlaybackDate | (different for each workstation) |
| Authorization | LD |
| Parent Item | (null) |
| Child Item | (null) |
| LeftSiblingItem | PersonC2003-05-01-10-00-00 |
| RightSiblingItem | PersonD2003-05-01-11-10-00 |
| Status | Archived |

FIG. 21D"

e. After fifth posting from
Allison (Master DSOB)

| Field | Contents |
|---|---|
| AIDFileName | PersonA2003-05-01-9-00-00 |
| Description | Hello from Allison |
| LastPlaybackDate | (different for each workstation) |
| Authorization | LD |
| ParentItem | (null) |
| ChildItem | (null) |
| LeftSiblingItem | (null) |
| RightSiblingItem | PersonC2003-05-01-10-00-00 |
| Status | Archived |

2210

| Field | Contents |
|---|---|
| AIDFileName | PersonD2003-05-01-11-10-00 |
| Description | Denver Dave says hi, too |
| LastPlaybackDate | (different for each workstation) |
| Authorization | LD |
| ParentItem | (null) |
| ChildItem | (null) |
| LeftSiblingItem | PersonB2003-05-02-08-30-00 |
| RightSiblingItem | PersonA2003-05-01-9-00-00 |
| Status | Archived |

2220

| Field | Contents |
|---|---|
| AIDFileName | PersonC2003-05-01-10-00-00 |
| Description | Are you Allison from Marketing? |
| LastPlaybackDate | (different for each workstation) |
| Authorization | LD |
| ParentItem | (null) |
| ChildItem | (null) |
| LeftSiblingItem | PersonA2003-05-01-9-00-00 |
| RightSiblingItem | PersonB2003-05-02-08-30-00 |
| Status | Archived |

FIG. 21E'

| Field | Contents |
|---|---|
| AIDFileName | PersonB2003-05-02-08-30-00 |
| Description | That Allison was downsized |
| LastPlaybackDate | (different for each workstation) |
| Authorization | LD |
| ParentItem | (null) |
| ChildItem | (null) |
| LeftSiblingItem | PersonC2003-05-01-10-00-00 |
| RightSiblingItem | PersonD2003-05-01-11-10-00 |
| Status | Archived |

2230

| Field | Contents |
|---|---|
| AIDFileName | PersonA2003-05-02-09-20-00 |
| Description | Let's get started with Zebra |
| LastPlaybackDate | (different for each workstation) |
| Authorization | LD |
| ParentItem | (null) |
| ChildItem | (null) |
| LeftSiblingItem | PersonD2003-05-01-11-10-00 |
| RightSiblingItem | (null) |
| Status | Archived |

ASYNCHRONOUS NETWORK AUDIO/VISUAL COLLABORATION SYSTEM

CROSS-REFERENCE TO RELATED APPLICATION

This application claims the benefit of priority to U.S. Provisional Patent Application Ser. No. 60/437,256, filed on Dec. 31, 2002, the contents of which are incorporated in this application by reference.

COPYRIGHT NOTICE

A portion of the disclosure of this patent document contains material which is subject to copyright protection, specifically it is taken from Watt, J., Walther, J. & Nowak, K., "Asynchronous Videoconferencing: A Hybrid Communication Prototype," *Proceedings of the 35th Annual Hawaii International Conference on System Sciences*(© 2002 by The Institute of Electrical and Electronics Engineers, Inc.). The copyright owner has no objection to the facsimile reproduction by anyone of the patent document or the patent disclosure, as it appears in the U.S. Patent and Trademark Office files or records, but otherwise reserves all copyright rights whatsoever.

FIELD OF THE INVENTION

The present invention relates generally to communication networks, and more particularly to a system and method for asynchronous group collaboration using network distributed audio/video (A/V) communications.

BACKGROUND OF THE INVENTION

A. Introduction

As digitally based communication technologies have developed over the last several decades, users, designers, and analysts have contended with and considered the trade-offs between two primary communication attributes: multi-channel, multi-cue communication versus asynchronous, store-and-forward, indexed conversation threads. As the technologies continue to develop, the question of which medium to select for a particular interaction has become more complex and more important. Further, the design of the interface in terms of which features ought to be included for what type of interaction has become an increasingly important decision for designers of systems.

Traditional face-to-face communication, and its close cousin videoconferencing, which offers synchronous audio and visual information, offers advantages in comprehension and mutuality that no asynchronous communication system has yet to match. On the other hand, asynchronous communication offers convenience, storage and retrieval for review, and ways to focus and re-arrange message segments across time zones and distributed locations that have revolutionized distributed work. Further, these asynchronous systems take better advantage of the packet switching protocols of the Internet. Unfortunately, although these two attributes—full cues and asynchronous messaging—are not in principle exclusive to one another, technological development has, up until the present, been unable to merge them.

B. Benefits of Asynchronous Communication

With the diffusion of the ARPANet and Internet, scientists and citizens have adopted electronic mail at exponential rates. One of e-mail's chief attractions leading to its adoption is its affordance of the ability to send messages to others when one wishes with little time lag for those messages to be available, yet for the recipients to be able to access those messages at their own discretion. Obviously superior to postal mail or courier in terms of delivery time, the store-and-forward capacity of asynchronous communication facilitates the ability to disperse partnerships across space (since people need not be physically co-located in order to communicate) and across time (since people need not attend to communication simultaneously). This store-and-forward characteristic not only allows members to attend to information at times during which they can turn their attention to group problems, but liberates message senders from having to wait until group members can be gathered or summoned telephonically, preventing "production blocking" (the tendency to hold back or forget information while waiting for a live speaking turn from occurring). These are limitations of asynchronous interactions which must be contrasted with potential loss of the sense of a connection with another in real time.

Clearly the store-and-forward capability has contributed to the ability of groups and organizations to disperse their members geographically, even across multiple time zones. In terms of the quality of group interaction, communication channels allow groups to re-entrain themselves. Groups can overcome the problems associated with competing demands for attention and time, that face-to-face meetings often portend, by writing and responding conveniently.

Concurrent with these benefits are certain "second-level" attributes (i.e., social phenomena enabled by the technology aside from it was designed to do). For instance, communicators are able to consider their messages carefully as they compose them since they are not bound by the time pressure that the norms of face-to-face encounters demand. Moreover, when Usenet-like systems or deliberately designed group conferencing or bulleting board systems are employed, individuals who join a group after its beginnings can review previous comments and catch up to the rest of the group. Further, Usenet and asynchronous computer conferencing structure and arrange the connectedness and display of messages according to several schemes, which may include by person, by date, and/or by topic. Such indexing allows users to focus their messaging and their message retrieval activities according to orders and characteristics more related to the reader's desires than simply taking all comments chronologically and equally.

Although numerous benefits deriving from asynchronous electronic interaction are posited, some concerns have been raised about asynchrony's disruption of communication. Questions have been raised challenging text-based electronic communication's ability to foster conversational coherence, i.e. the ability of users to make sense of conversation that would normally be interpretable through adjacency of utterances and recursive references; this seems especially unlikely in asynchronous messaging. These concerns seem to ignore findings, however, about users' abilities to achieve interactivity despite time lags and system designers' efforts to replace conversational characteristics with pointers and quoting devices. By indexing message threads and referencing messages to one another, users are able to make sense of context and continuity of discussions regardless of their dispersion over time. The question is whether or not technology can provide features to facilitate interpersonal or task-based interactions that would overcome any limitations resulting from the asynchronous nature of the interactions.

C. Benefits Of Multiple Cues

Despite these advantages of asynchronous interaction, most asynchronous systems have involved text-based messaging only, demanding that users expend extra effort in order to achieve common understanding and develop perceptions of partners without the nonverbal communication and physical appearance cues that face-to-face communication provides. Several theories have suggested that communication systems with diminished nonverbal cues may be inadequate for complex or interpersonally involving tasks, most notably social presence theory, the social context cues hypothesis, and media richness theory. These theories argue that expedient comprehension or interpretive social contexts depend on the transmission of multiple communication cues. These theories have been shown to be limited in their predictive validity as far as users' capabilities for performance and interpersonal relations are concerned. Nevertheless, there is robust evidence that users prefer multimedia or full-cue communication despite its questionable necessity.

One approach to users' preference for full-channel communication takes a communication efficiency framework. Although limited-bandwidth communication may theoretically perform all functions that face-to-face interaction provides, full-channel communication does so with less cognitive and behavioral effort, in less time, than text-based systems. Previous theorizing about the relationship of verbal and nonverbal cue systems suggests that human multi-channel communication allows for complementary simultaneous signals to be processed. That is, human evolution has yielded our capability to transmit substantive and affective information simultaneously through the complementary channels of verbal and nonverbal communication, with little conscious effort, as we have done in face-to-face interactions.

This would not be the case if nonverbal communication was redundant to verbally transmitted information. But the relationship of nonverbal behavior is often complementary, rather than redundant, with nonverbal behavior adding qualification, uncertainty, or contradiction to the verbal substance. When verbal and nonverbal indicators contradict one another, people have been shown to prioritize the nonverbal. Processing both messages is possible in a unitary-symbol system such as text-based communication, but in that mode the transmission of complementary levels of information must be accomplished by conscious and relatively greater efforts to translate these multiple signals into the semiotics of the unitary channel. Thus, full-channel communication represents a less effortful and more highly efficient system for the conveyance of complex information, such as a topic involving both substantive and affective/attitudinal issues. When a topic's complexity is great, it may require additional cognitive demands for deliberation.

Further, if communication involving multiple simultaneous cues is less effortful, it should allow partners to reserve more effort to their information processing task and less to their intentional communication behavior. Although this perspective may seem to present an overly complex rationale for the advantage of face-to-face and video-based communication, it is relatively unique in its recognition of single-cue systems' capacity to afford complex information processing compared to multi-cue systems' greater efficiency and less effort to do so. From a cognitive perspective, the implication that the expenditure of less communicative effort frees partners' cognitive resources for substantive information processing predicts greater satisfaction and more successful deliberative outcomes.

In addition to the intersubjective information processing efficiency advantages that multi-cue communication provides, video-based communication provides potential advantages that non-visual communication cannot, even if ideas are effortfully translated into language. As some have argued, the functions of visual information in communication episodes transcend information emanating from the communication partners themselves. Video provides a shared workspace, allowing communicators to sense environmental cues that contextualize and therefore add meaning to the references they bring up through speech and action. Video furthermore allows for the observation of specific artifacts, which may be the target of discussion and deliberation. This may further contextualize discussion, or allow users to adapt their language to even more efficient referential, rather than descriptive, speech (i.e., referring to an object all can see as "that" or by mentioning its attribute, rather that repetitively describing what it is in order to focus attention). In many cases video may be more useful than even unmediated face-to-face communication; for example, when a discussion is focused on a "common virtual object" rather than on the users themselves. Videoconferencing thus provides particular communicative advantages to geographically or temporally dispersed groups that text-based communication cannot, at least under some circumstances.

At the same time as a good case can be made for the benefits of multi-modal, full-channel communication, empirical research has yielded mixed results from the use of synchronous, or real-time, videoconferencing. For example, although some researchers have found no differences in interpersonal trust between videoconferencing and face-to-face communication, others have found that real-time videoconferencing overloaded the cognitive processing of team partners performing a complex task, and biased their perceptions of one another, compared to those groups using a text-based conferencing system. Others have similarly found that a low-grade, synchronous video system provided better support than a high-grade videoconferencing parallel; subjects rated that poor-quality video system more favorably than the comparable high-quality system, and they completed their task more quickly using the inferior system, effects which the researchers attribute to the distraction factor that full-quality video provided in distracting from the task at hand.

"Video-mail" has recently seen some experimentation and is even becoming widely available with inexpensive desktop cameras and software that creates audio/video captures and appends them to e-mail. But this technology has been applied only in point-to-point systems.

D. Systems and Methods to Manage Communications

Various systems and methods to manage communications have been developed. Some of these systems and methods are summarized as follows.

U.S. Pat. No. 5,915,091 issued to Ludwig et al. discloses a multimedia collaboration system that integrates separate real-time and asynchronous networks. The real-time network is for real-time audio and video. The asynchronous networks are for control signals and textual, graphical, and other data. The system allows for transferring an entire A/V file from the storage server to the client workstation, caching it on the workstation's disk, and playing it back locally. See column 32, lines 62-65. Accordingly, this patent discloses a method of distributing A/V material in real-time for conferencing collaboration. It includes reference to archived, non-real-time material. Although the system supports asynchronous collaboration, sharing of the files is primarily via a "mail" metaphor. A/V files are not organized into a discussion structure; rather, they are simply shared under the command of individual users. A full set of A/V files are not cached at individual workstations, but are retrieved and shared on-demand.

U.S. Pat. No. 6,105,055 issued to Pizano et al. discloses a multimedia collaboration system that combines multimedia communications and media processing mechanisms with off-the-shelf components that support information sharing and distribution. The system provides an asynchronous multimedia collaboration whiteboard that enables the creation of messages containing synchronized voice, graphics, and mouse gestures to describe conditions associated with an underlying multimedia object. This system plays back only one message at a time. It does not present the user with an automatic presentation of the entire discussion, but only provides on-demand download (via e-mail) of a single annotated message at a time. It also does not mention local caching, automatic updating, or pseudo real-time playback of discussion.

U.S. Pat. No. 6,237,025 issued to Ludwig et al. discusses a system architecture that employs separate real time and asynchronous networks—the former for real-time audio and video, and the latter for non-real-time audio and video, text, graphics, and other data, as well as control signals. The system architecture also accommodates the situation in which a user's desktop computing and/or communications equipment provides varying levels of media-handling capability, which may include full motion video. There is a discussion about media synchronization which begins in Column 29, a discussion about A/V storage which begins in Column 30, and a discussion about connection management which begins in Column 31. As discussed in Column 32, the system allows for alternative delivery strategies suggesting that it can be more efficient to transfer an entire A/V file from the storage server to the client workstation, cache it on the workstation's disk, and play it back locally. This system also has the capability of delivering delayed collaboration, as well as the additional ability to review the information multiple times and to edit, resend, and archive it.

The primary collaboration medium disclosed in the '025 patent is synchronous, real-time A/V. Real-time sessions can be recorded, but no mechanism for asynchronously arranging replies and attaching them to prior postings is described. The patent also does not describe any mechanism for arranging recorded A/V playback to simulate real-time discussion. Specifically, it states: "[d]uring playback the same sequences of window system requests and events reoccurs with the same relative timing as when they were recorded." See column 28, line 67, to column 29, line 2. A/V exchanges are via "multimedia mail" in which participants may exchange prior recordings of real-time discussions, but without an accompanying pseudo-chronology or other organization. Recorded A/V files are essentially archived real-time discussions. All recorded discussions are not present at all workstations automatically. Users thus do not have access to a common, organized view of all prior discussions. The full discussion is not cached at all workstations; therefore, no mechanism for automatic updating of workstation cached files is present.

Although the '025 patent uses the term "synchronization," the term refers to synchronization of audio and video signals and associated other multimedia data such as graphics. It is not synchronization (i.e., organization) of the full discussion content between server and workstation. It also is not clear that A/V materials can be recorded off-line at a workstation and later transmitted to the server for archiving. It appears that the system described in this patent requires connection to the network server in order to function. See column 32, lines 47-50 and 59-62; column 33, lines 6-8.

U.S. Pat. No. 6,330,589 issued to Kennedy discloses a system including a client database for managing conversation threads generated from messages communicated in a client-server architecture. The client database maintains a central archive of message-related information to support conversation threading of current and future messages downloaded from the server to the client. Conversation roots and nested replies are presented sequentially. The database also includes data fields to assist in providing more efficient and timely operation of retrieving and threading conversations. Messages have a message identifier and a references field. A determination is made as to whether the message has been previously downloaded from the server to the local message store located at the client. In response to determining that the message has not been previously downloaded from the server to the local message store, the message is downloaded from the server to the local message store, and data fields in the database are populated with the message-related information. The method allows a participant to reply to individual messages in the organization and to reply whenever they want to reply. The invention does not organize A/V messages.

U.S. Pat. No. 6,453,337 issued to Miller et al. discloses a method and system to track and manage the states of electronic media in a communications network. Information is passed between users of the network using, for example, e-mail. Dynamic content revision is performed asynchronously relative to the sending and receiving of the input from any of the participants or external sources. The electronic medium can also be updated by a variety of external sources, such as by an attached server containing stock quotes or news feeds.

U.S. Pat. No. 6,463,461 issued to Hanson et al. discloses a system used to communicate information among a group of participants. Each participant can add content which can be asynchronously updated in a server, which can be accessed by other participants in the group. The server may be configured to support a variety of electronic mail protocols and a plurality of image construction languages. The current content from the server is retrieved when the receiving participant accesses the electronic medium. This makes collaboration of information more rapid and interactive among group participants. Dynamic content may include video content, audio content, binary content, text, executable content, or images. The dynamic content may be updated and retrieved dynamically asynchronously relative to the input from selected participants or from the external source in data communication with the server. The updated dynamic content may be current when accessed or retrieved from the server.

U.S. Pat. No. 6,484,196 issued to Maurille discloses a system and method providing integrated combinations of threaded instant messages; open display bulletin boards; private bulletin boards; threaded e-mail; explicit acknowledgment of messages; and conferencing, whisper, and talk modes. The server sends all information to the client in the form of web pages, which the client can view and provide response. A message table lists characteristics of each message issued by users, including a unique message ID, threading information (parent and child message IDs), sender and recipient name, subject, and other information. The client has a choice of accepting the message or not. Once a recipient has accepted a message, he or she can reply to or acknowledge the message. The reply is implemented by the client and the server.

U.S. Pat. No. 6,496,849 issued to Hanson et al. discloses a transport envelope having a plurality of network addresses. An encoding layer may be contained in the transport envelope to support a plurality of content types. Each of the plurality of content types may include a plurality of dynamic and static content. The dynamic content may be dynamically asynchronously updated based on the input from at least the user or the external source.

U.S. Pat. No. 6,505,233 issued to Hanson et al. discloses a method that can be used to communicate information among a group of participants. A participant may create an electronic form specifying a list of network addresses corresponding to other participants. When a server delivers a message upon receipt of the form, the participant opens the message and the server produces a medium containing static and dynamic content. The participant can add content which may be asynchronously updated in the server which can be accessed by other participants in the group. The updated content includes information identifying changes that have occurred since the message was last viewed by the viewing participant. This means that the viewing participant can track the opinions, suggestions, or other comments made by other participants.

U.S. Pat. No. 6,507,865 issued to Hanson et al. is directed to a method and system for group content collaboration. In general, it is directed to a system and method offering content collaboration among participants connected to a network. In the preferred embodiment, the method uses an electronic medium having at least one dynamic content region that is stored in a database of a server. Input composed by the participants of the group or other external sources is accepted by the server to update the dynamic content region. The updating of the dynamic content region is preferably performed asynchronously relative to the sending and receiving of the input from any of the participants or external sources. In this way, the content of the electronic medium is always current. The content may be textual or binary. Binary content may include images, streaming media (e.g., video and audio), virtual whiteboards, and group greeting cards. Video and audio from a participant can be prefixed, inserted, appended, mixed, or overlaid with a streaming media object around which a group of participants is collaborating. See column 13, lines 58-62.

U.S. Pat. No. 6,507,865 issued to Hanson et al. does not describe a mechanism for arranging recorded A/V playback to simulate real-time discussion. A/V exchanges are via a "form" in which participants may exchange prior recordings, but without an accompanying pseudo-chronology organization. Thus A/V messages are not directly associated with prior messages; they are essentially stand-alone items. A full set of discussion messages is available only when a user is logged onto the network and connected to server. The primary novelty of the disclosed system and method is the "zaplet," a means of providing information to users of different computers via a method of accessing dynamic material such as text windows or A/V clips. The zaplet is an electronic form that provides users with the resources to view the same electronic material on different systems.

U.S. Pat. No. 6,535,909 issued to Rust is directed to a system and method to record and playback a collaborative web browsing session. An advantage of this system and method is to provide a data structure on a computer-readable medium that records the events of the collaborative web browsing session, thus allowing the later replay of the previously recorded collaborative session. Another benefit is that the system and method provide a real-time correlation between the recorded audio and visual events. Still another advantage is the provision of a data structure on a computer-readable medium that can archive the audio and visual data events. The system permits users at their desktop to review real-time collaboration as it previously occurred.

Accordingly, the '909 patent describes recording, archiving, and playback of Web browsing sessions, not comments recorded and posted by human discussion participants. Because the intent is to reproduce a recorded Web browsing session at remote computers rather than facilitate human interaction, there is no mechanism for arranging recorded A/V playback to simulate real-time discussion. A/V events are stored separately. Then a data structure is used to merge them at playback time. Standard video files are used in which audio and video are integral within a single file.

U.S. Pat. No. 6,583,806 issued to Ludwig et al. discloses a teleconferencing apparatus using a plurality of workstations. It combines computer hardware, software, and communications technologies to produce a multimedia collaboration system that facilitates distributed collaboration. It uses desktop teleconferencing to support real-time interactions and multimedia mail to permit asynchronous exchange of arbitrary multimedia documents, including previously recorded teleconferences. The system allows conference activities to be recorded and played back later.

The system is synchronous, requiring all participants to be connected to the network simultaneously. Emphasis is on real-time delivery of A/V material. A/V files are not cached locally at workstations, but are centrally served. Recording facilities capture real-time collaboration; there is no provision for asynchronous posting and organization of messages by individuals. The '806 patent does not describe a mechanism for arranging recorded A/V playback to simulate real-time discussion. A/V exchanges are via multimedia files in which participants may exchange prior recordings of real-time discussions or other video material, but without an accompanying pseudo-chronology organization.

U.S. Pat. No. 6,317,777 issued to Skarbo et al. discloses a document collaboration videoconferencing system between a first and second conference attendee. The local presenter computing system transfers a document to the document server over a network, and the first conferencing system copies the document over the network from the document server. Thus, this patent describes a method of sharing documents among users of a synchronous videoconference. The documents described are text or data, but A/V files could also be shared in this fashion. It is not an asynchronous conferencing tool. In essence, it is a method of transferring files between users while both are on-line with a videoconferencing system.

U.S. Pat. No. 6,484,156 issued to Gupta et al. relates to methods of delivering and rendering multimedia content to networked client/server systems. It addresses adding annotations (text, audio, or A/V) to existing video streams. The patent is not aimed at collaborative discussions, and describes no support for collaboration. It uses the term "synchronization" to describe attachment of annotation material to the proper temporal location in the target video stream.

U.S. Pat. No. 6,490,614 issued to Shaffer et al. discloses a system and method for multimedia messaging system collaboration. A recipient wishing to make a comment or insert changes to the message submits comments to a moderator for approval. If the moderator approves the changes, the changes are automatically incorporated into the message. The original message is then recalled from recipients who have not yet opened the message and a revised message is sent to those whose messages were recalled. A message is also sent to recipients who have already opened the original message stating the change to the original message and suggesting an update to the original message. The messages may be A/V, text, or other media. The system does not organize messages in a discussion and does not archive past messages.

U.S. Pat. No. 6,578,201 issued to LaRocca et al. is directed to a multimedia stream incorporating interactive support for multiple types of subscriber terminals. The transport mechanism for this system may be asynchronous packetized data such as that defined in the MPEG video and audio signal transmission protocol and the like. FIG. 10 of the patent depicts a schematic of the multiplexing of video, audio, and interactive data according to a preferred embodiment. In column 13, at line 54, there is a discussion of forward error correction; in column 14, a discussion on MPEG synchronization codes; and in column 14, at line 54, some discussion of caching using the CPU cache. There is no discussion, however, regarding multimedia mail for the use of collaborating. The system is for the provision of real-time multimedia to television set-top converters. The system is not aimed at implementing human collaboration. There is no method described for recording, posting, or archiving messages.

U.S. Pat. No. 6,598,074 issued to Moller et al. discloses a system and method for collaborative multimedia production by users at different locations. The users produce sequencer data at a plurality of sequencer stations connected via a network. The sequencers create sequence data representing multimedia data which in turn represents audiovisual occurrences each having descriptive characteristics and time characteristics. Sequencers further enable a user to manipulate and edit the sequence data to generate multimedia products. As a local user works, he "chats" with other users and receives remote users' changes. In addition, all remote users can hear what the local user is hearing, live. The system does not provide for asynchronous posting or replaying of A/V messages.

U.S. Pat. No. 6,636,889 issued to Estrada et al. is directed to a system and method for client replication of collaboration space. In a preferred embodiment, a collaboration system or team-ware server platform is provided which is powered by the Lotus Domino system and uses a standard web browser. A system and method are provided for replicating a place in a collaboration space at a client node. A replicated copy of the place is downloaded from a server to the client node. The replicated copy of the place includes data, code, and security attributes. Also downloaded from the server to the client node is a mini-server. The mini-server is operable for serving the replicated copy of the place to a browser at the client node.

The '889 patent does not describe a mechanism for arranging recorded A/V playback to simulate real-time discussion. A/V exchanges are via "pages" in which participants may exchange prior recordings of real-time discussions, but without an accompanying pseudo-chronology organization. Thus, A/V messages are not directly associated with prior messages; they are essentially a collection of stand-alone items in a virtual "room." The system is built upon a Lotus Notes technology. It has no integrated mechanism for recording A/V comments. Viewing is via a standard Web browser.

U.S. Pat. No. 6,640,241 issued to Ozzie et al. discloses communication services for an activity-based collaboration system, in which data change requests responsive to user interactions are communicated over a network. When a remote device is not connected to the network, the changes are stored until notification is provided that the remote device has reconnected to the network. The changes are then sent to the reconnected remote device.

A publication titled "Acquiring Working Knowledge Through Asynchronous Multimedia Conferencing," Educational Technology & Society 3(3) 2000, ISSN 1436-4522, pp. 105-111 discloses a system of ordered communications for Web-based A/V transmissions. After an A/V representation is created, a second person can add their own A/V annotation to it in the form of comments and discussions. Then, a third person can view the original presentation, the second person's annotations, and add their own annotation. Anyone who views the original material also receives visual indications of the annotations and can choose to view an annotation. The system does not provide for a group collaboration discussion. Instead, it provides a series of individual base discussions and allows viewers to post responses to the individual base discussions, without the capability of organizing a series of base discussions and their annotations into a single cohesive collaborative discussion.

A publication titled "IBM Content Manager Common-Store for Lotus Domino, Version 8," IBM Corporation 2002, Silicon Valley Laboratory, discloses a system to archive e-mail and documents while adhering to auditing and corporate requirements for long-term storage. It does not disclose video conferencing capability, or recording or organizing discussions.

A publication titled "IBM DB2 Content Manager for Multiplatforms V8.2 and DB2 Information Integrator for Content V8.2 Support On-Demand Access to Critical Business Information," IBM Corporation, corrected on Jun. 9, 2003, discloses a system to integrate documents, Web, image, and rich media. It integrates with existing hardware and software. It does not disclose recording or organizing discussions.

A publication titled "IBM Content Manager VideoCharger, Version 8," IBM Corporation, 2002, Silicon Valley Laboratory, discloses audio and video streams over corporate intranets or the Internet using standard formats. It enables search, archiving, management, and sharing of digital assets and integrating them into an enterprise content management infrastructure. It provides video-on-demand content and can combine multi-media data with other data types. It supports asynchronous transfer mode (ATM). It does not provide support for recording or organizing discussions.

A publication titled "DB2 Content Manager VideoCharger," IBM Web site, Dec. 8, 2003 www-306.ibm.com/software/data/videocharger, discloses information that is similar to the information in the publication titled "IBM Content Manager VideoCharger, Version 8." It does not provide support for recording or organizing.

To overcome the shortcomings of previous types of communication methods and systems, a new technology that attempts to redress this missing nexus is provided. An object of the present invention is to describe the rationale, technical specifics, and tests of an indexable, asynchronous videoconferencing system that allows groups to share communication across time and space using verbal, vocal, and visual cues. A related object is to process all information—relevant and distracting—that real-time interaction demands, by spreading out interactions over time using asynchronous messaging.

Another object of the present invention is to meld the common attributes of asynchronous conferencing systems and full-channel AV communication to provide advantages greater than available using either set alone. Yet another object of the present invention is to provide additional features that truly offer a hybrid of video with the attributes of text-based group conferencing. These additional features include central maintenance of video clips in a server/client storage and delivery system, indexing and cross-listing of video-recorded content, and flexible dynamic organization of video clips in some kind of user-adjustable grouping or indexing system for playback by temporal, topical, or author-based retrieval requests. A description of such a system is described below.

The convenience and appeal of asynchronous communication, instantly conveyed and indefinitely stored, has transformed social life and professional practices in ways that few would have imagined not too many years ago as e-mail and conferencing systems have pervaded society and business. The benefits of such systems hardly need repeating and, despite the comparatively tedious interface that text-based CMC requires, asynchronous messaging has become a staple. Yet in spite of the wide diffusion and now-commonplace nature of text-based systems, and the evidence from empirical research questioning its value, users' articulated preference for best and easiest communication interface for moderately complex tasks consistently falls on full-cue communication: face-to-face or really good videoconferencing. Until now, one had to choose between the convenience of asynchronous messaging or full bandwidth. Or, using videoconferencing, partners incurred potential losses due to the distracting effects required by the management of both central and peripheral information that real-time systems demand. It is therefore another object of the present invention to make moot the need to choose between the convenience of asynchronous messaging or full bandwidth by providing as it does sound and video, in a recorded, storage-and-retrieval system, indexed to facilitate examination and comprehension by distributed group members.

SUMMARY OF THE INVENTION

To achieve these and other objects, and in view of its purposes, the present invention provides a method and a system for synchronizing audio/video messages and message-related information stored in a workstation with audio/video messages and message-related information stored in a server. In the method, a copy of the message-related information stored in the workstation is transferred to the server. The workstation identifies workstation messages that have not been transferred from the workstation to the server. A copy of the identified messages is transferred to the server. The server identifies messages in the server that have not been transferred to the workstation. The server transfers to the workstation the messages identified by the server. The server merges the message-related information transferred to it by the workstation and transfers a copy of the merged message-related information to the workstation.

In the system, a first processor in the workstation is configured to identify messages stored in the workstation that have not been transferred from the workstation to the server. A first transmitter in the workstation is configured to transfer from the workstation to the server a copy of the message-related information stored in the workstation and a copy of the messages identified by the processor. A second processor in the server is configured to identify messages in the server that have not been transferred from the server to the workstation. A second transmitter in the server is configured to transfer to the workstation a copy of the messages identified by the second processor. A synchronizer control in the server is configured to merge the message-related information transferred by the first transmitter with the message-related information stored in the server. The second transmitter is also configured to transfer a copy of the merged message-related information to the workstation.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 1 is a table depicting an example of a scenario of how the invention may be used in accordance with an exemplary embodiment of the invention;

FIG. 5 is a table depicting the DSOB fields that organize information about audio/video messages in accordance with an exemplary embodiment of the invention;

FIGS. 10(c) to 10(i) are each diagrams that further illustrate the process illustrated in FIGS. 10(a) and 10(b);

FIG. 20(a) is a segment of a flow diagram illustrating an example of a synchronization process in accordance with an exemplary embodiment of the invention;

FIG. 21(a) is a table of DSOB entries illustrating an example of results of a first posting, the posting being from a first user of the system, in accordance with an exemplary embodiment of the invention;

FIG. 21(b) is a table of DSOB entries illustrating an example of results of a second posting, the posting being from a second user of the system, in accordance with an exemplary embodiment of the invention;

FIG. 21(c) is a table of DSOB entries illustrating an example of results of a third posting, the posting being from a third user of the system, in accordance with an exemplary embodiment of the invention;

FIG. 21(d) is a table of DSOB entries illustrating an example of results of a fourth posting, the posting being from a fourth user of the system, in accordance with an exemplary embodiment of the invention;

FIG. 21(e) is a table of DSOB entries illustrating an example of results of a fifth posting, the posting being from the first user of the system, in accordance with an exemplary embodiment of the invention;

DETAILED DESCRIPTION OF THE INVENTION

Figure 2:
FIG. 2 is a table depicting the pseudo-chronological sequence of the messages illustrated in FIG. 1.

Although the invention is illustrated and described in this document with reference to specific embodiments, the invention is not intended to be limited to the details shown. Rather, various modifications may be made in the details within the scope and range of equivalents of the claims and without departing from the invention. For example, the description of the invention and the figures illustrating the invention relate to manipulating audio/video (A/V) messages. It will be understood that the methods and systems described in this document may also be used with other kinds of messages.

The present invention is a time-independent collaboration (TIC) system. The term "collaboration" can be defined as an activity in which one or more participants or services share information or points-of-view with an intent of reaching a decision, making a choice, or sharing knowledge.

An exemplary embodiment of the present invention is a TIC system and method that provides the platform for asynchronous group collaboration using network distributed A/V communications instead of text. In asynchronous collaboration, group members work independently at a distance, and do not need to be simultaneously connected to the central communications server. That is, there is no requirement that all group members be present at the same time or be communicating at the same time. More specifically, all members do not have to be communicating with each other at the same time and do not have to be communicating with a central server at the same time. Moreover, the system does not require that any group member be connected to the server in order for some aspects of the system to operate. The TIC system and method organize, archive, and play back comments of individual participants in a pseudo-chronological order in pseudo-real time, simulating a synchronous network discussion. Whenever a network or network discussion is referred to in this description it may be considered to be referring to a Local Area Network (LAN), an Ethernet network, or a connection to a public or private global information network such as the World Wide Web or the Internet, a Metropolitan Area Network (MAN), or Wide Area Network (WAN).

The asynchronous collaboration group support of the exemplary embodiment of the invention provides all messages from all group participants to all group participants. This feature differs from point-to-point asynchronous messaging, like video e-mail, which sends a single message and does not insure that all communication participants have access to all messages.

As each group participant adds messages to the group collaboration, a discussion is formed about the subject under consideration. As messages are added, the discussion becomes more complete. The complete discussion can be cached at each group member's workstation. When the complete discussion is cached at each workstation, network connectivity or latency problems cannot cause loss of video or audio. Archiving on the TIC server, coupled with TIC automatic synchronization (updating), provides automatic repair of corrupted or accidentally deleted files at workstations without a need for user intervention other than logging onto the system or requesting the system to provide an update. Repair of workstation files is accomplished when the workstation downloads the centrally saved full discussion from the server.

Furthermore, playback can be performed off-line at each workstation, unlike synchronous or streaming Web or other network conferencing systems. Workstation full discussion archiving and playback allows mobile use of the TIC system in areas without network connections and allows discussion participants to repeatedly play back segments of the discussion or the full discussion without the need to connect to the network.

The TIC system creates a pseudo-chronological order for comments, regardless of when they are actually added to the discussion. Comments can be created off-line, so a group member can record comments, even in areas without access to a network connection, and have the comments added to the discussion later, after a network connection with the TIC Server is established. Comments can also be added to the discussion out of chronological sequence, permitting elaboration on points made earlier in the conversation at a later time.

The Discussion Structure Object (DSOB) data structure provides the basis for synchronizing the cached discussion A/V files at remote workstations with the TIC server master archive, so that all users see the same discussion structure, regardless of when they connect to the system. The DSOB data structure logic also permits organizing the sequence of playback of individual comments in ways other than chronological sequence, for example, by topics or single participants, while still maintaining the pseudo-chronology and the actual real-time sequence of posting of messages.

At various points in this specification, examples are included to more clearly demonstrate the overall nature of the invention. These examples are exemplary, not restrictive, of the invention. FIG. 1 is a table depicting an exemplary scenario of how the invention may be used. In the FIG. 1 scenario, suppose a group of four product engineers needed to collaborate on a new product prototype. To create the prototype, the four people needed to communicate regularly over a long period of time. Row 10 shows that Person A is located in New York; Person B is located in Los Angeles; Person C is located in London; and Person D is located in Tokyo. They are unable to meet face-to-face. The time zone differences shown in row 12 make it difficult to use a synchronous media like a telephone conference call, where all participants must be connected simultaneously. Using the asynchronous TIC collaboration of the present invention, however, they would be able to communicate in the manner shown in FIG. 1.

Rows 12, 14, 16, 18, 20, 22, 24, 26, 28, and 30 and columns 32, 34, 36, 38, 40, 42, 44, and 46 in FIG. 1 provide the details of each person's comments to the collaboration. Ten comments, Message Numbers 1-10, were made as shown in column 44. Column 42 identifies the person who made each comment. For example, Person A made comment 1 at 9:00 AM New York time on day 1; Person D made comment 2 at 11:10 AM Tokyo time on day 1; and Person B made comment 3 at 10:00 AM Los Angeles time on day 1. Comments 4-10 were made by the persons identified in column 42 on the days identified in column 32 and at the times identified in columns 34, 36, 38, and 40.

Column 46 summarizes the content of each person's message. In Message Number 1, Person A made a suggestion for color. In Message Number 2, Person D responded with an alternative suggestion. In Message 3 Number, Person B replied to Messages 1 and 2 and also asked Person C's opinion. In Message 4, Person C responded to Message 3 with an opinion. In Message 5, Person D raised a new problem with dimensions. In Message 6, Person C suggested two possible solutions to the problem raised in Message 5. In Message 7, Person A replied to Message 4 with another color option. In Message 8, Person A replied to Message 6 with the cost of a dimensional change. With respect to Message 9, Person C had been traveling and prepared it on a workstation while the workstation was off-line and while Person C was on an airplane. Person C's message responds to Message 7 and posts Message 9 after leaving the plane and logging onto the system. In Message 10, Person A responds to Message 8.

Therefore, FIG. 1 depicts the real-time chronological order in which the messages were created and added to the system. FIG. 2 depicts how the TIC system of an exemplary embodiment of the invention might organize into pseudo-chronological sequence the messages depicted in FIG. 1. Column 50 in FIG. 2 repeats the actual chronological sequence of the messages, corresponding to column 44 in FIG. 1. Column 52 in FIG. 2 depicts the pseudo-chronological sequence. For example, Person A's Message 7 responded to Message 4. Therefore, column 52 shows that Message 7 has been placed in the discussion structure as if it had occurred immediately after the comments in Message 4, even though two intervening messages had been posted: intervening Messages 5 and 6. Similarly, Message 9 has been placed in the discussion structure as if it had occurred immediately after the comments in Message 7 because it responds to Message 7. Similarly, Message 8 has been placed in the discussion structure as if it had occurred immediately after the comments in Message 6 because it responds to Message 6.

Figure 3:
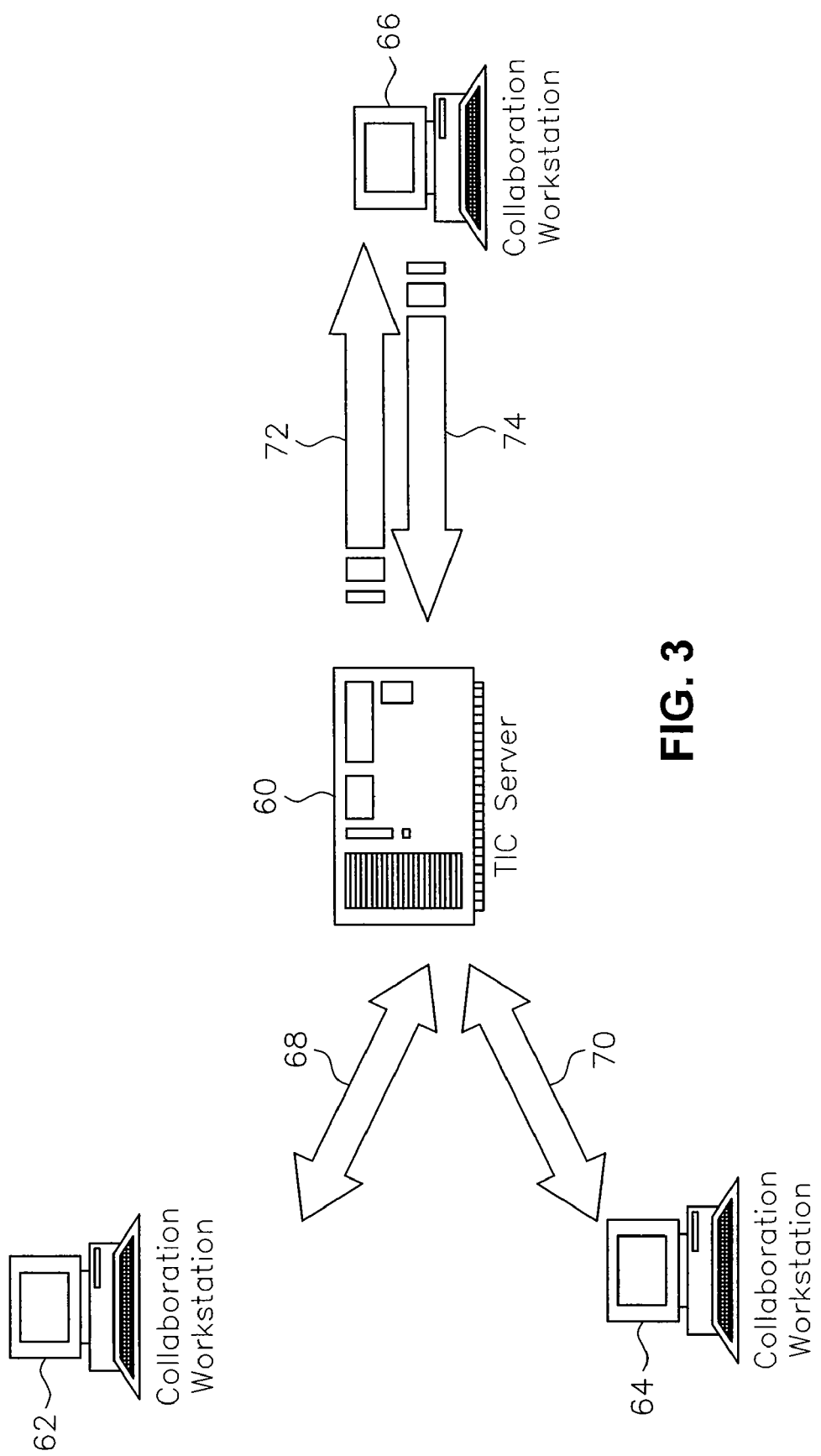
FIG. 3 illustrates a schematic representation of an exemplary embodiment of the system according to the present invention.

FIG. 3 illustrates a schematic representation of an example of an exemplary embodiment of the system according to the present invention. FIG. 3 shows a TIC server 60 that may be coupled to three collaboration workstations 62, 64, and 66. In an alternative embodiment, server 60 may be coupled to more or fewer workstations. Arrows 68, 70, 72, and 74 illustrate the coupling between the server and the various workstations. As will be explained in more detail below, the coupling depicted by arrows 68, 70, 72, and 74 may be over a network connection such as a LAN (Local Area Network), an Ethernet connection, or a global information network such as the Internet, the Web, or other coupling systems. In all of the figures described below, it will be understood that all communications between the server and any workstation are over an appropriate network.

Each workstation may be any type of computer, including a general purpose computer. The computers may have a processor to perform the processing tasks required by the computer. The processor may be any type of processing device capable of implementing the steps necessary to perform the various procedures and operations discussed in this specification. The processor may be a general purpose programmable digital device using a stored program.

Each computer has a video display that displays various information and data to the user of the computer. An input device and a pointing device allow the user of the computer to enter information and commands to the computer and to the computer system. The input device may be, for example, a keyboard, keypad, handwriting recognition device, or voice recognition device. The pointing device may be, for example, a mouse, track ball, or touch pad. A printer may be coupled to the computer and is capable of creating a hard copy of information generated by or used by the computer. The workstation may also include a video camera, audio equipment, and software associated with the camera and audio equipment to record the messages by each group participant. The software enables one or more workstations to store the A/V messages and transmit them to the server. The software also enables the server to store A/V messages and transmit them to one or more workstations.

Embodiments of the present invention may be implemented using a computer-readable medium (also referred to as a processor-readable medium) containing various sets of instructions, code sequences, configuration information, and other data used by a computer or other processing device. The various information stored on the computer-readable medium is used to perform various data communication, data processing, and data handling operations, such as those described in the specification. The computer-readable medium may be any type of magnetic, optical, or electrical storage medium, including a diskette, magnetic tape, CD-ROM, memory device, or other storage medium.

Individuals at each workstation may record one or more discussion comments into A/V files called Asynchronous Individual Discussion (AID) files using the TIC workstation software as explained in more detail below. Each A/V file may contain a small A/V clip with a single person's comments pertaining to the subject of the collaboration. Each AID file may be uniquely named by the TIC workstation software, so that each A/V clip of a participant's comments retains its unique name on both the server archive and in all workstation caches.

In an exemplary embodiment, server 60 maintains a master archive of all of the AID files. Server 60 also maintains a master archive of the logical relationships of the AID files in the context of the collaborative discussion, as shown, for example, in FIG. 2. The logical relationships of the AID files are defined in the DSOB files. The DSOB object creates the pseudo-chronological sequence of comments that simulates a synchronous discussion. The DSOB may be passed between one or more of workstations 62, 64, and 66 on the one hand and server 60 on the other hand to synchronize and update the discussion structure at each workstation. When, for example, workstation 62 is updated with the full discussion stored in server 60, the discussion stored in workstation 62 is synchronized (is in synchrony) with the discussion stored in server 60.

Figure 4:
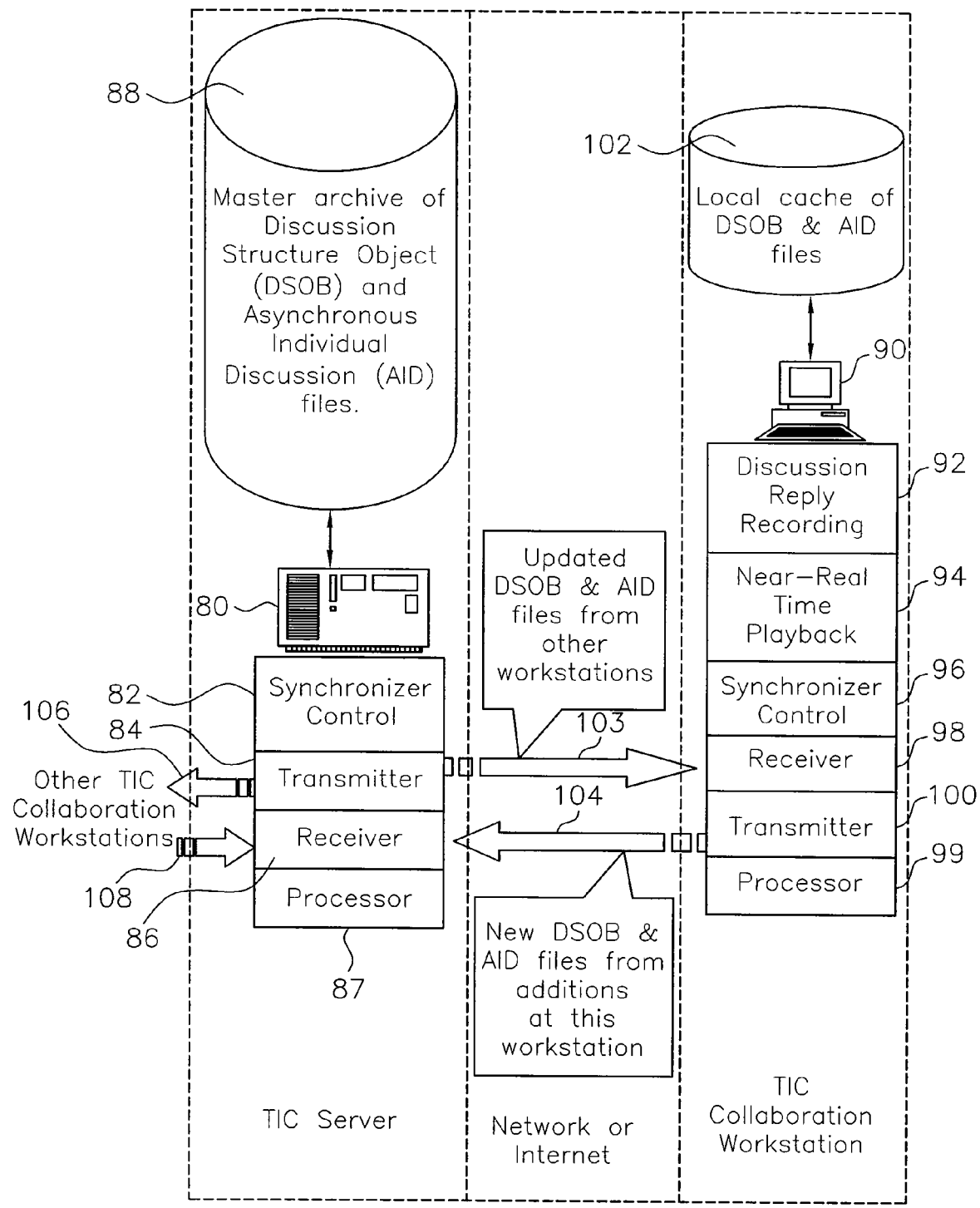
FIG. 4 illustrates a schematic representation of an exemplary embodiment of part of the system illustrated in FIG. 3.

FIG. 4 illustrates a schematic representation of an exemplary embodiment of part of the system illustrated in FIG. 3. More specifically, FIG. 4 illustrates an example of the relationship between a server 80, a workstation 90, and other workstations (not shown). Server 80 contains a synchronizer control 82, a transmitter 84, a receiver 86, and a processor 87. Processor 87 may be any type of processing device capable of implementing the steps necessary to perform the various procedures and operations discussed in the specification. The processor may be a general purpose programmable digital device using a stored program.

Synchronizer control 82 is a set of software instructions or code sequences running on processor 87 that implements organization of AID files, updating and merging of workstation AID and DSOB files with those in the master archive, and organizes transfer of these files between server and workstation. The synchronizer control 82 is described in more detail in connection with FIGS. 8-10. Server 80 also contains a storage location 88 which stores the master archive of the DSOB and the AID files containing A/V messages. In an exemplary embodiment, storage location 88 may be a magnetic disk file. In an alternative embodiment, it may be a database system, or any hardware or network-attached device capable of storing and retrieving digital files under control of the synchronizer code. Although the A/V messages may be described as being associated with AID files, AID files may also be described as being associated with A/V messages.

In an exemplary embodiment, workstation 90 contains a discussion reply recording mechanism 92, a near-real time playback mechanism 94, a synchronizer control 96, a receiver 98, a processor 99, and a transmitter 100. Processor 99 may be any type of processing device capable of implementing the steps necessary to perform the various procedures and operations discussed in this specification. Processor 99 may be a general purpose programmable digital device using a stored program. Reply recording mechanism 92 is described in more detail in connection with FIGS. 27-30.

Figure 13A:
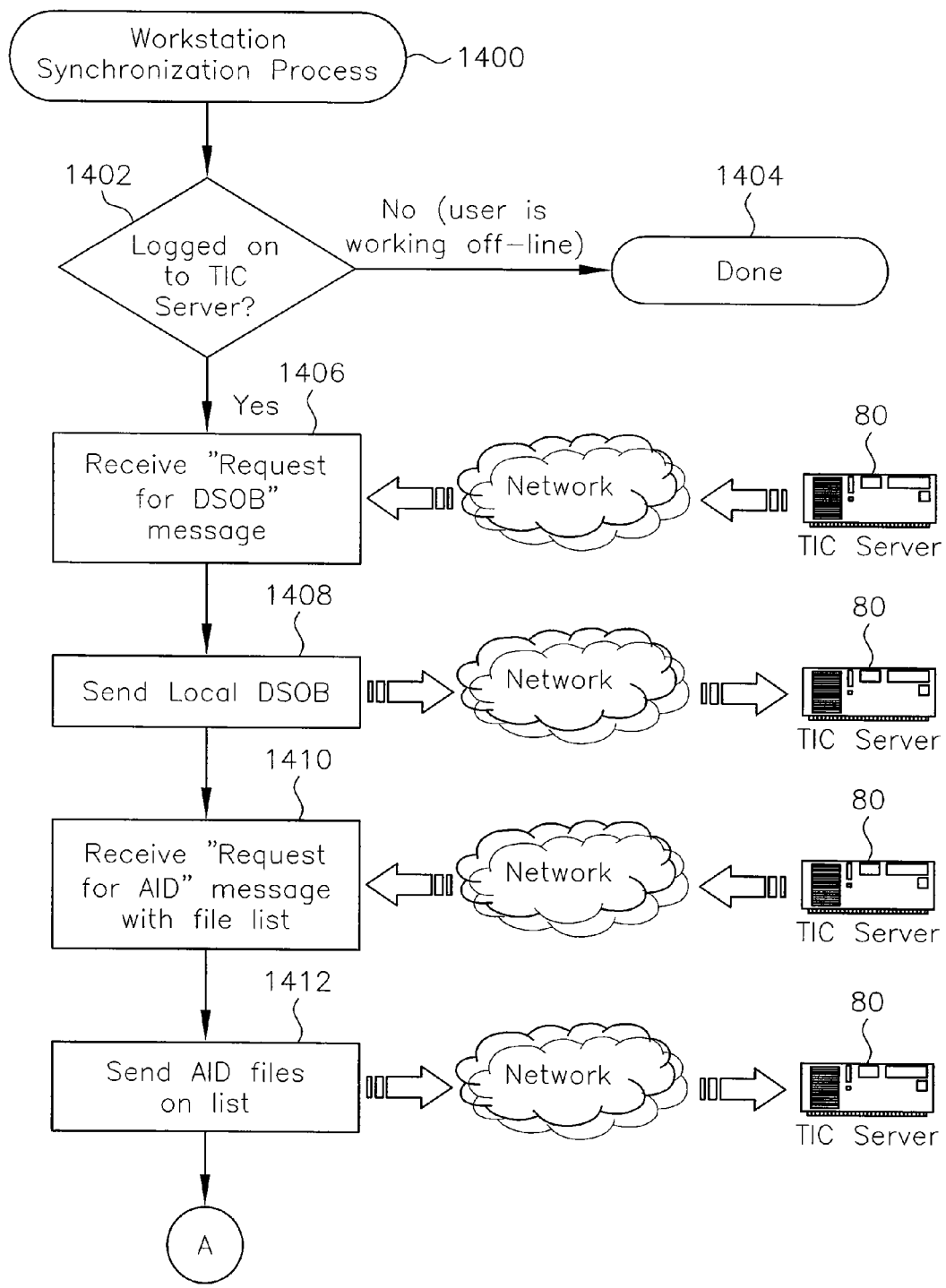
FIG. 13(a) is a flow chart illustrating part of the Workstation Synchronization Process according to an exemplary embodiment of the invention.
Figure 13B:
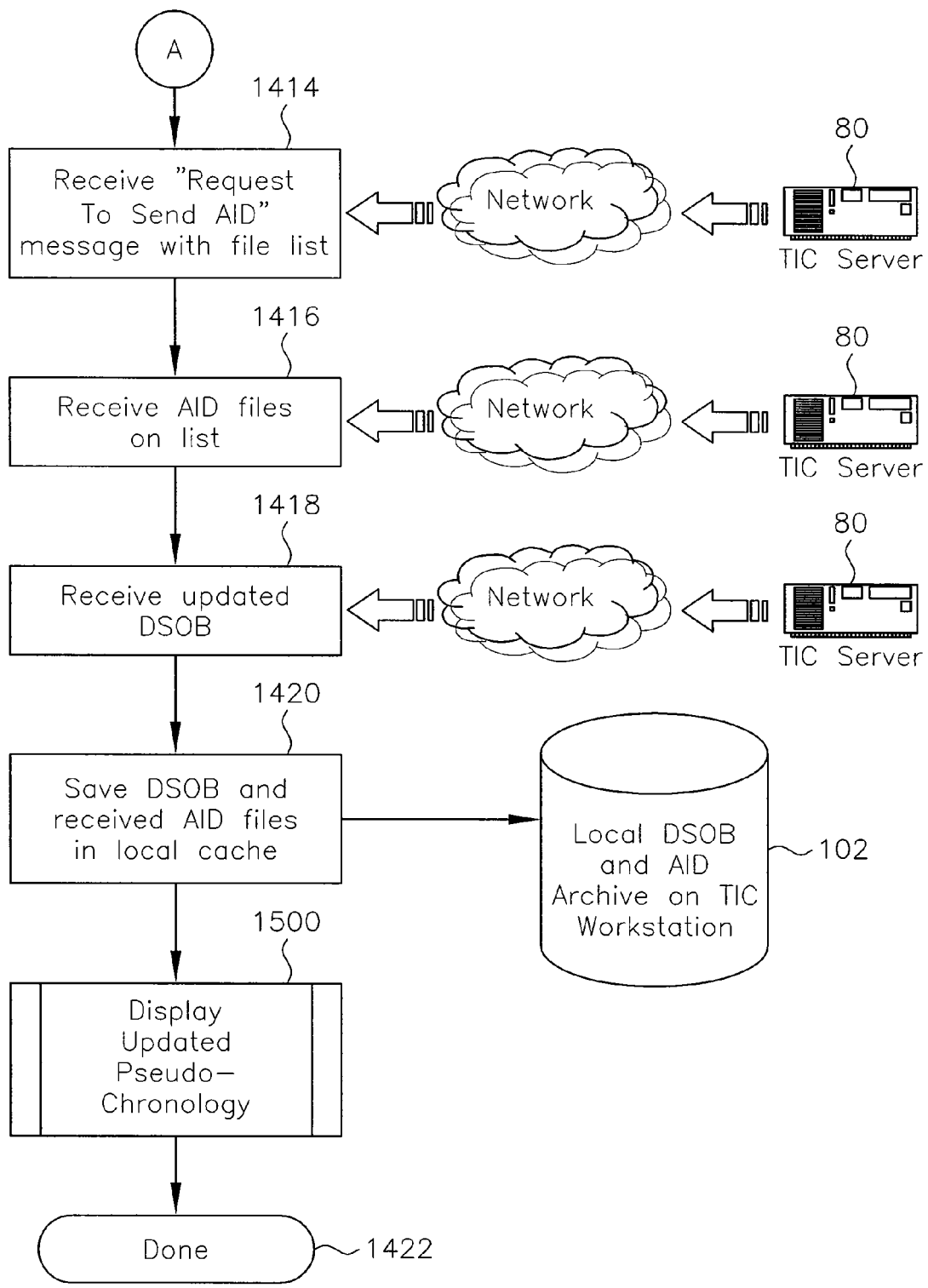
FIG. 13(b) is a continuation of the flow chart illustrated in FIG. 13(a)

Synchronizer control 96 is a set of software instructions or code sequences running on processor 99. Synchronizer control 96 is described in more detail in connection with FIGS. 13 and 31. Workstation 90 also contains a storage location 102 for holding the local cache of DSOB and AID files. Storage location 102 may be a magnetic disk file. In an alternative embodiment, it may be a database system, or any hardware device capable of storing and retrieving digital files under control of the synchronizer code.

Synchronizer control 82 and synchronizer control 96 each contain software that function in ways that will be described below. In general, these controls enable the server and the workstation to contain the same A/V files and to organize the A/V files in the same pseudo-chronological order. Near-real time playback mechanism 94 enables the workstation to assemble and display A/V files in pseudo-chronological order with no intermediate user intervention, simulating display of a synchronous real-time discussion as described in detail in connection with FIG. 15.

Connections between server 80 and workstation 90 are depicted by arrows 103 and 104, which may represent a network connection such as a LAN, an Ethernet connection, or a connection over a global information network such as the World Wide Web or the Internet. Arrow 103 shows that updated DSOB and AID files, with A/V messages, may be sent by transmitter 84 of server 80 to receiver 98 of workstation 90. Transmitter 84 may be a hardware network adapter used with software to implement standard network communication protocols and to create and manage transfer of messages controlling file transfer and other interactions between server and client. Receiver 98 may be a hardware network adapter used with software to implement standard network communication protocols to create and manage reception of messages controlling file transfer and other interactions between server and client.

The updated DSOB and AID files containing A/V messages transmitted by server 80 are stored in the server's storage location 88 as the master archive. The master archive consists, in turn, of updated DSOB and AID files that server 8*b* received from other workstations (not shown). Arrow 104 shows that transmitter 100 of workstation 90 may transmit to receiver 86 of server 80 new DSOB files and AID files that may have been created at workstation 90.

Receiver 86 may be a hardware network adapter used with software to implement standard network communication protocols to create and manage reception of messages controlling file transfer and other interactions between server and client. Transmitter 100 may be a hardware network adapter used with software to implement standard network communication protocols and to create and manage transfer of messages controlling file transfer and other interactions between server and client. After these files are received at server 80, synchronizer control 82 organizes them into the pseudo-chronological order and stores them as an updated master archive in storage location 88.

Connections between server 80 and other workstations (not shown) are depicted by arrows 106 and 108 which may represent a network connection such as a LAN, an Ethernet connection, or a connection over a global information network such as the Internet. Arrow 106 shows that transmitter 84 of server 80 may transmit the master archive of server 80 to the other workstations. Arrow 108 shows that receiver 86 of server 80 may receive new DSOB and AID files from the other workstations for organization by synchronizer control 82 and subsequent storage in storage location 88 as an updated master archive of DSOB and AID files.

A new discussion may be activated by a TIC moderator who has administrative privileges for the TIC system. In turn, moderators may be designated by the TIC System Administrator, who has full responsibility for the system. Moderators may have access to the TIC server from anywhere on the network via a TIC moderator's client application. Moderators can add participants and assign them user names and passwords, which the moderators may use to access the discussions, remove participants, edit the discussion, and carry out other activities to monitor and facilitate the collaboration. The moderator records an opening message that activates the discussion.

Once the discussion is activated, participants may log on at any time from TIC collaboration workstations. Collaboration workstations may be Windows-based computers with a Web camera, microphone, and TIC client software installed. The operation of the software is discussed in more detail below.

When the TIC client software at a workstation such as workstation 90 is activated, it contacts server 80. Server 80 then interacts with the client at workstation 90 to determine two things: (1) has the participant recorded new AID files off-line at the workstation since the last time the participant logged on; and (2) does workstation 90 have the most current DSOB and all AID files archived on the TIC server. Any new participant AID files are uploaded by the server via receiver 86 and added to the master archive in storage location 88. Then, via transmitter 84 and receiver 98, workstation 90 downloads the fully updated DSOB and AID files from other participants that have accumulated in the master archive stored in storage location 88 since the participant's last logon at workstation 90. After this process, workstation 90 has a fully updated copy of the most current version of the discussion ready for playback.

The participant can then play back the discussion at workstation 90 in a number of flexible ways. The full discussion may be played back in pseudo-chronological order. Workstation 90 may play only new discussion comments from any arbitrary point in the pseudo-chronology. Workstation 90 may play a single participant's comments chosen from a visual representation of the discussion on the display of workstation 90.

The DSOB contains a data structure that links individual AID files in the pseudo-chronology. Implementation of the pseudo-chronology is done by arranging entries that consist of AIDFileName values of other DSOB entries within the "LeftSiblingItem" and "RightSiblingItem" fields of the current entry to create a double-linked list data structure. Other methods of implementing the sequencing of AID message files into a pseudo-chronology in alternative embodiments of the invention may be used.

The DSOB serves as an index to the full discussion and contains information about each individual AID file created by a participant at a respective workstation. Each DSOB entry represents the comments of a single discussion participant. The DSOB entry is made up of the fields shown in FIG. 5. The fields organize the DSOB, thereby organizing a series of conversations into the pseudo-chronological form. The DSOB comprises the fields for each AID file. That is, the DSOB is made up of multiple instances of all of the fields for each AID file.

Figures 24, 25:
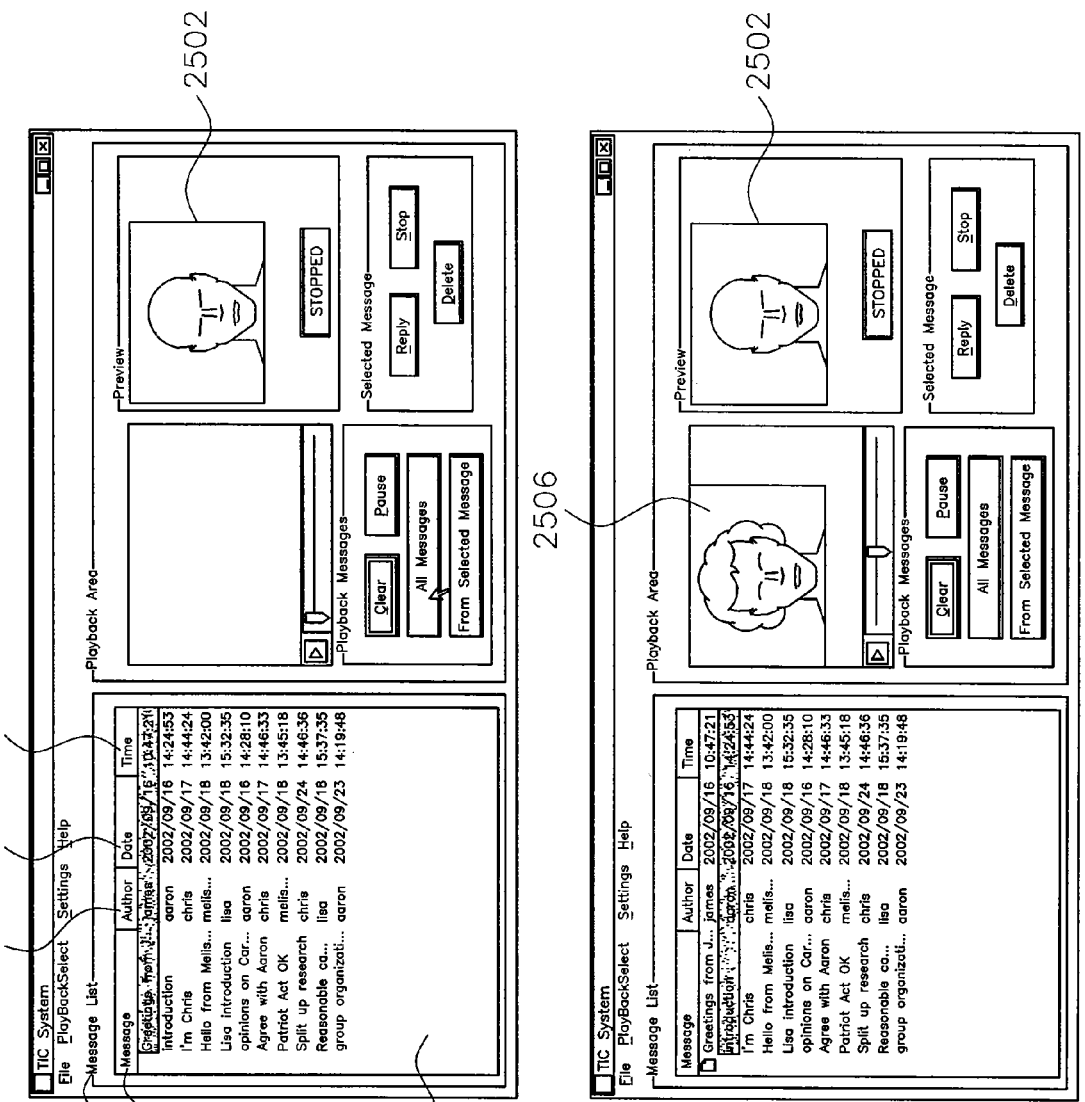
FIG. 24 is another illustration of a screen and an interface of a workstation in accordance with an exemplary embodiment of the invention.
FIG. 25 is another illustration of a screen and an interface of a workstation in accordance with an exemplary embodiment of the invention.

The first field is the AIDFileName, shown in row 110 of FIG. 5. It is a unique AID file name containing a user ID and time/date information. Referring briefly to FIG. 25, the display shows "james Sep. 9, 2002 10:47:21." All of that information makes the entry unique throughout the system because it contains the author and the time and date the A/V message was created. As shown in FIG. 25, the AIDFileName is displayed to easily enable the participant at the workstation to access it, if there is a desire to do so.

The second field is the "Description," shown in row 112. This field may contain text that may be entered by a discussion participant at the participant's workstation when the A/V comment is created and identified by the AIDFileName. The workstation software may use the information in this field to search for specific topics to play back. The third field is "LastPlaybackDate," shown in row 114. This field records the date and time that the discussion participant last played a specific AID file at a specific workstation. The date is stored in the server. For example, the server will know that workstation 90 played Message 5 on a specific date. This field may help to identify A/V comments that have not yet been displayed on workstation 90 so that a participant will be able to identify which are the new files that have not been displayed at workstation 90.

The fourth field is the "Authorization," shown in row 116. Given the proper security, a group member can delete or archive his own contributed comments. If a participant archives one or more of his own comments, the comments are saved on the server; but do not show up on any workstation. Consequently, the comments may still be retrieved from the server, because they are not deleted. The fifth and sixth fields are "ParentItem" in row 118 and "ChildItem" in row 120, respectively. These two fields allow a group member to reorganize the discussion in a different logical order, for example, by topic or by participant.

The seventh and eighth fields are the "LeftSiblingItem" in row 122 and the "RightSiblingItem" in row 124, respectively. These fields are used to set up the A/V comments in the pseudo-chronological form. The LeftSiblingItem contains the AIDFileName of the logical sibling immediately preceding the current AID file. The RightSiblingItem contains the AIDFileName of the logical sibling immediately following the current AID file.

Figure 22:
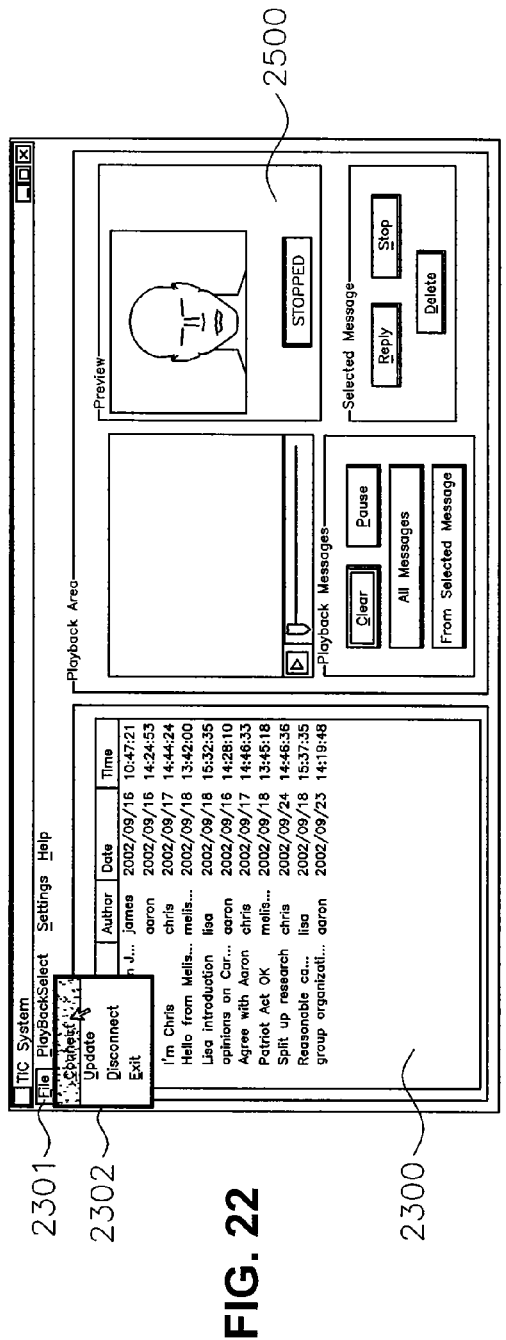
FIG. 22 is an illustration of a screen and an interface of a workstation in accordance with an exemplary embodiment of the invention.

Referring, for example, to FIG. 22, the left sibling of "opinions on Car . . . " is the AIDFileName for "Lisa introduction." The right sibling is the AIDFileName for "Agree with Aaron." It is seen that "opinions on Car . . . " "Lisa introduction," and "Agree with Aaron" are not in real time. They are, instead, in pseudo-time: Sep. 18, 2002 for "Lisa introduction" is followed by Sep. 16, 2002 for "opinions on Car . . . ," which is followed by Sep. 17, 2002 for "Agree with Aaron." Therefore, these fields force the A/V comments into pseudo-chronological time, rather than allow the comments to be listed in real time chronological order. The last field, in row 126, is "Status." This is an internal field that the server uses to signal itself about the administrative nature of the AID file referenced (e.g., active, backed-up, hidden, etc.).

Each workstation 90 has a DSOB. Server 80 also has a DSOB, which is a master DSOB. A purpose of the master archive in storage location 88 in server 80 is to archive, as a central repository, all of the DSOB fields pertaining to all AID files in all workstations. Server 80 is able to provide a master archive of the DSOB by synchronizing its DSOB with the DSOB in each workstation that is part of the collaboration. When a new A/V message is added to a workstation such as workstation 90 in FIG. 4, the workstation creates DSOB fields for the newly added message by creating new entries into the fields described in FIG. 5.

Another purpose of the master archive in server 80 is to contain all of the AID files (A/V messages) that are stored at workstation 90. During the synchronization process, server 80 compares its DSOB with the DSOB in workstation 90. If comparison of AID file names in workstation 90 and server 80 indicates that local cache 102 of workstation 90 has AID files that are not present in the master DSOB in the master archive, the additional AID files are uploaded from workstation 90 to server 80. Server 80 also compares its DSOB files with the DSOB files in other workstations (not shown) and uploads additional AID files from the other workstations that are not present in the master archive in server 80.

The new DSOB files and associated new AID files containing new A/V messages are stored in the master archive of server 80. Storing old and new DSOB files and AID files containing A/V messages in the master archive in storage location 88 stores a complete discussion from all workstations in the master archive.

Also as part of the comparison of workstation and server DSOB files, server 80 determines if its master archive has AID files that are not present in the local cache 102 of AID files in workstation 90. Server 80 may have such additional AID files because it downloaded them from other workstations. If server 80 has AID files that are not present at workstation 90, the additional AID files are downloaded to local cache 102 of workstation 90. The new AID files containing new A/V messages are stored in local cache 102 of workstation 90. Server 80 merges the Master DSOB version with the workstation DSOB to create an up-to-date version of the collaboration, which it then sends to workstation 90. Server 80 makes a similar comparison with all other workstations. Server 80 compares its master archive with the local cache of each workstation and down loads all DSOB files, and AID files with A/V messages that are not present in any workstation. The files and messages are stored in the local cache of each workstation. As a result, each workstation has an up-to-date file of the full discussion.

When the DSOB in the master archive of server 80 is the same as the DSOB in local cache 102 of workstation 90, the two DSOBs are synchronized. Similarly, when the DSOB in the master archive of server 80 is the same as the DSOB in the caches of other workstations, the DSOBs between server 80 and each of the other workstations are synchronized. When the AID A/V files in the master archive of server 80 are the same as the AID A/V files in local cache 102 of workstation 90, the AID A/V files are synchronized. When the AID A/V files in the master archive of server 80 are the same as the AID files in the local caches of any other workstation, those AID A/V files are synchronized.

Figure 6:
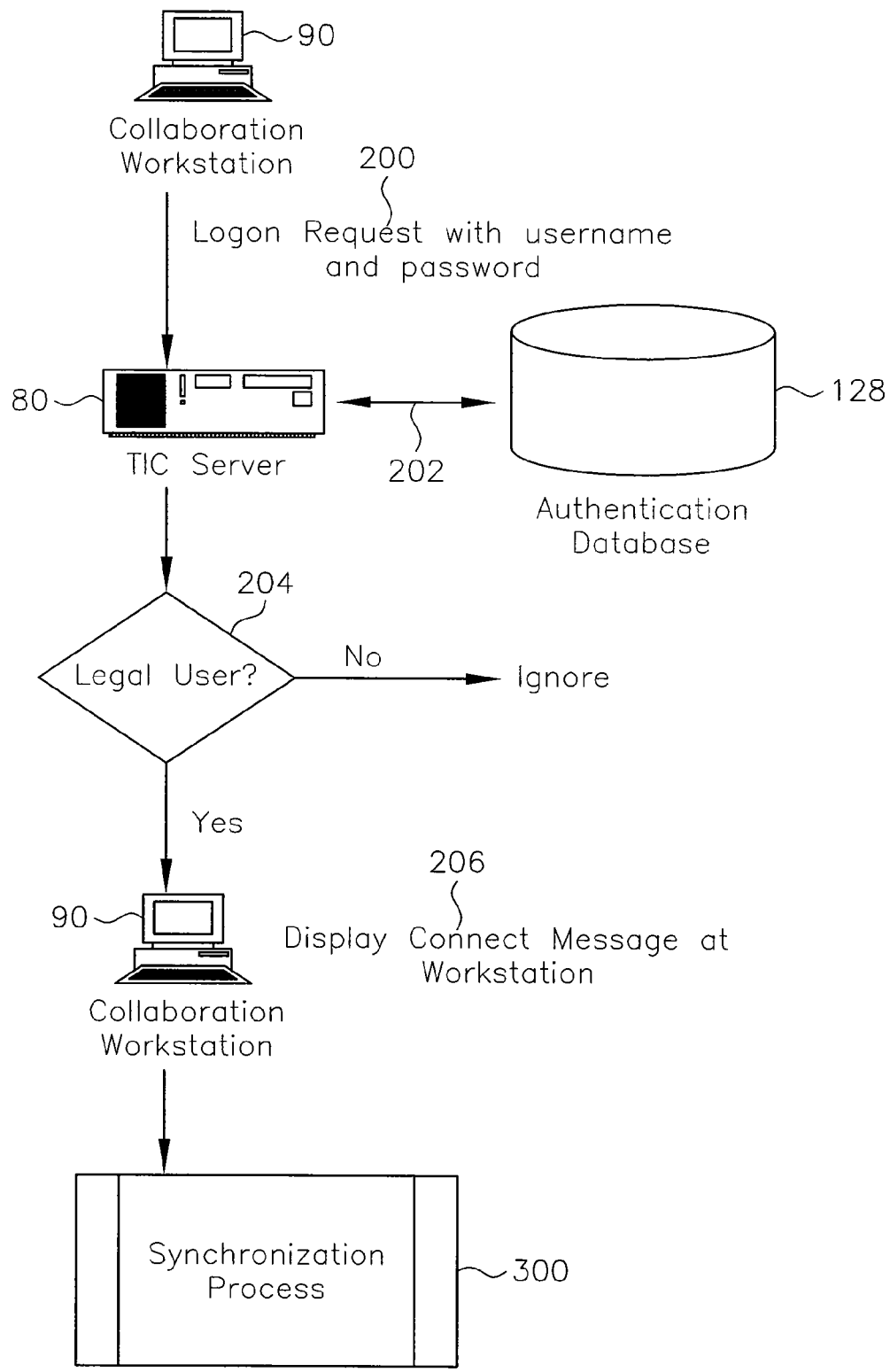
FIG. 6 is a flow chart showing an example of how a workstation logs onto the system to begin the synchronization process according to an exemplary embodiment of the invention.

FIG. 6 is a flow chart illustrating the process of how a workstation logs onto the system to begin the synchronization process in accordance with an exemplary embodiment of the invention. As shown in FIG. 6, a group member at workstation 90 submits a request 200 to log onto server 80 with a username and password. At step 202, server 80 compares the long on information with information contained in an authentication database 128. In step 204, server 80 uses the comparison to determine if the person at workstation 90 is a legal user and proper participant in the discussion. If not, server 80 will not log the person into the system. If the person is a proper participant, step 206 displays a connect message on workstation 90 and synchronization process 300 begins automatically.

FIGS. 7(*a*), 7(*b*), and 7(*c*) together comprise a flow chart illustrating the server synchronization process 300 that occurs between server 80 and workstation 90 according to an exemplary embodiment of the invention. That is, these figures illustrate the process by which server 80 updates its DSOB and related AID files with new DSOB entries and new related AID files from workstation 90. It will be understood that, even though these figures explain the procedure with respect to workstation 90, the same procedure applies to any and all workstations in the collaboration.

In step 302, server 80 first locks out all other communications with all other workstations in the collaboration. The locking out procedure prevents any other workstation from communicating with server 80 until the end of step 300. The purpose of the locking out procedure is to ensure that an update from workstation 90 is unique. The locking out procedure is performed by a computer readable medium having computer software that suspends listening over the communication network for any communication from any workstation other than workstation 90.

In step 304, server 80 sends a request message over the network to workstation 90. The request message requests workstation 90 to send to server 80 the remote DSOB currently residing in its local cache 102. In step 306, workstation 90 sends a copy of the remote DSOB stored in its local cache 102 and it is received by server 80. In step 400, server 80 finds the new AID A/V files that are located in local cache 102 of workstation 90. These files need to be transmitted to server 80. Step 400 is described in detail in connection with FIG. 8.

In step 308, workstation 90 gets the Remote AID Files List that was created in step 400. In step 310, server 80 sends a copy of the list to workstation 90. Step 310 also asks workstation 90 to send the described AID files containing A/V comments to server 80. In step 312, shown in FIG. 7(*b*), server 80 receives a copy of the requested AID A/V files from workstation 90 and, in step 314, archives them in the master archive in storage location 88.

Figure 9:
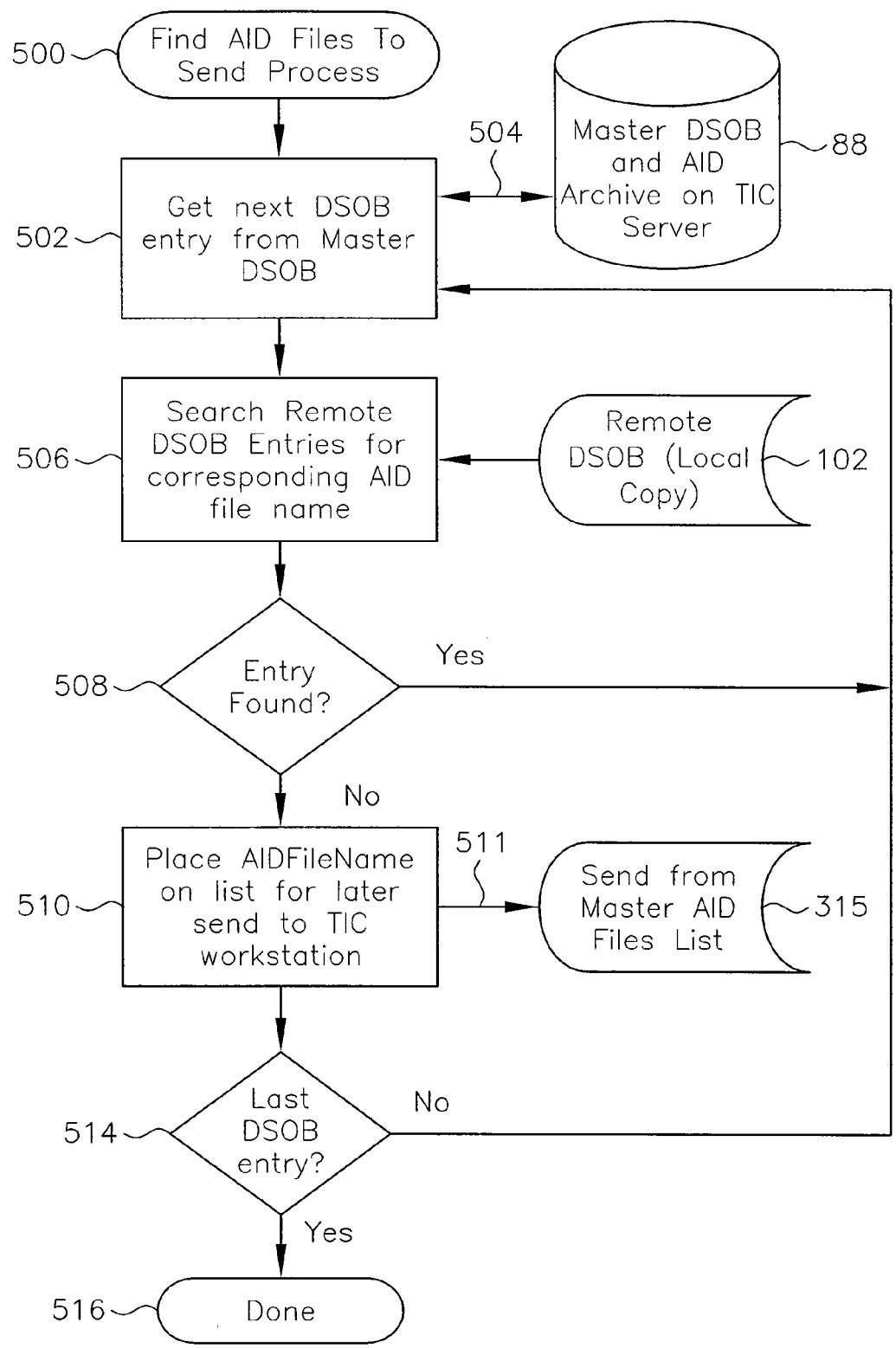
FIG. 9 is a flow chart illustrating the process of finding AID files to send from the server to a remote workstation in accordance with an exemplary embodiment of the invention.

Server 80 then determines in step 500 the AID files containing A/V messages that server 80 has, but which workstation 90 does not have. Step 500 is described in detail in connection with FIG. 9. After the list of AID files is created, as illustrated in FIG. 9, server 80 performs step 316 by sending a message to workstation 90. The message sends the file list created in step 315 to workstation 90 and tells workstation 90 to request the files contained in the list. In step 318, server 80 sends a copy of the AID files containing A/V messages on the list to workstation 90.

In step 600, server 80 updates the pseudo-chronology by merging the DSOB from remote workstation 90 with the current master DSOB on server 80. The merger creates an updated pseudo-chronology in server 80. The process of step 600 is explained in detail in connection with FIGS. 10(*a*) and 10(*b*). After step 600 has been completed, step 320 sends the updated DSOB to workstation 90. This step completes the synchronization between server 80 and workstation 90. In step 322, server 80 unlocks communications with all of the other workstations, thereby enabling communication between server 80 and the other workstations. As a result, this process is done, as indicated in step 324.

Figure 7A:
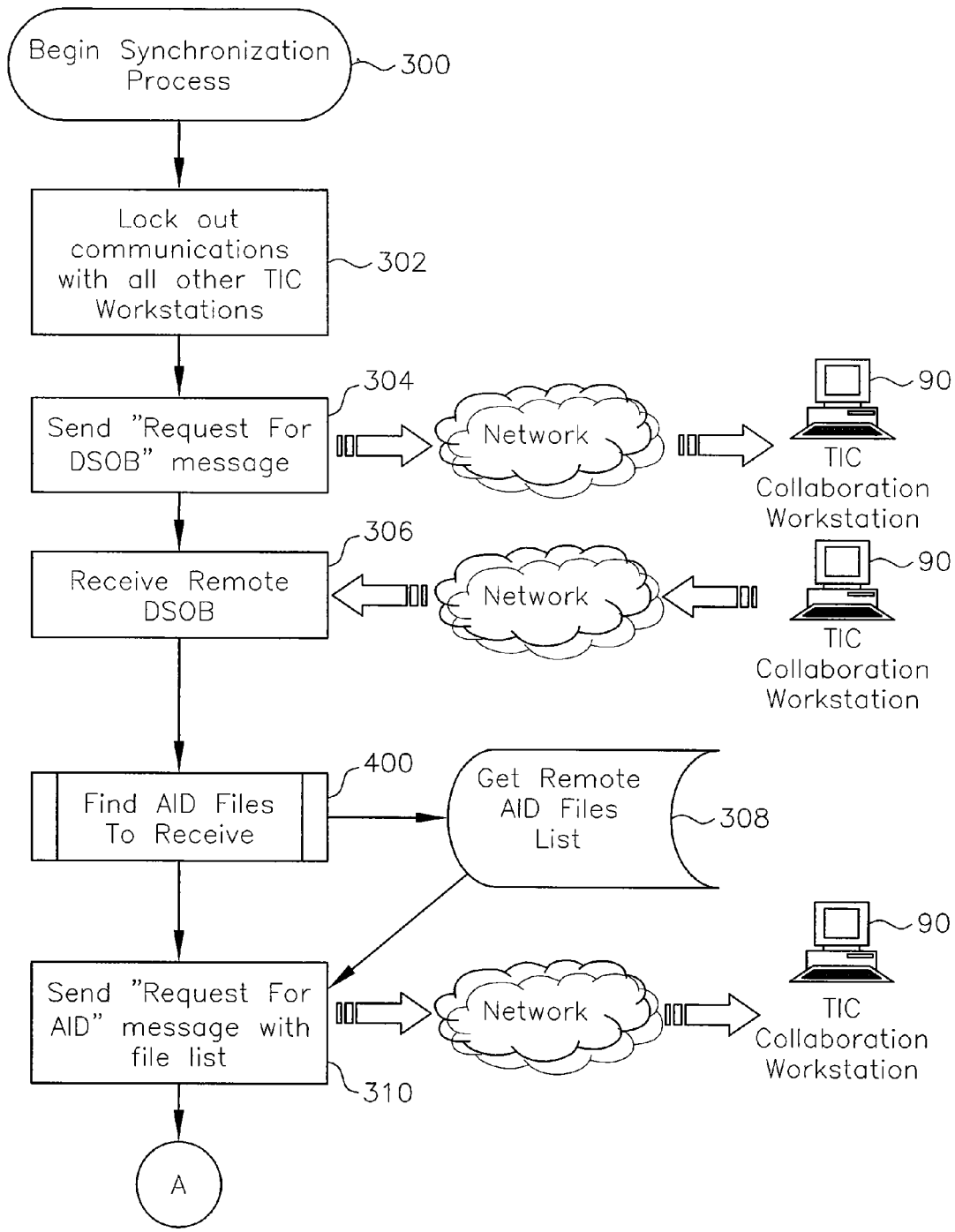
FIG. 7(a) is a segment of a flow chart illustrating the server synchronization process that occurs between a server and a workstation according to an exemplary embodiment of the invention.
Figure 8:
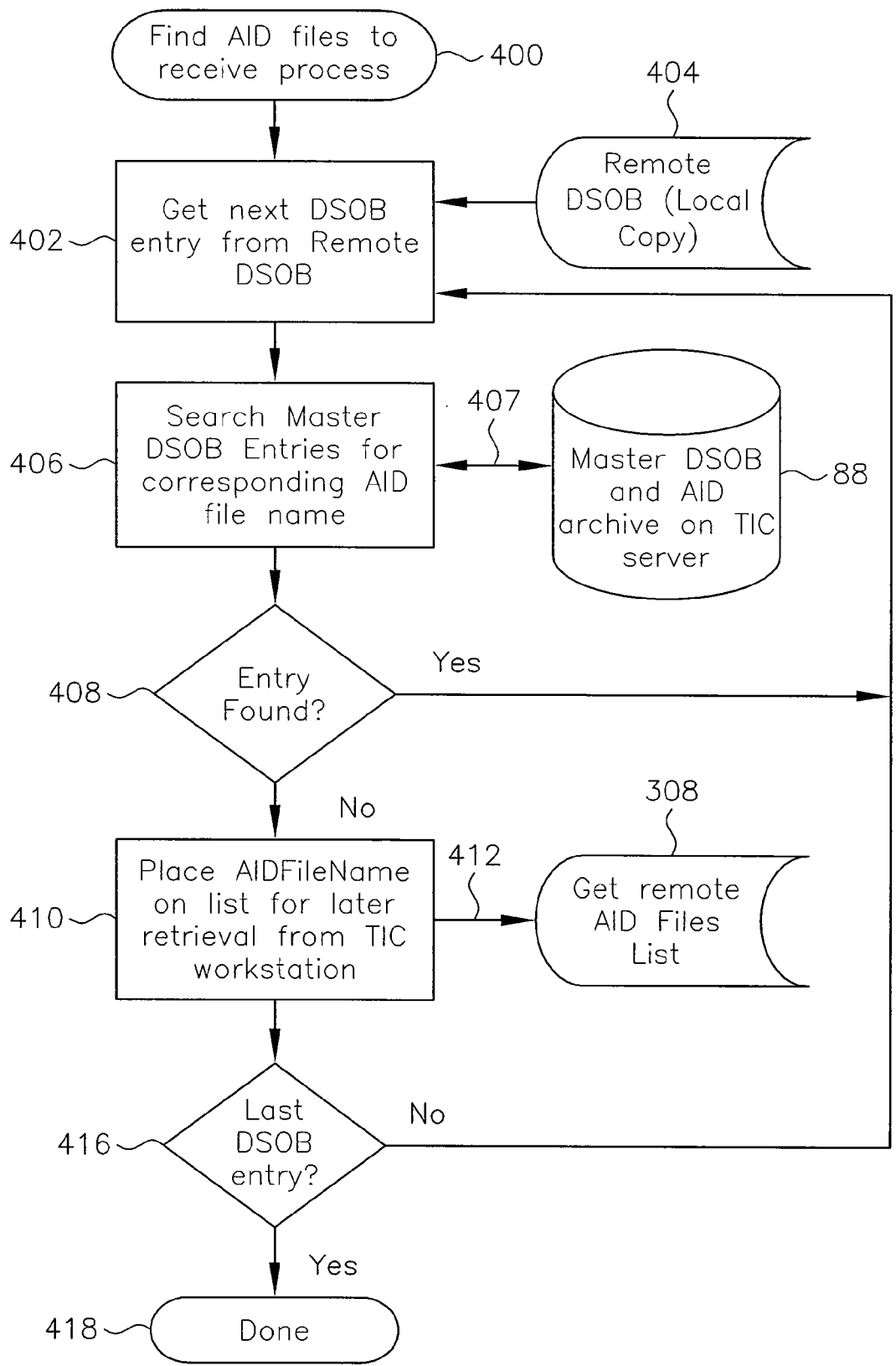
FIG. 8 is a flow chart illustrating the process of finding AID files to be received from a remote workstation according to an exemplary embodiment of the invention.

FIG. 8 is a flow chart illustrating the details of step 400 shown in FIG. 7(a): finding AID files to receive from a remote workstation, in accordance with an exemplary embodiment of the invention. Step 400 determines which AID A/V files have been added to a remote workstation such as workstation 90 and are not in server 80. More particularly, step 400 determines which AID files containing A/V messages have been added to a local cache such as local cache 102 and are not in the master archive in storage location 88 of server 80. This process searches the Remote DSOB; that is, the local DSOB on the workstation that was previously sent to server 80 at the beginning of the synchronization process. A purpose of the search is to find any entries on the Remote-DSOB that are not on the Master DSOB maintained by server 80. A file list of DSOB entries will later be requested by server 80 in order to update the master archive.

Although the following description will describe the relationship among the elements shown in FIG. 4, it will be understood that the description applies to all workstations that may be coupled to server 80 as part of the collaboration. As shown in step 402, server 80 gets a copy of the next DSOB entry from the remote DSOB 404 in local cache 102. Although the term "next" is shown in step 402, it will be understood that "next" may also refer to the "first" DSOB entry in local cache 102. The "next" DSOB entry in local cache 102 has at least one AID file name associated with it. In step 406, synchronizer control 82 in server 80 searches the master archive for DSOB entries having an AID file name that corresponds to the AID file name in the local cache DSOB entry. The search of the master archive is done by comparing the AID file name received from local cache 102 with the AID file names that are stored in the master archive. The comparison is represented by arrow 407.

A determination is made at step 408 as to whether or not the search revealed corresponding AID file names in the master archive and local cache 102. A "Yes" response means that both the master archive in storage location 88 and local cache 102 contain the same AID file name. Accordingly, the AID file containing an A/V message resides in both the master archive and in local cache 102 and need not be uploaded from workstation 90 to server 80. Then, the process returns to step 402 to get the next DSOB entry from the remote DSOB 404 at workstation 90.

On the other hand, if the answer at step 408 is "No," the master archive in storage location 88 does not contain the same AID file name that is contained in remote DSOB 404 in local cache 102. Accordingly, step 410 and arrow 412 show that a copy of the AIDFileName is placed on the "Get Remote AID Files List" 308. "Get Remote AID Files List" 308 is also shown in FIG. 7(a). Step 416 then asks if the AID file most recently stored on Remote AID Files List 308 resulted from the last DSOB entry in remote DSOB 404 of local cache 102. If the answer is "No," the process returns to step 402. If the answer is "Yes," process 400 is done as shown in step 418.

Figure 7B:
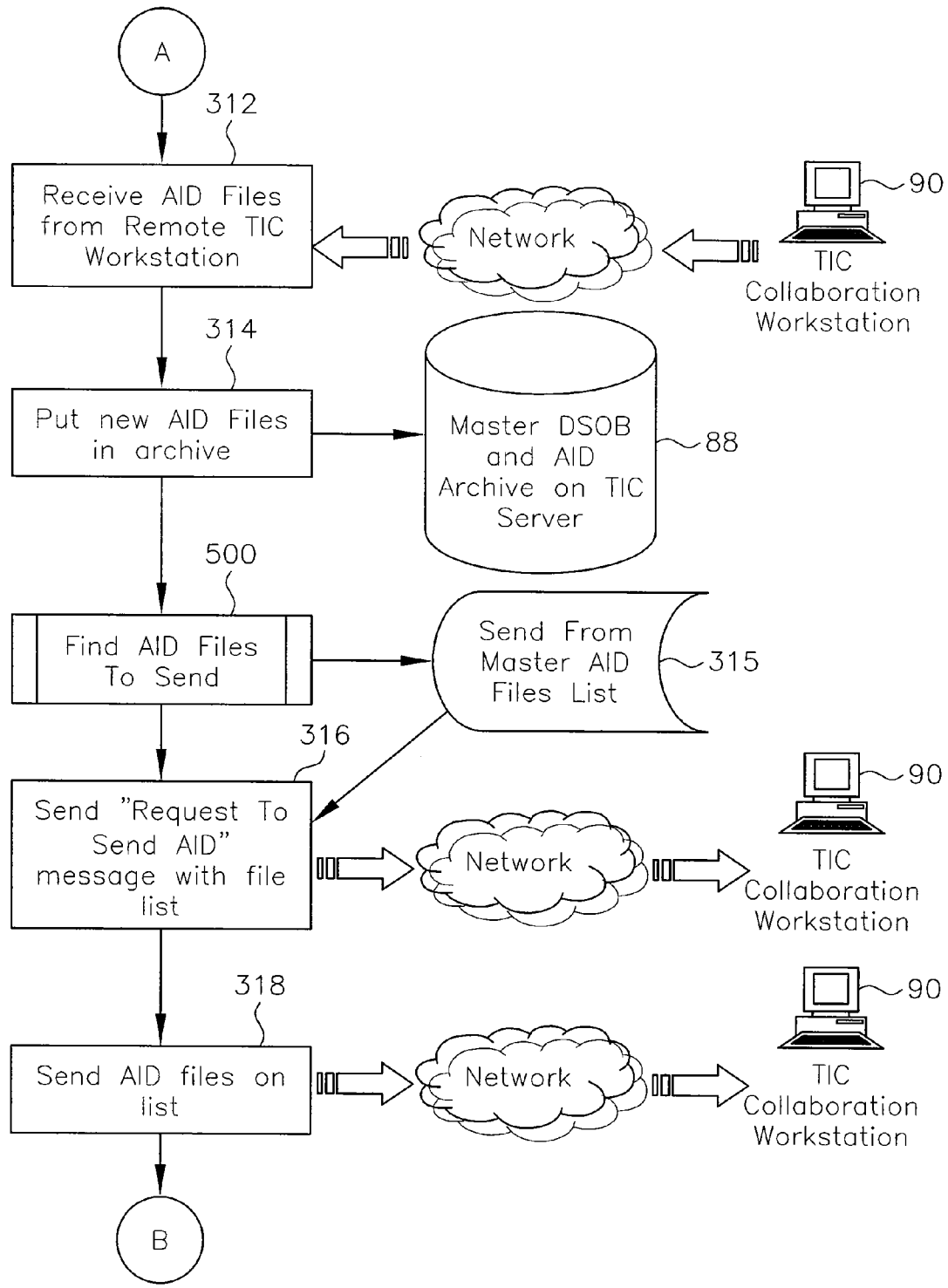
FIG. 7(b) is a continuation of the flow chart illustrated in FIG. 7(a)

FIG. 9 is a flow chart illustrating the details of step 500 shown in FIG. 7(b): finding AID files to send from server 80 to a remote workstation, in accordance with an exemplary embodiment of the invention. Step 500 determines which AID A/V files have been added to server 80 and are not in a remote workstation such as workstation 90. More particularly, step 500 determines which AID files have been added to master archive in storage location 88 of server 80 and are not in a local cache such as local cache 102 of workstation 90. This process searches all server DSOB entries and finds those DSOB entries that exist on the Master DSOB, but which do not exist on the workstation's local DSOB. These files will later be sent to the workstation's cache to update the discussion at the workstation.

Although the following description describes the relationship among the elements of FIG. 4, it will be understood that the description applies to all workstations that may be coupled to server 80 as part of the collaboration. As shown in step 502 and with arrow 504, server 80 gets a copy of the next DSOB entry from the master DSOB. Although the term "next" is shown in step 502, it will be understood that "next" may also refer to the "first". DSOB entry in master archive in storage location 88. The "next" DSOB entry in the master archive has at least one AID file name associated with it. In step 506, synchronizer control 96 in workstation 90 searches local cache 102 for DSOB entries having an AID file name that corresponds to the AID file name in the master archive DSOB entry.

A determination is made at step 508 as to whether or not the search revealed corresponding AID file names in the master archive and local cache 102. A "Yes" response means that both the master archive in storage location 88 and local cache 102 contain the same AID file name. Accordingly, the AID file containing an A/V message resides in both the master archive and in local cache 102 and need not be downloaded from server 80 to workstation 90. Then, the process returns to step 502 to get the next DSOB entry from the master archive at server 80.

On the other hand, if the answer at step 508 is "No," local cache 102 does not contain the same AID file name that is contained in the master archive in storage location 88. Accordingly, step 510 and arrow 511 show that a copy of the AIDFileName is placed on the "Send From Master AID Files List" 315. "Send From Master Aid Files List" 315 is also shown in FIG. 7(b). Step 514 then asks if the AID file most recently stored on List 315 resulted from the last DSOB entry in the master archive. If the answer is "no," the process returns to step 502. If the answer is "Yes," step 500 is done as shown in step 516.

Figure 7C:
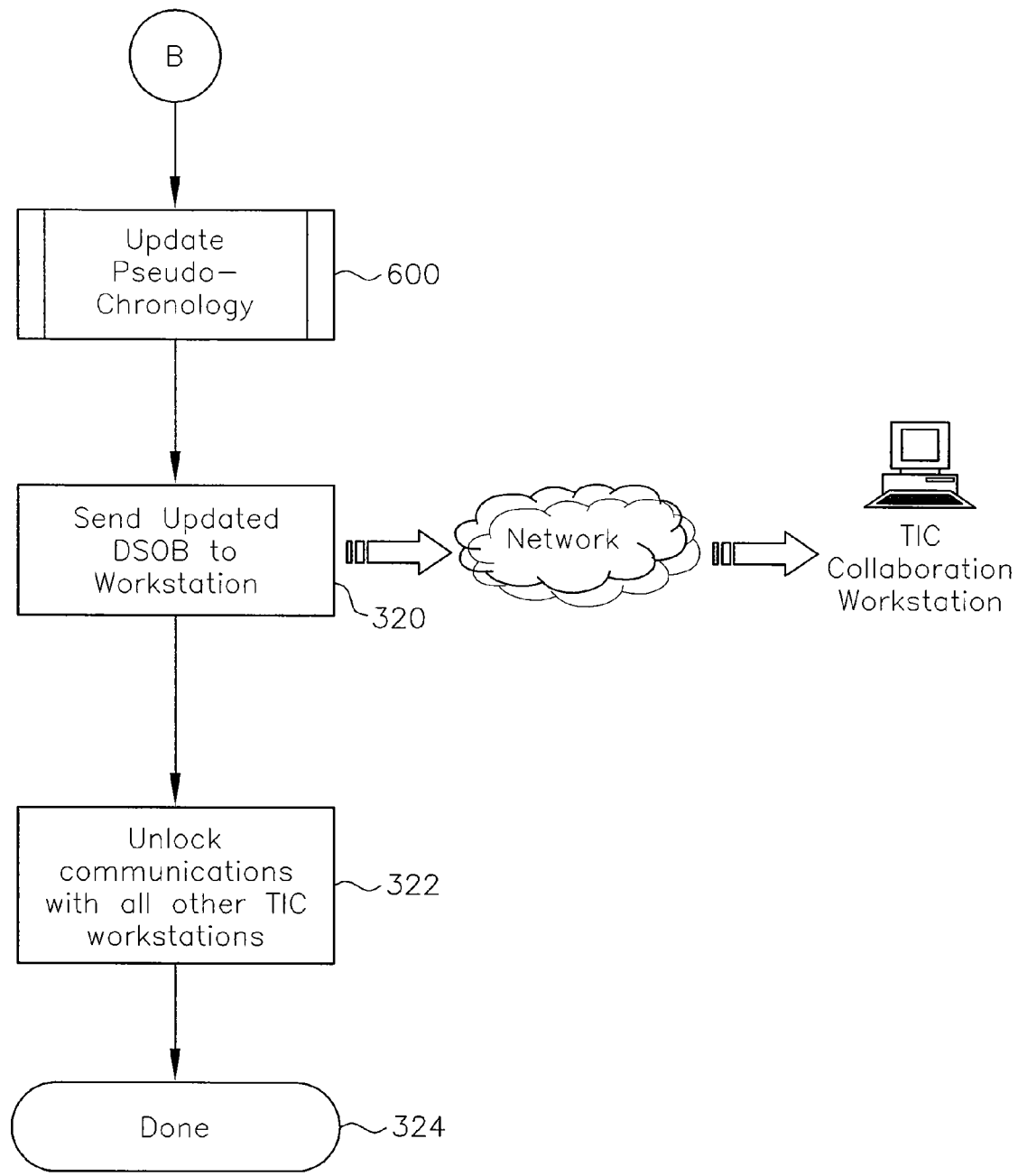
FIG. 7(c) is a further continuation of the flow chart illustrated in FIGS. 7(a) and 7(b)
Figure 10A:
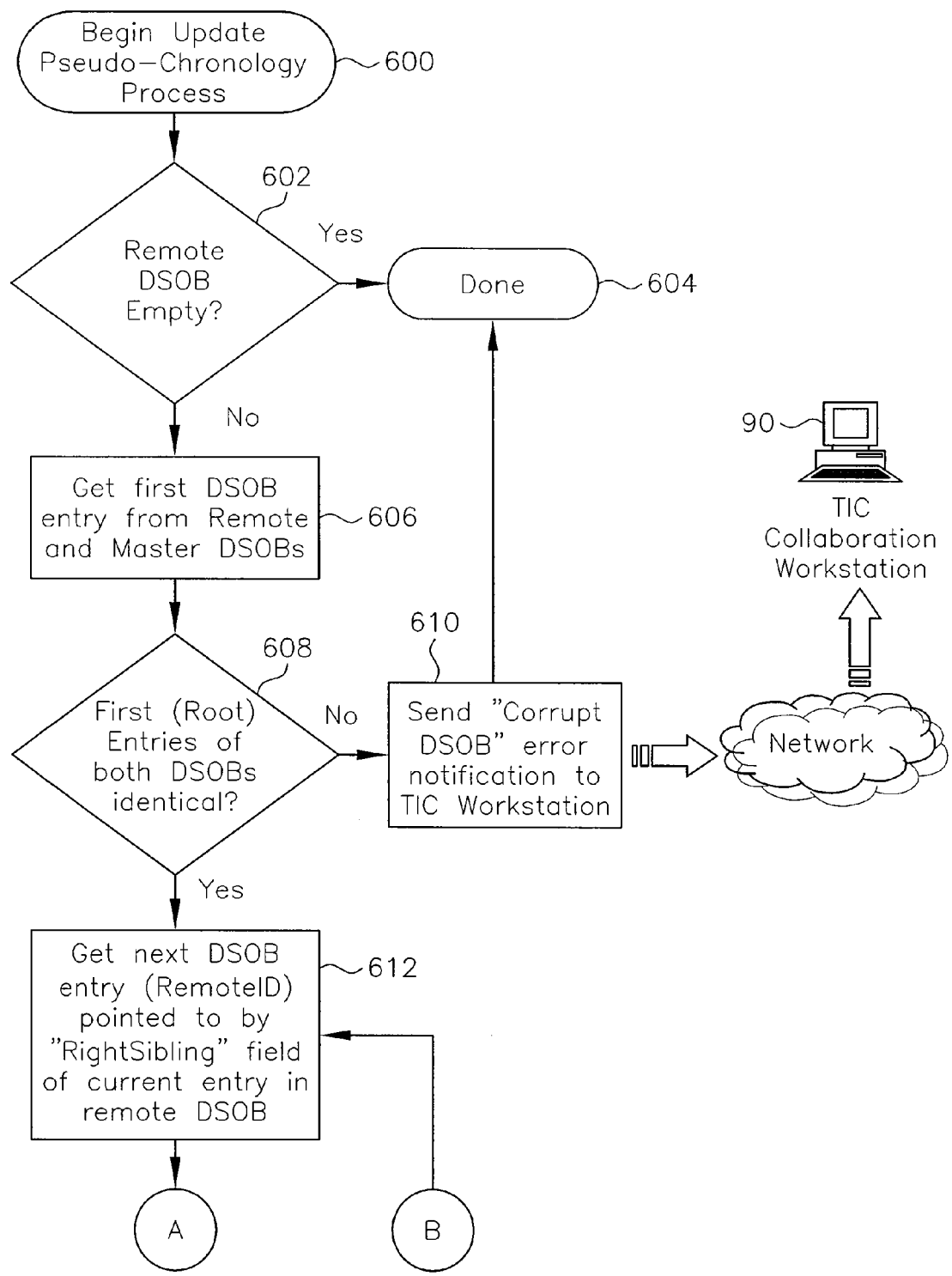
FIG. 10(a) is a flow chart illustrating part of the process of updating the pseudo-chronology at the server according to an exemplary embodiment of the invention.
Figure 10B:
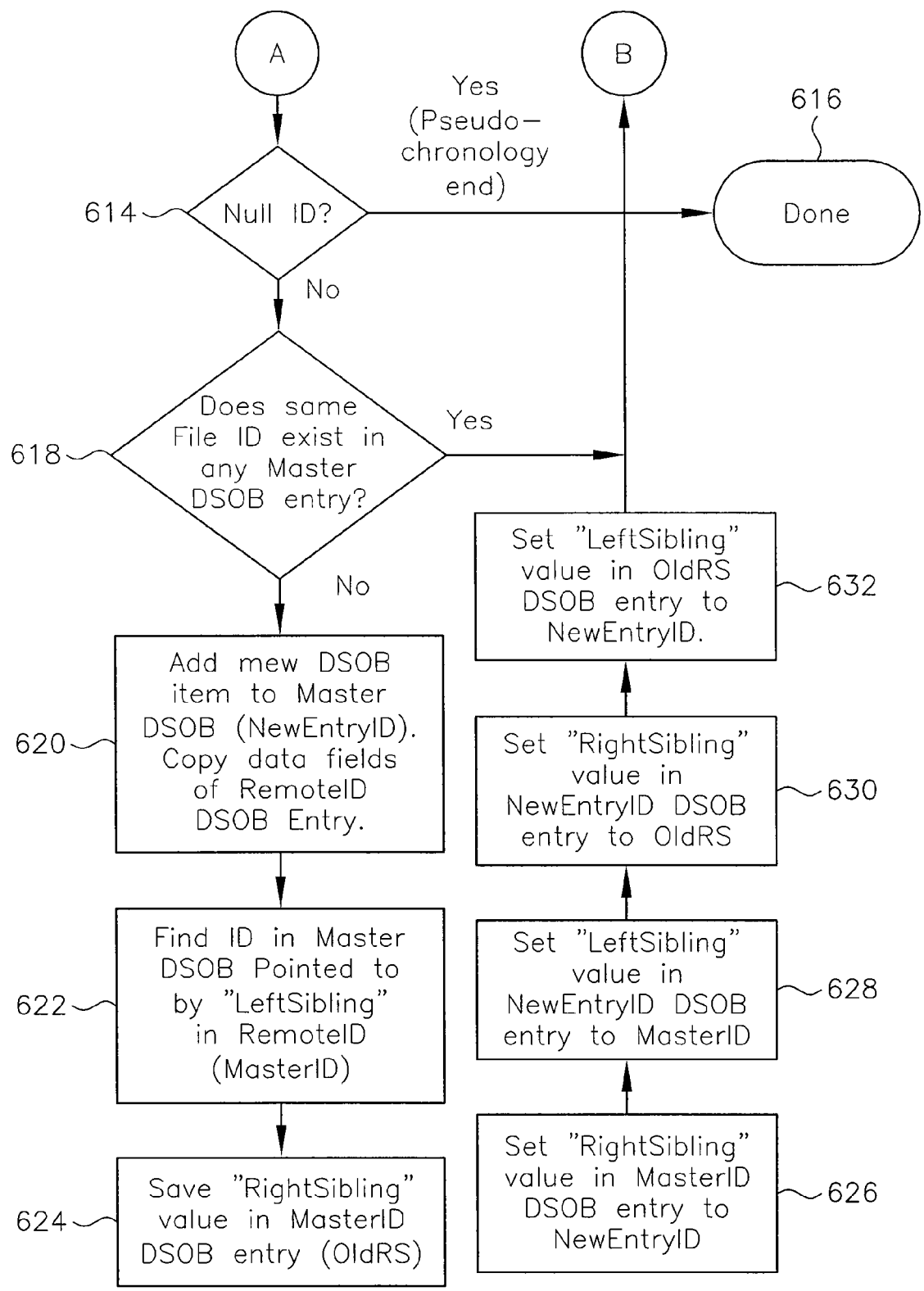
FIG. 10(b) is a flow chart continuing from FIG. 10(a) illustrating the remainder of the process illustrated in FIG. 10(a)

FIGS. 10(a) and 10(b) together comprise a flow chart illustrating the details of step 600 shown in FIG. 7(c), updating the pseudo-chronology at server 80, according to an exemplary embodiment of the invention. More particularly, step 600 organizes AID files containing A/V messages in a way that simulates a synchronous, real-time conversation among the group members. An exemplary embodiment of the process implements the pseudo-chronology by inserting new entries within an existing double-linked list data structure in the Master DSOB. In alternative embodiments of the invention, other methods of implementing the sequencing of AID message files into a pseudo-chronology may be used.

FIGS. 10(c) through 10(i) illustrate an example of how the flow chart in FIGS. 10(a) and 10(b) operates. FIGS. 10(c)-10 (i) are each divided into two columns. The left column of FIGS. 10(c)-10(i) shows an example of three partial DSOB entries for A/V messages A, B, and C which have previously been stored in the master archive in storage location 88. The partial DSOB entry of each message in the master archive has a "LeftSibling" pointer "L" and a "RightSibling" pointer "R." For message A, "LeftSibling" pointer "L" does not point to any prior message because message A is the first (root) message. "RightSibling" pointer "R" of message A points to message B because message B immediately follows message A. "LeftSibling" pointer "L" of message B points to message A because message A immediately precedes message B. "RightSibling" pointer "R" of message B points to message C because message C immediately follows message B. "LeftSibling" pointer "L" of message C points to message B because message B immediately precedes message C. "RightSibling" pointer "R" of message C does not point to anything because there is no message after message C.

The right column of FIG. 10(c) shows an example of four partial DSOB entries for A/V messages A, B, C, and D which have previously been stored in local cache 102. Message D follows message A because the discussion participant recorded A/V message D as a reply to message A. The process of placing message D in this position as a reply to message A is described in connection with FIGS. 16(a) through 16(i).

The partial DSOB entry of each message in the local cache has a "LeftSibling" pointer "L" and a "RightSibling" pointer "R." For message A, "LeftSibling" pointer "L" does not point to any prior message because message A is the first (root) message. "RightSibling" pointer "R" of message A points to message D because message D immediately follows message A. "LeftSibling" pointer "L" of message D points to message A because message A immediately precedes message D. "RightSibling" pointer "R" of message D points to message B because message B immediately follows message D. "LeftSibling" pointer "L" of message B points to message D because message D immediately precedes message B. "RightSibling" pointer "R" of message B points to message C because message C immediately follows message B. "LeftSibling" pointer "L" of message C points to message B because message B immediate precedes message C. "RightSibling" pointer "R" of message C does not point to anything because there is no message after message C. The block diagrams shown in the right-hand "Local" column of FIG. 10(c) are not repeated in FIGS. 10(d)-10(i) because they would be identical.

In step 602, server 80 determines if the remote DSOB in local cache 102 is empty. If the answer to the question in step 602 is "Yes," the process is done, as shown at step 604. If the answer to the question in step 602 is "No," step 606 gets a copy of the first DSOB entry from remote local cache 102 and from the master DSOB in the master archive in storage location 88. In the example shown in FIG. 10(c), the master archive would get a copy of the DSOB for message A in the left column and the local cache would get a copy of the DSOB for message A in the right column.

In step 608, server 80 compares these first (root) entries and asks if the two entries are identical. The purpose of the comparison is to check the remote DSOB for validity. If the answer to the question in step 608 is "no," server 80 sends a "Corrupt DSOB" error notification to the workstation and exits this process. As a result, server 80 will send a copy of the current Master DSOB at step 320 (see FIG. 7(c)) to workstation 90, providing it with a recovered, valid DSOB. If the answer to the question in step 608 is "Yes," it means that the root DSOB entries for the master archive and for the local cache are identical and the process may proceed to step 612.

Step 612 shows that server 80 looks for, and gets, a copy of the next chronological DSOB entry in the remote DSOB of local cache 102 to which the "RightSibling" field of the current entry in the remote DSOB points. Referring to FIG. 10(c), the next chronological entry in the remote DSOB of local cache 102 is the DSOB for message D. That is, the "RightSibling" pointer of message A in local cache 102 points to message D in local cache 102. Step 614 in FIG. 10(b) asks if there is such a next DSOB entry in the remote DSOB. That is, step 614 asks if the "RightSibling" value of message A is "Null." If the answer to the question in step 614 is "Yes," the update with workstation 90 is done, as indicated in step 616. It will be understood that, if Process 600 is done for workstation 90, server 80 may still proceed to perform Process 600 with one or more of the other workstations in the collaboration.

In the example shown in FIG. 10(c), because the "RightSibling" value in message A points to message D, the answer to the question in step 614 is "No." If the answer to the question in step 614 is "No," step 618 asks if the same AID file value in the "RightSibling" pointer of message A in local cache 102 also exists in any DSOB entry in the master archive in storage location 88. A "Yes" answer to this question means that both the master archive and local cache 102 have the same AID file (containing an associated A/V message) in the two DSOBs in the same order and that no changes are required. Consequently, the process loops back to step 612 to get a copy of the next remote DSOB entry.

If the answer to the question in step 618 is "No," a copy of the remote DSOB entry identified in step 612 is added to the master DSOB as a temporary new DSOB entry in step 620. That is, a copy of the DSOB of message D in local cache 102 is added to the master DSOB in the master archive as a temporary new DSOB. This step is shown in FIG. 10(d). Although the temporary new DSOB entry contains a copy of all of the fields from the remote DSOB for message D, only the fields for the "LeftSibling" and "RightSibling" pointers are shown for simplicity. Accordingly, FIG. 10(d) shows that the master archive contains messages A, B, and C in their chronological order as well as a copy of the DSOB of message D in a temporary location. The "RightSibling" and "LeftSibling" fields of message D do not yet have any values.

In step 622, the master archive searches the master DSOB for the ID of the AID file to which the "LeftSibling" of the copied DSOB entry points. Referring to FIG. 10(d), the "LeftSibling" pointer of the DSOB of message D in local cache 102 points to message A. Therefore, step 622 searches for, and finds, message A in the master archive.

In step 624, the "RightSibling" value in message A continues to point to message B. This "RightSibling" value is maintained and a copy of the "RightSibling" value is put into a temporary variable field called OldRS that is used later. For a brief period of time, therefore, the DSOB of message A in the master archive has two copies of its "RightSibling" value, each of which points to message B. The presence of both the "RightSibling" value and the temporary OldRS "RightSibling" value in the master archive is illustrated in FIG. 10(e).

In step 626, the "RightSibling" value of message A is changed from message B to message D. This is illustrated in FIG. 10(f). In step 628, the "LeftSibling" value of message D in the master archive is set to message A so that the "LeftSibling" of message D points to message A. This step is illustrated in FIG. 10(g).

Figures 10H, 10I:
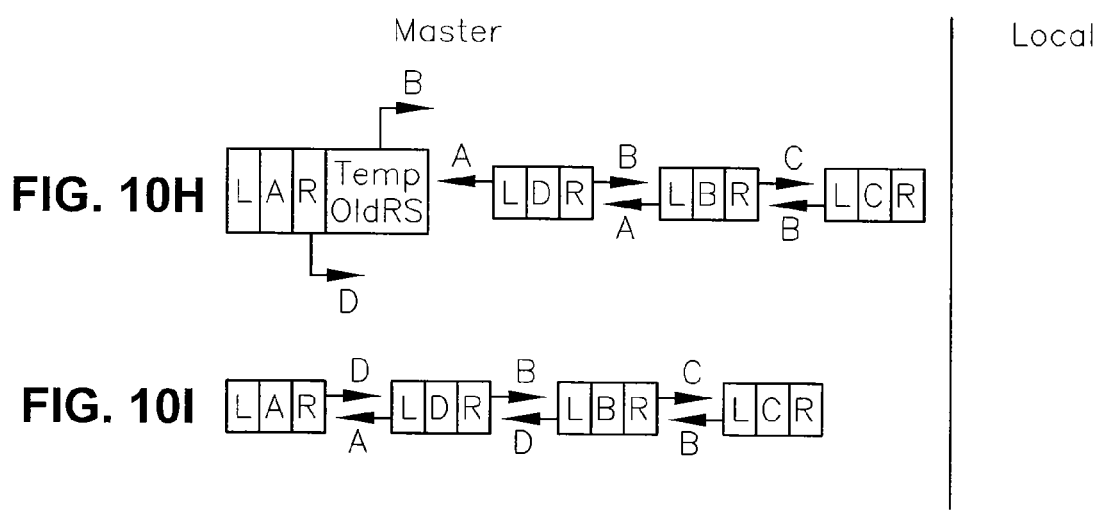

In step 630, the "RightSibling" value of message D is set at the message to which Temporary OldRS is pointing: message B. When step 626 has been completed, the "LeftSibling" value of message D points to message A and the "RightSibling" value of message D points to message B. As a result, message D is now placed in its proper place into a second pseudo-chronology placing message D between messages A and B. This step is illustrated in FIG. 10(h).

In step 632, the "LeftSibling" value of the message to which Temporary OldRS is pointing, message B, is changed to message D. Consequently, the "LeftSibling" of message B now points to message D. At this point in time, the Temporary OldRS is deleted because it is no longer needed. This step is illustrated in FIG. 10(i). At this point, message A is immediately followed by message D, which is immediately followed by message B, which, in turn, is immediately followed by message C.

When Process 600 has been completed, the master DSOB in server 80 contains message D in the proper pseudo-chronology and also has in the proper pseudo-chronology any other updates that may be present in workstation 90. As each workstation logs onto the collaboration system, server 80 completes Process 600 with each workstation, thereby updating its master DSOB in a new pseudo-chronology with the updated information from each workstation. Therefore, the master DSOB in server 80 contains updates from all workstations that have logged on. Accordingly, when a copy of the master DSOB is sent to each workstation, the workstation will have copies of the updated DSOB and updated AID files containing updated A/V messages in the updated pseudo-chronological order.

FIGS. 11(*a*) and 11(*b*) together comprise a flow chart illustrating an exemplary process of using a workstation according to an exemplary embodiment of the invention. In FIG. 11(*a*), the process is identified as starting a TIC workstation program 1000. It will be understood that, even though only one workstation is described in FIGS. 11(*a*) and 11(*b*), the process is applicable to all of the workstations that may be participating in the collaboration. Similarly, with respect to all figures that refer to a workstation, it will be understood that the figures, devices, and processes are applicable to all workstations in the collaboration.

At step 1002, a user of the workstation who is a group member of the collaboration may request to be logged onto the system in order to participate in the collaboration. At step 1004, the workstation asks if the user has requested to log onto the system. It the answer is "Yes," Workstation LogOn Process 1100 is initiated. Step 1100 is described in detail in FIG. 12.

At step 1006, the workstation asks if the user has requested to update the synchronization at the workstation. If the answer is "yes," the Workstation Update Process 1200 is initiated. Step 1200 is described in detail in FIG. 17. At step 1008, the workstation asks if the user has requested to playback comments. If the answer is "Yes," the Playback Discussion Process 1300 is initiated. Step 1300 is described in detail in FIG. 15.

At step 1009, the workstation asks if the user has requested to Record a Reply. If the answer is "Yes," the Record Reply Process 1600 is initiated. Step 1600 is described in detail in FIGS. 16(*a*)-16(*i*). At step 1010, the workstation asks if the user has requested to log off of the system. If the answer is "Yes," the Workstation LogOff Process 1700 is initiated. Step 1700 is described in detail in FIG. 18. It will be understood that after Workstation LogOn Process 1100 is completed, the user may initiate any one, or none, of decision steps 1006, 1008, 1009, and 1010, at the user's discretion.

Figure 12:
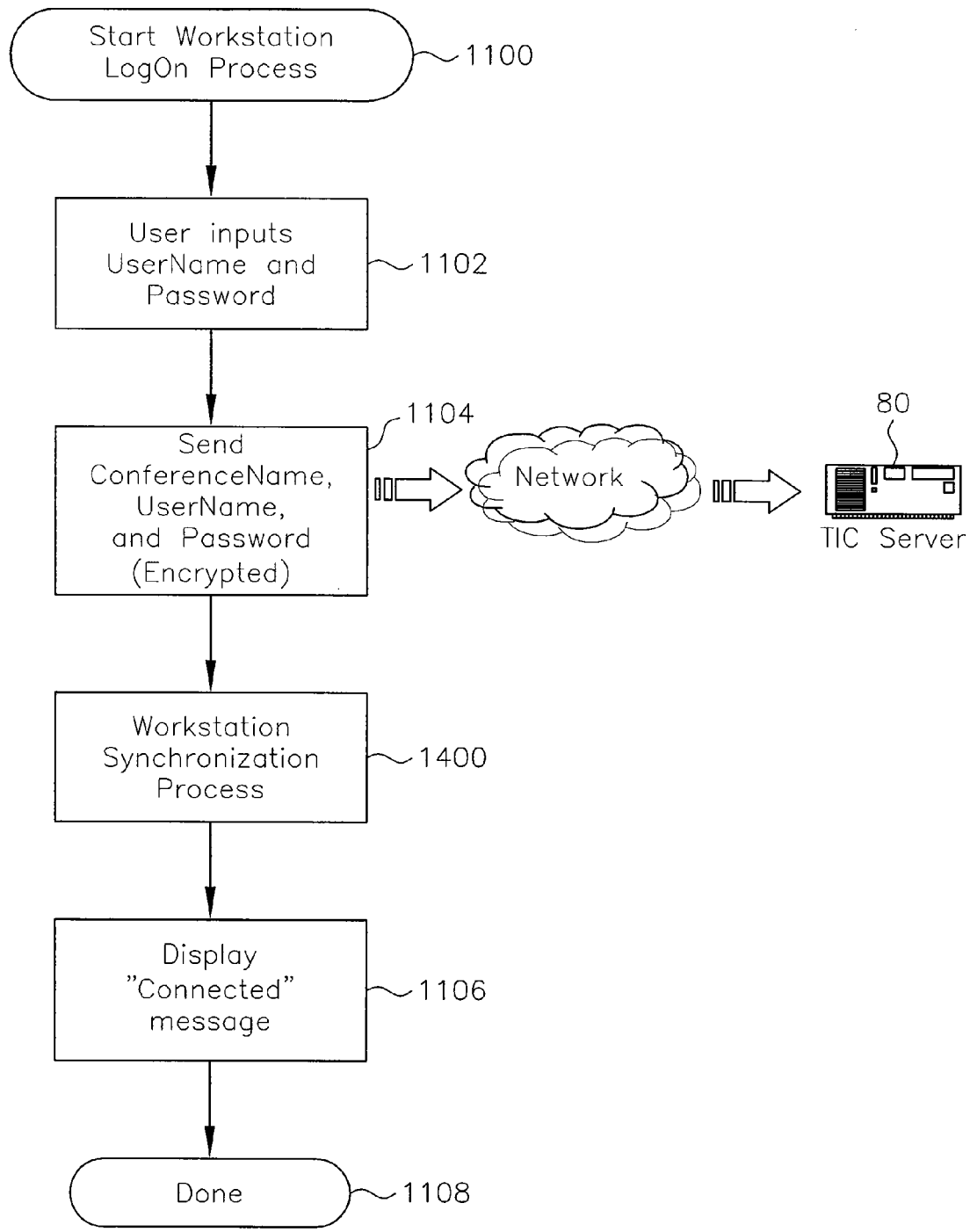
FIG. 12 is a flow chart illustrating the Workstation LogOn Process according to an exemplary embodiment of the invention.

FIG. 12 is a flow chart illustrating the Workstation LogOn Process according to an exemplary embodiment of the invention. At step 1102, the user inputs a UserName and Password. Inputting UserName and Password requests a "Connect" to server 80 to be initiated. The workstation retrieves the Conference Name from the workstation's local settings, requests the UserName and Password from the user, and encrypts them. At step 1104, the workstation sends the encrypted conference name, UserName and Password over a network connection to server 80.

The network connection for this connection or for any other network connection in an exemplary embodiment of this invention may be over a LAN, an Ethernet, or a global information network such as the Internet. It will be understood that all references to a network in any figure in this disclosure refer to any such network connection or any network connection mentioned elsewhere in this disclosure. If server 80 accepts the information it receives as a result of step 1104, server 80 automatically initiates the Workstation Synchronization Process at step 1400, which ensures that the user has the most current version of the full discussion. At the end of Workstation Synchronization Process 1400, a "connected" message 1106 is displayed at the workstation. After message 1106 is displayed, Workstation LogOn Process is indicated as being completed at step 1108.

FIGS. 13(*a*) and 13(*b*) together comprise a flow chart illustrating the Workstation Synchronization Process Step 1400 according to an exemplary embodiment of the invention. Workstation Synchronization Process Step 1400 is also shown in FIG. 12. At step 1402, Workstation Synchronization Process 1400 asks if the workstation is logged onto the server. If the answer is "No," it means that the user may be working off-line and Workstation Synchronization Process 1400 terminates at step 1404. If the answer is "Yes," workstation 90 receives over a network, at step 1406, a message from server 80 requesting the current DSOB that is stored in the workstation local cache 102. In response, at step 1408, the workstation sends a copy of its current DSOB to server 80 over the network. The DSOB of the workstation may be referred to as a local DSOB.

After server 80 receives the local DSOB from workstation 90, the workstation receives from server 80 at step 1410 a "Request for AID" message. This request is sent by server 80 to the workstation over the network. The message at step 1410 asks the workstation to send the AID files that server 80 has listed on a list. Server 90 has previously prepared the list by comparing the local DSOB with the master DSOB at server 80. This comparing process was previously described in connection with FIGS. 7(*b*) and 8.

After the workstation receives the list of requested AID files, step 1412 sends a copy of the requested AID files on the list to server 80 over the network. The AID files containing the A/V messages are simultaneously sent from the workstation to server 80. When server 80 receives the requested AID files and related A/V messages, server 80 subsequently updates its master DSOB in the master archive as previously described in connection with FIGS. 10(*a*)-10(*c*) to organize these files in pseudo-chronological sequence.

At step 1414, the workstation receives a message from server 80 that server 80 will be sending AID files containing A/V messages that server 80 has received from other workstations. The message at step 1414 also informs the workstation that the files will also be listed on a file list. The process of server 80 receiving messages from other workstations has been described previously in connection with FIGS. 7(*b*) and 9.

At step 1416, server 80 receives a copy of the AID files containing A/V messages that server 80 had received from other workstations. At step 1418, the workstation receives from server 80 a copy of an updated DSOB from server 80 in pseudo-chronological order. The process followed by server 80 for updating the DSOB has been described previously in connection with FIGS. 7(*a*) and 10. In step 1420, workstation 90 saves the updated DSOB and newly received AID files containing A/V messages in its local cache 102. At step 1500, workstation 90 displays the A/V messages in the updated pseudo-chronology. Step 1422 indicates that the workstation synchronization process 1400 has been completed.

Figure 14:
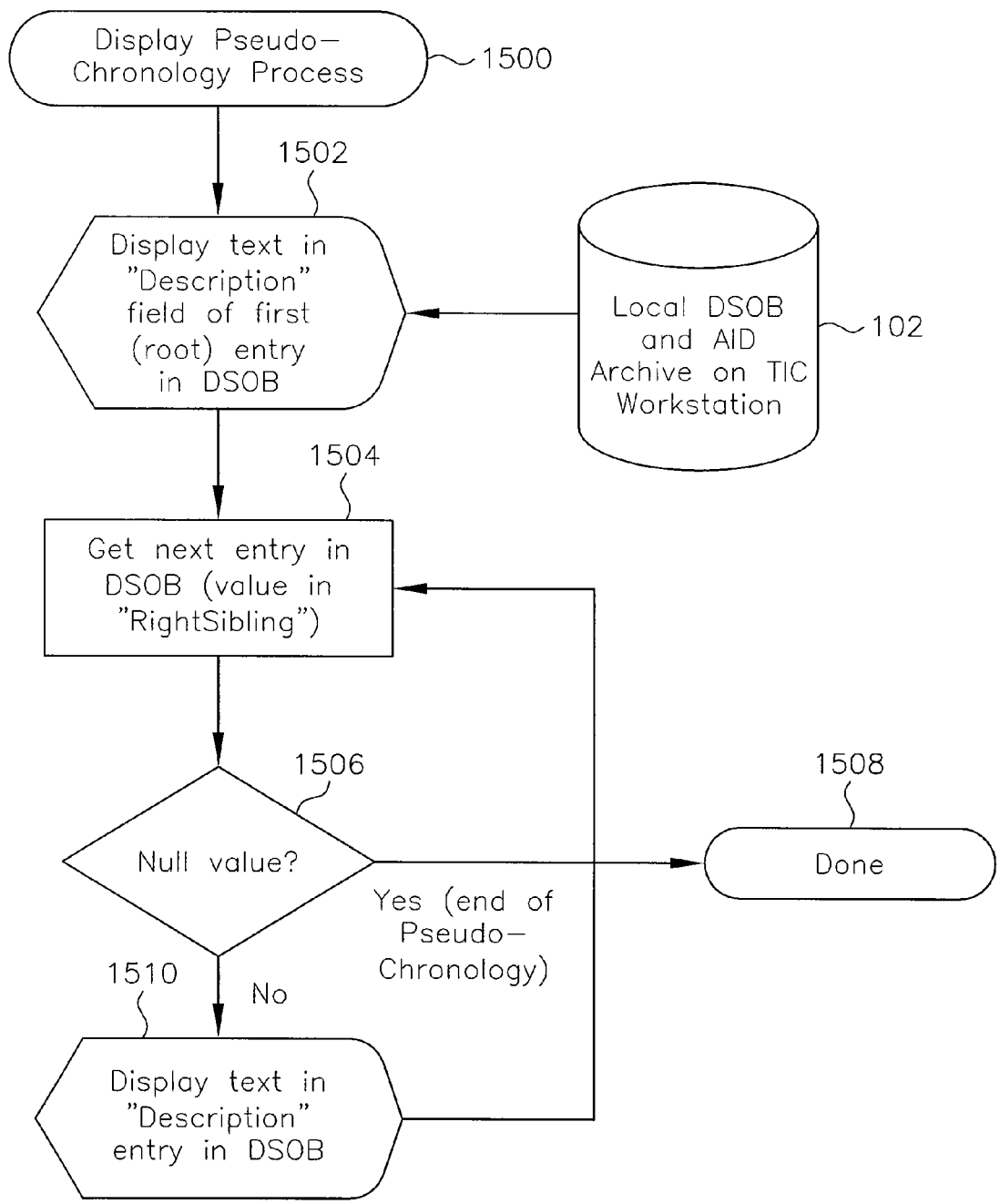
FIG. 14 is a flow chart illustrating the Display Pseudo-Chronology Process according to an exemplary embodiment of the invention.

FIG. 14 is a flow chart illustrating the Display Pseudo-Chronology Process at step 1500. An exemplary embodiment of the process of the invention implements the pseudo-chronology by traversing entries within an existing double-linked list data structure in the local DSOB. Other methods of implementing the sequencing of AID message files into a pseudo-chronology in alternative embodiments of the invention may be used.

Step 1500 is also shown in FIG. 13(*b*). Referring back to FIG. 5, one of the fields of the DSOB is a "Description" field. The description field is a text field entered by a discussion participant when the participant created the A/V message contained in the AID file. Now referring again to FIG. 14, in step 1502, workstation 90 displays the text in the "Description" field of the first (root) entry in the DSOB that has been stored in local cache 102. In step 1504, workstation 90 goes to the next entry in the local DSOB stored in local cache 102. The next entry is identified as the value in the "RightSibling."

Step 1506 asks if there is, in fact, a next entry in the RightSibling. If there is no subsequent AID file (a null value) and related A/V file, the answer to step 1506 is "Yes," which signals the end of the pseudo-chronology and an end of the displayed text as indicated in step 1508. If the answer to step 1506 is "No," however, step 1510 displays the text of the Description of the entry identified in step 1504. After step 1510, the process loops back to step 1504. Thus, by following the "RightSibling" link, step 1500 continues to get DSOB entries from local cache 102 and to display them in the pseudo-chronological order defined in the DSOB until all of the local entries have been displayed and the process is done, as illustrated at step 1508. An example of the display is shown in FIG. 22.

Figure 15:
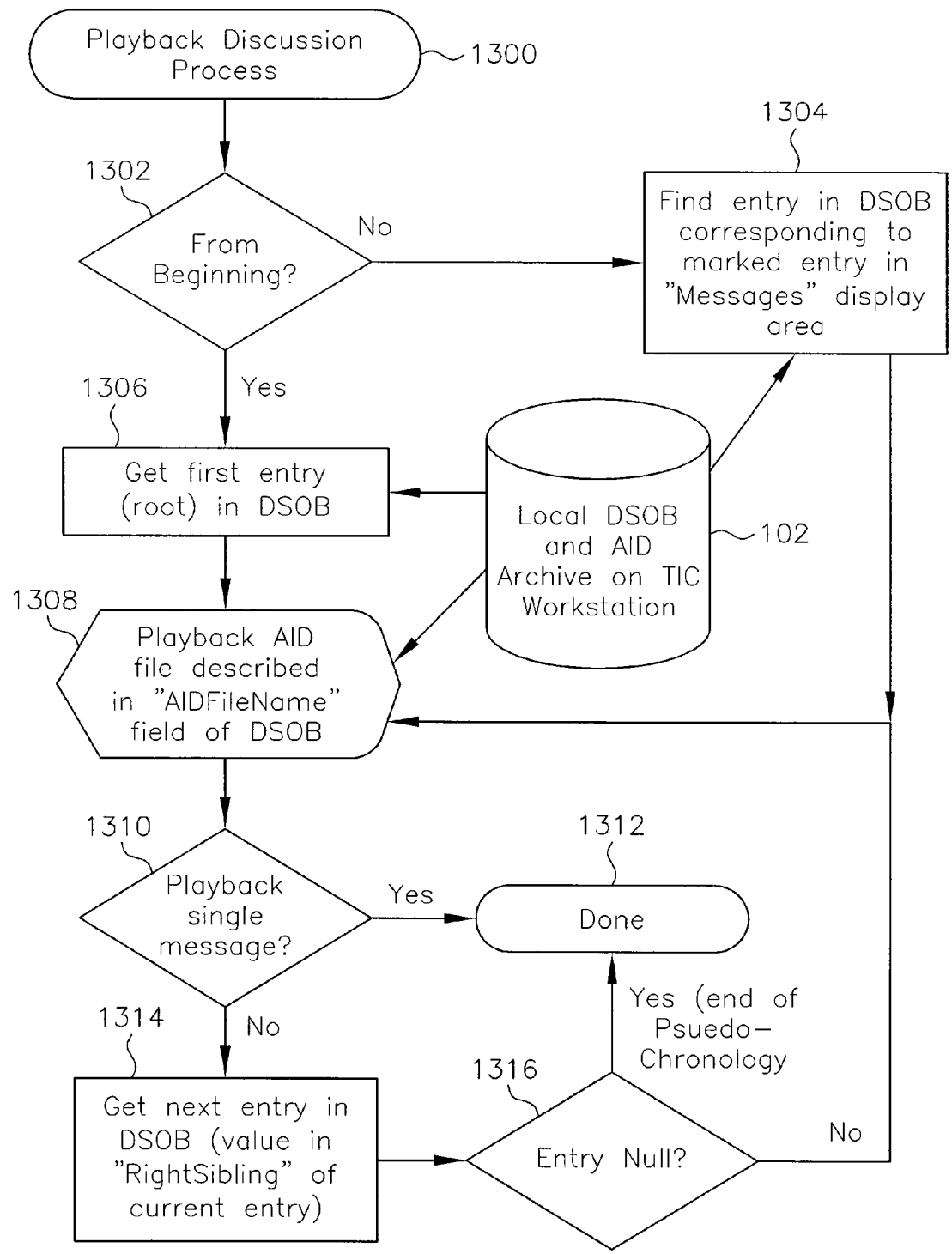
FIG. 15 is a flow chart illustrating the Playback Discussion Process according to an exemplary embodiment of the invention.

FIG. 15 is a flow chart illustrating the Playback Discussion Process 1300 according to an exemplary embodiment of the invention. In an exemplary embodiment of the invention, the described process implements the pseudo-chronology by traversing entries within an existing double-linked list data structure in the local DSOB. Other methods of implementing the sequencing of AID message files into a pseudo-chronology in alternative embodiments of the invention may be used.

Step 1300 is also shown in FIG. 11(*a*). This flow chart describes how a group member may play back one or more of the A/V files stored in workstation 90. At step 1302, the user decides whether to play all of the A/V messages from the first message through the end message. If the answer to this question is "No," in step 1304, the user marks an entry in the "Message" column of the display. An example of entries in the "Message" column is shown in FIG. 22. After the entry is marked, the workstation finds the DSOB of the marked entry in the local cache. Then, as indicated in step 1308, the A/V message associated with the "AIDFileName" field of the entry in the DSOB is played.

If the answer to the question in step 1302 is "Yes," step 1306 retrieves a copy of the first (root) entry in the DSOB stored in local cache 102 and workstation 90 plays the entry as indicated in step 1308. After workstation 90 plays the first or first marked entry, if the user double-clicked on the "Message" column of the display, requesting only a single message, the program determines that only the single message should be played back, as shown in step 1310. If the answer to the question in step 1310 is "Yes," the process proceeds to step 1312 and is done, as shown at step 1312. If, however, the answer to the question in step 1310 is "No," step 1314 gets a copy of the next entry in the local DSOB in local cache 102 by going to the value of the "RightSibling" of the current entry.

In step 1316, workstation 90 asks if the entry in the "RightSibling" is Null. If the answer to the question in step 1316 is "Yes," the answer signals the end of the pseudo-chronology and process 1300 is done, as shown in step 1312. If the answer to the question in Step 1316 is "No," however, the process loops around to step 1308 until all of the desired entries have been played. When all of the desired entries have been played, the answer to the question is step 1316 will be "Yes" and process 1300 will end.

FIGS. 16(*a*) and 16(*b*) together comprise a flow chart illustrating the Record Reply Process 1600 shown in FIG. 11(*b*) according to an exemplary embodiment of the invention. In an exemplary embodiment of the invention, the described process implements the pseudo-chronology by inserting new entries within an existing double-linked list data structure in the local DSOB. Other methods of implementing the sequencing of AID message files into a pseudo-chronology in alternative embodiments of the invention may be used.

Figure 27:
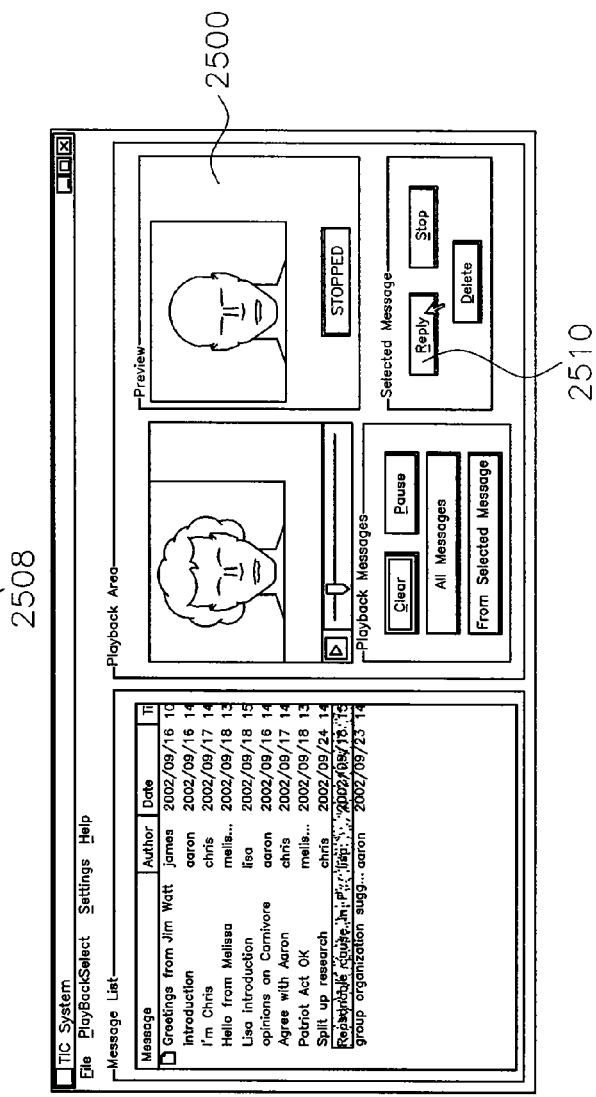
FIG. 27 is another illustration of a screen and an interface of a workstation in accordance with an exemplary embodiment of the invention.

FIGS. 16(*c*) through 16(*i*) illustrate an example of how the flow chart in FIGS. 16(*a*) and 16(*b*) operates. In step 1602, the user who is a group member of the collaboration may initiate step 1600 by selecting (clicking on) a message from any location in the pseudo-chronology displayed in the "Messages" section of the display. An example of a messages section is shown in FIG. 22. After the message is selected, the user may click on the "Reply" button on the workstation interface. An exemplary embodiment of the interface showing a "Reply" button is shown in FIG. 27. By clicking on the "Reply" button, the user starts the process beginning at step 1604.

FIG. 16(*c*) shows an example of three partial DSOB entries for A/V messages A, B, and C which have previously been stored in local cache 102. In FIG. 16(*c*), message A is first, message B immediately follows message A, and message C immediately follows message B. The partial DSOB entry of each message has a "LeftSibling" pointer "L" and a "RightSibling" pointer "R." For message A, "LeftSibling" pointer L does not point to any prior message because message A is the first (root) message. "RightSibling" pointer "R" of message A points to message B because message B immediately follows message A. "LeftSibling" "L" of message B points to message A because message A immediately precedes message B. "RightSibling" pointer "R" of message B points to message C because message C immediately follows message B. "LeftSibling" "L" of message C points to message B because message B immediately precedes message C.

The following examples are included to more clearly demonstrate the overall nature of the invention. These examples are exemplary, not restrictive, of the invention. For purposes of illustration, the user has decided to reply to message A with a reply message, which is labeled as message D. Therefore, an object of the pseudo-chronology is to insert message D so that it immediately follows message A and immediately precedes message B. When the user clicks the description of message A in the display and then clicks on the "Reply" button in the interface, the process proceeds with step 1604. In step 1604, the "RightSibling" value of message A is maintained and a copy of the "RightSibling" value is put into a temporary variable field called OldRS. For a brief period of time, therefore, the DSOB of message A in the local cache has two copies of its "RightSibling" value, each of which points to message B. The presence of both the "RightSibling" value and the temporary OldRS "RightSibling" value is illustrated in FIG. 16(*d*).

In step 1606, a new DSOB entry for the new message, message D, is created. The creation of the new DSOB entry is illustrated in FIG. 16(*e*). The new DSOB entry is not inserted into any particular location at this point because no values have been placed into its "RightSibling" and "LeftSibling" fields. In step 1608, the AID file that is to associated with A/V message D is given a unique value as defined in the "AID- FileName" field described in row 110 of FIG. 5. The "AID-FileName" is set in the DSOB for the A/V message D that is about to be created.

Figure 16A:
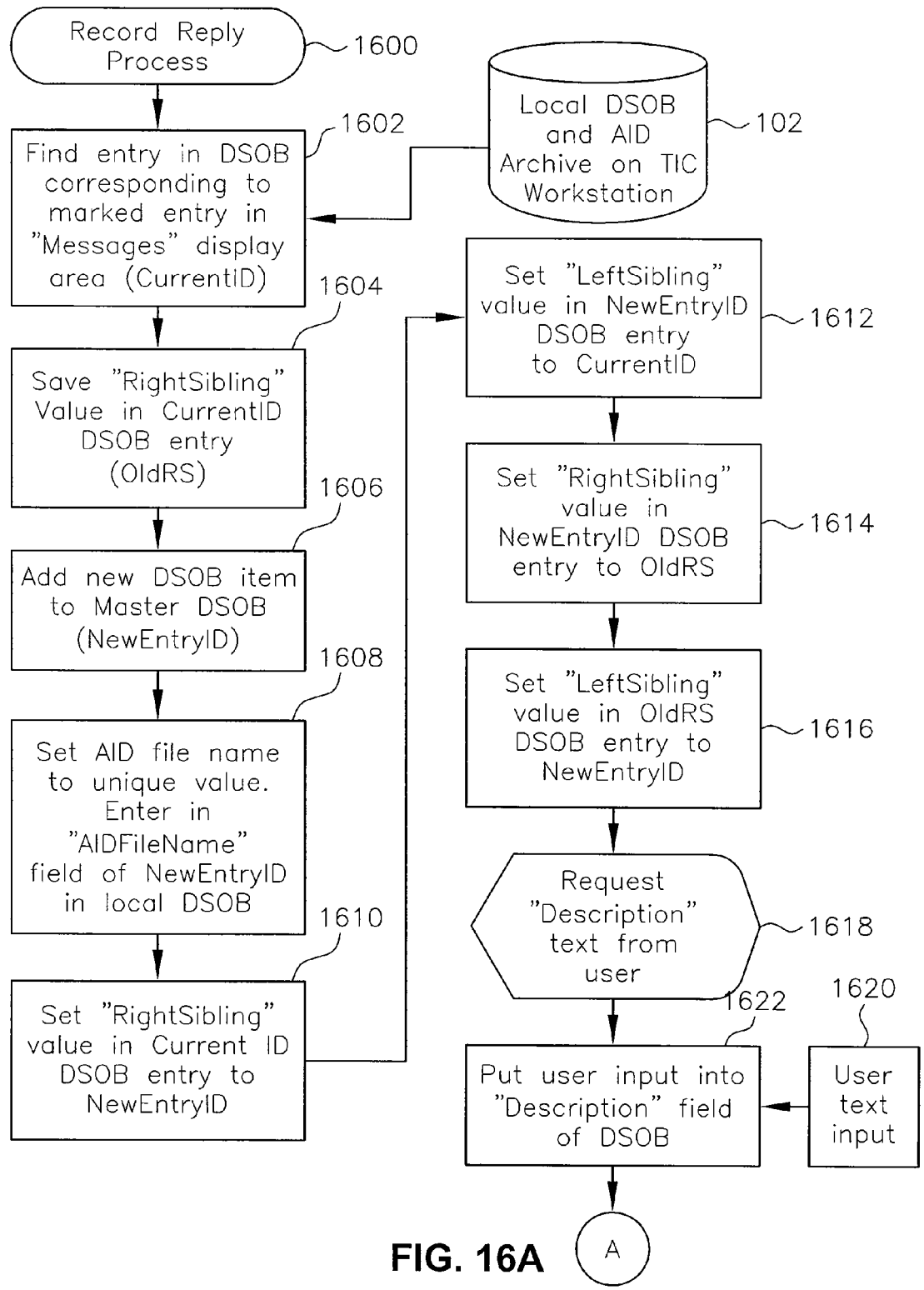
FIG. 16(a) is a flow chart illustrating part of the Record Reply Process according to an exemplary embodiment of the invention.
Figure 16B:
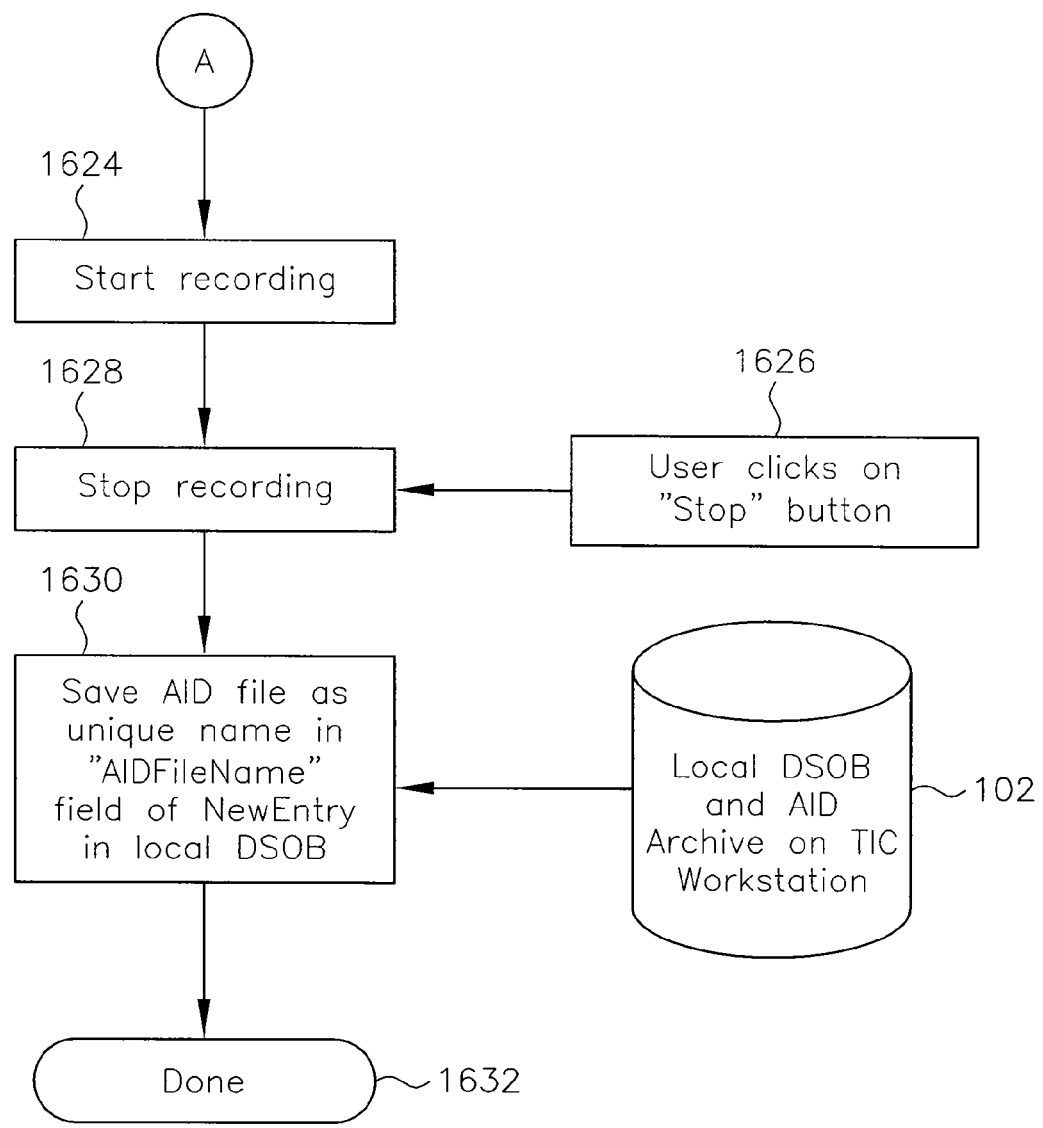
FIG. 16(b) is a continuation of the flow chart illustrated in FIG. 16(a)
Figure 16C:
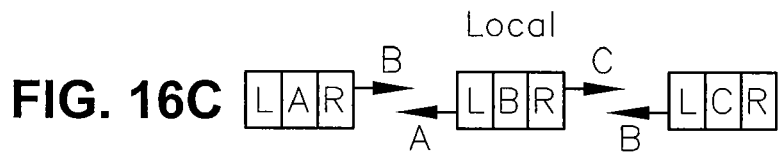
FIGS. 16(c) to 16(i) are each diagrams that further illustrate the process illustrated in FIGS. 16(a) and 16(b)
Figure 16D:
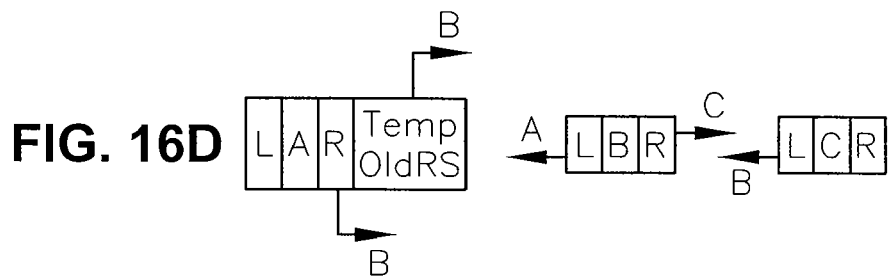
Figure 16E:
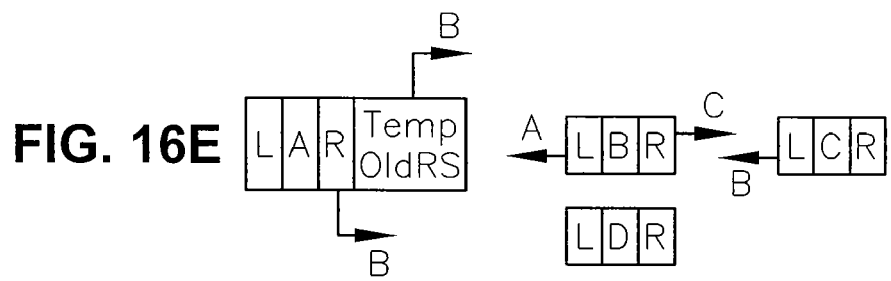
Figure 16F:
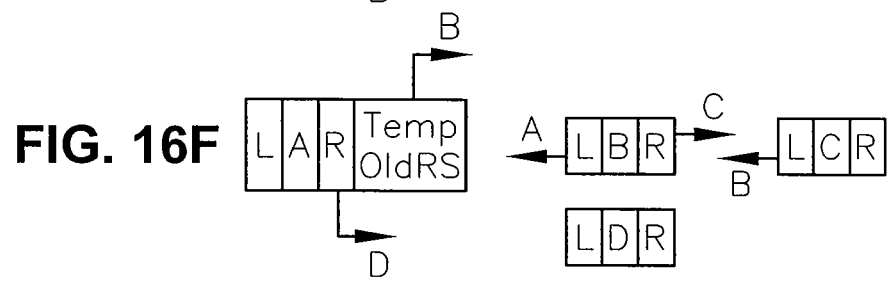
Figure 16G:
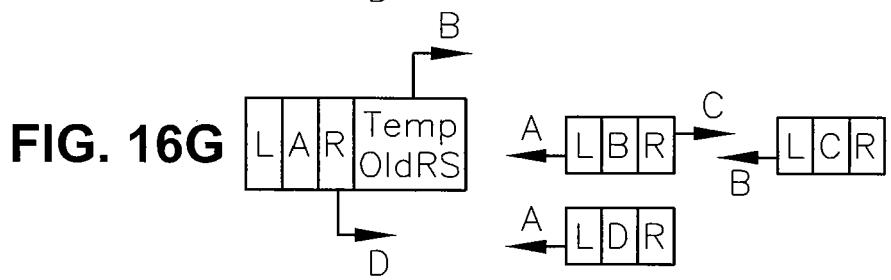
Figure 16H:
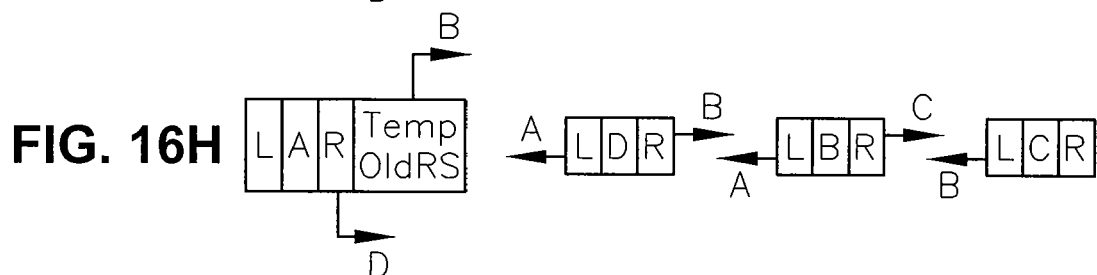

In step 1610, the "RightSibling" value of message A is changed to message D so that the "RightSibling" pointer of message A will point to the DSOB of proposed message D. This step is illustrated in FIG. 16(f). In step 1612, the "LeftSibling" value of the DSOB of proposed message D is set to message A. Accordingly, the "LeftSibling" pointer of the DSOB of proposed message D will point to message A. This step is illustrated in FIG. 16(g). In step 1614, the "RightSibling" value of the DSOB of proposed message D is set at the message to which Temporary OldRS is pointing: message B. When step 1614 has been completed, the "LeftSibling" value of the DSOB of proposed message D points to message A and the "RightSibling" value of the DSOB of proposed message D points to message B. As a result, the DSOB of proposed message D is now placed in its proper place between messages A and B. When message D is created, it will be in its proper place in a second pseudo-chronology between messages A and B. This step is illustrated in FIG. 16(h).

Figure 16I:
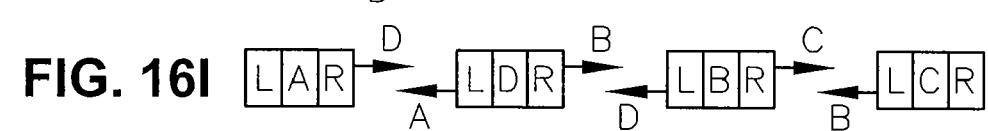

In step 1616, the "LeftSibling" value of the message to which Temporary OldRS is pointing, message B, is changed to message D. At this point in time, Temporary OldRS is deleted because it is no longer needed. This step is illustrated in FIG. 16(i). At this point, the DSOB for message A is immediately followed by the DSOB for proposed message D, which is immediately followed by the DSOB for message B, which is, in turn, immediately followed by the DSOB for message C. Accordingly, a new DSOB entry has been created which is inserted into the pseudo-chronology immediately after the selected message from the "Messages" section displayed in the pseudo-chronology.

The process described so far in step 1600 thus allows a user to place a message at any prior time in the collaborative discussion. Alternatively, it allows a user to append a message to the end of the discussion by selecting the last comment that has been posted and saved in local cache 102.

Figure 30:
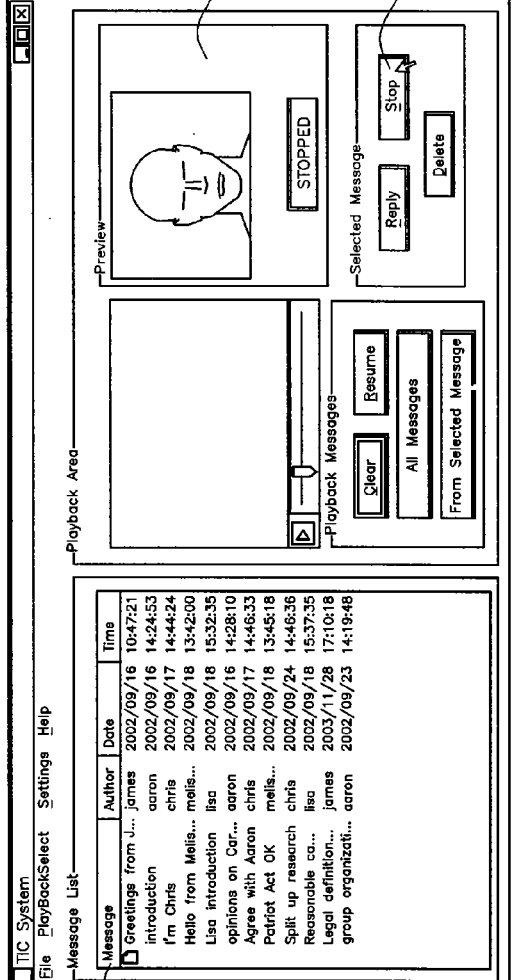
FIG. 30 is another illustration of a screen and an interface of a workstation in accordance with an exemplary embodiment of the invention.

In step 1618, workstation 90 asks the user to enter a brief text description of the message (for example, message D above). In step 1620, the user inserts the description. In step 1622, the description is placed in the "Description" field previously described in row 112 of FIG. 5. Referring to FIG. 16(b), step 1624 shows that the camera on workstation 90 is then started and the user starts recording the new message (for example, message D above). When the user has completed recording the message, step 1626 shows that the user may click on the stop button on the workstation interface. An exemplary embodiment of the stop button is shown in FIG. 30. When the user clicks on the stop button, step 1628 shows that the camera stops recording. Step 1630 shows that the AID file name containing the A/V message is saved in the local cache 102. Step 1632 shows that this process has been completed.

Figure 11A:
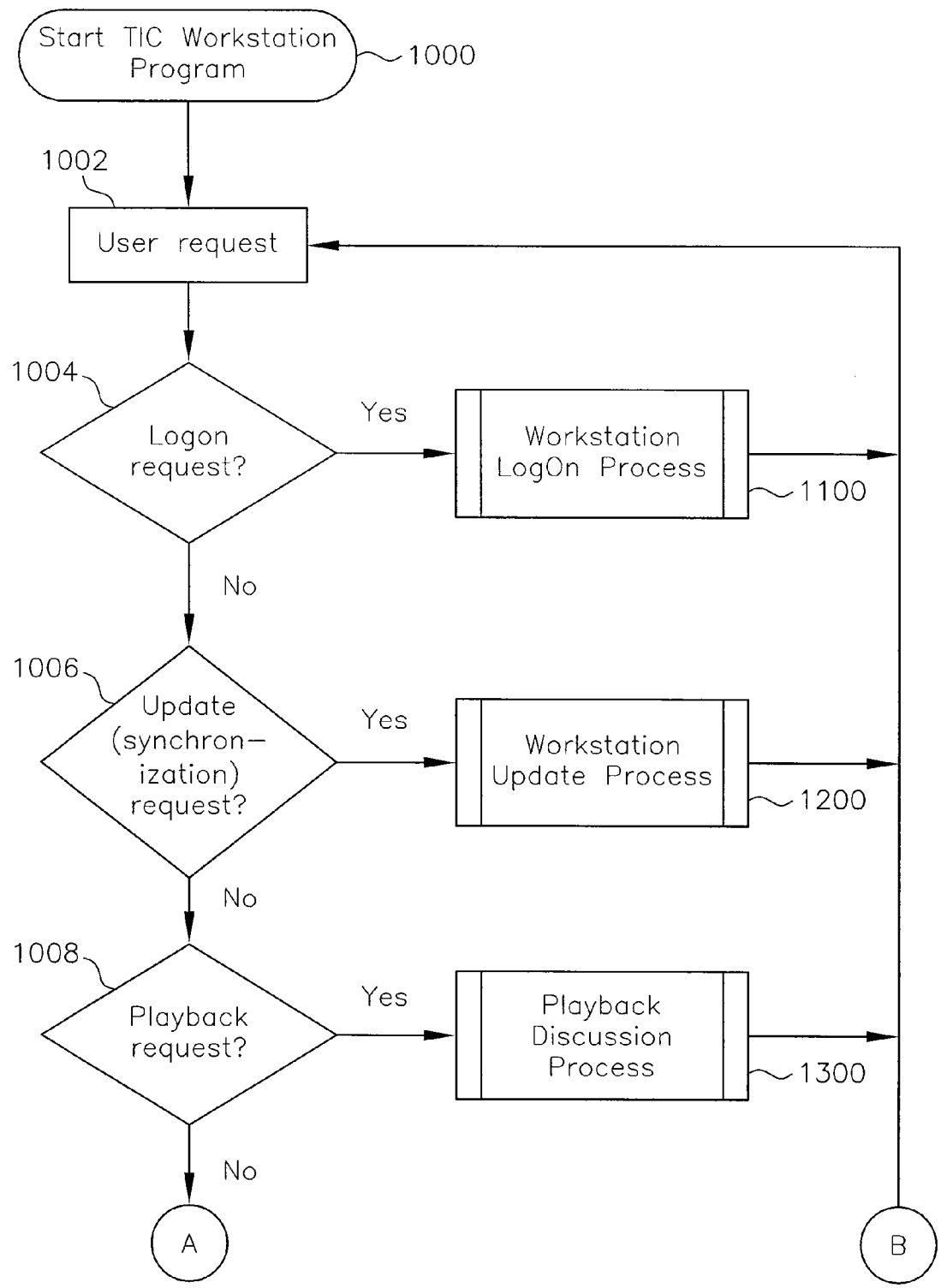
FIG. 11(a) is a flow chart illustrating part of an exemplary process of using a workstation according to an exemplary embodiment of the invention.
Figure 17:
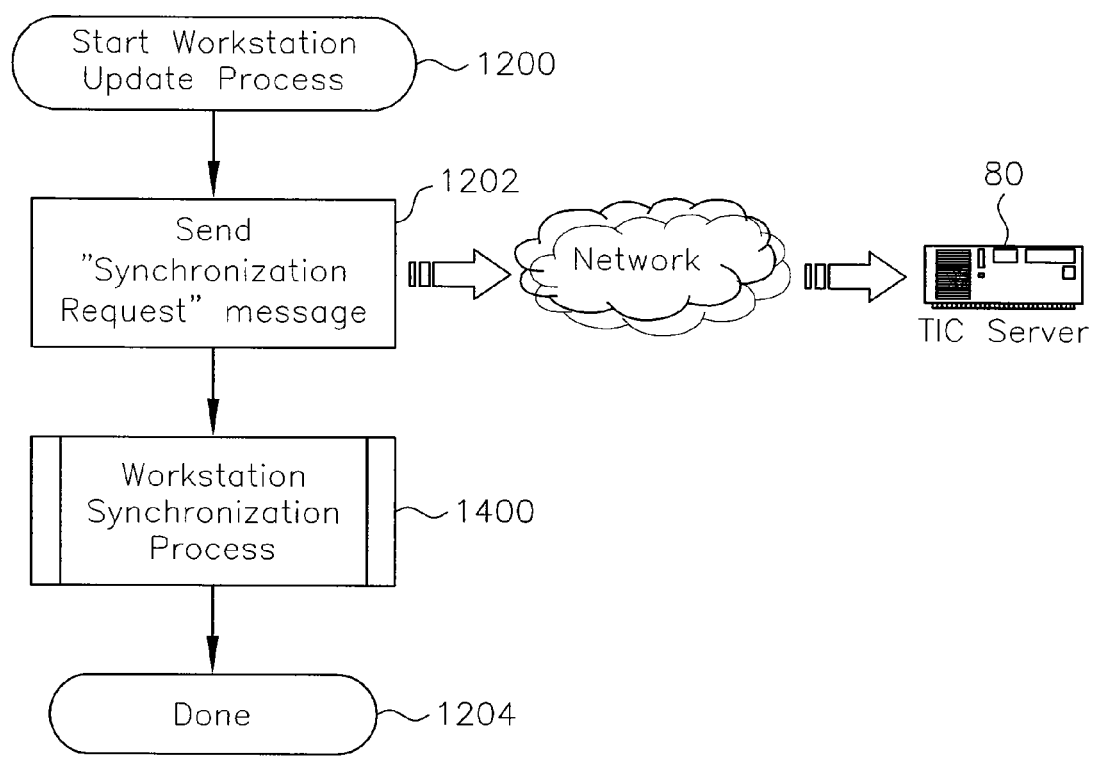
FIG. 17 is a flow chart illustrating a Workstation Update Process according to an exemplary embodiment of the invention.

FIG. 17 is a flow chart illustrating a Workstation Update Process 1200 according to an exemplary embodiment of the invention. Workstation Update Process 1200 is also shown in FIG. 11(a). The process shown in FIG. 17 allows the user to request a synchronization with server 80 at any time by selecting this operation from the workstation menu. Workstation 90 signals server 80 to initiate a full synchronization process. At step 1202, workstation 90 sends a synchronization request to server 80. In response, server 80 begins the workstation synchronization process step 1400 as explained in connection with FIGS. 13(a) and 13(b). At the end of the step 1400, the workstation update process is done, as shown in step 1204.

Figure 11B:
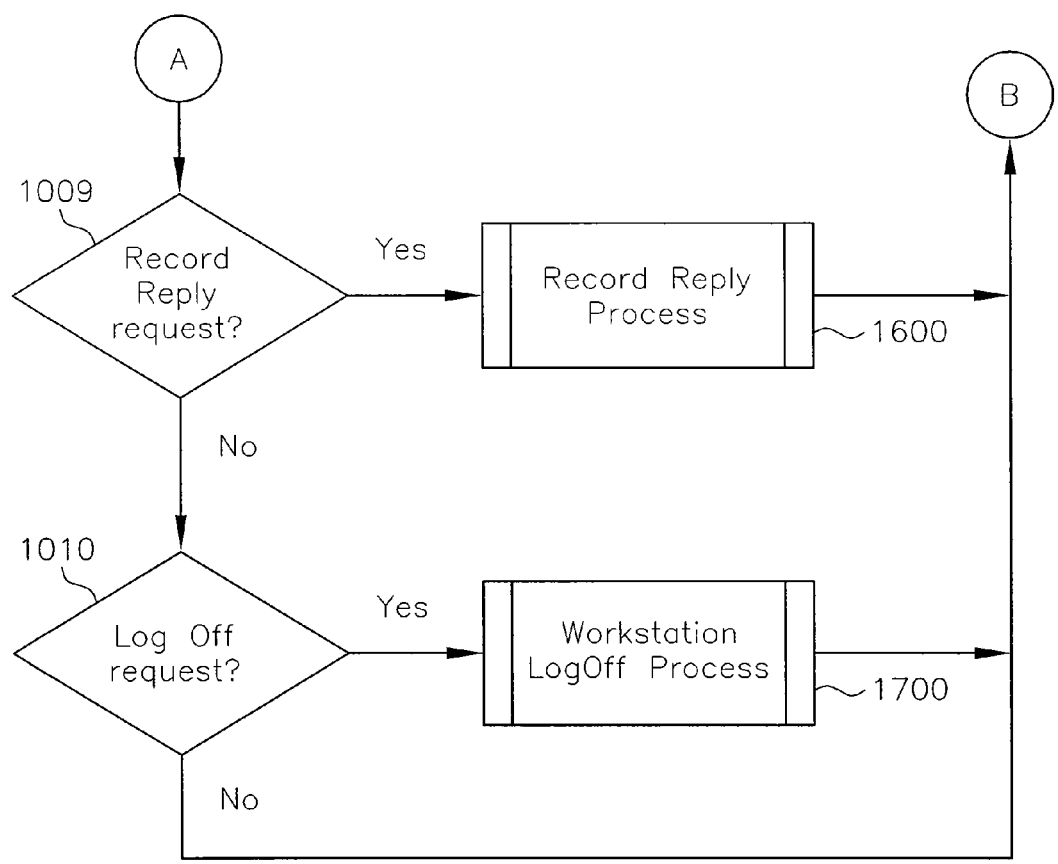
FIG. 11(b) is a continuation of the flow chart illustrated in FIG. 11(a)
Figure 18:
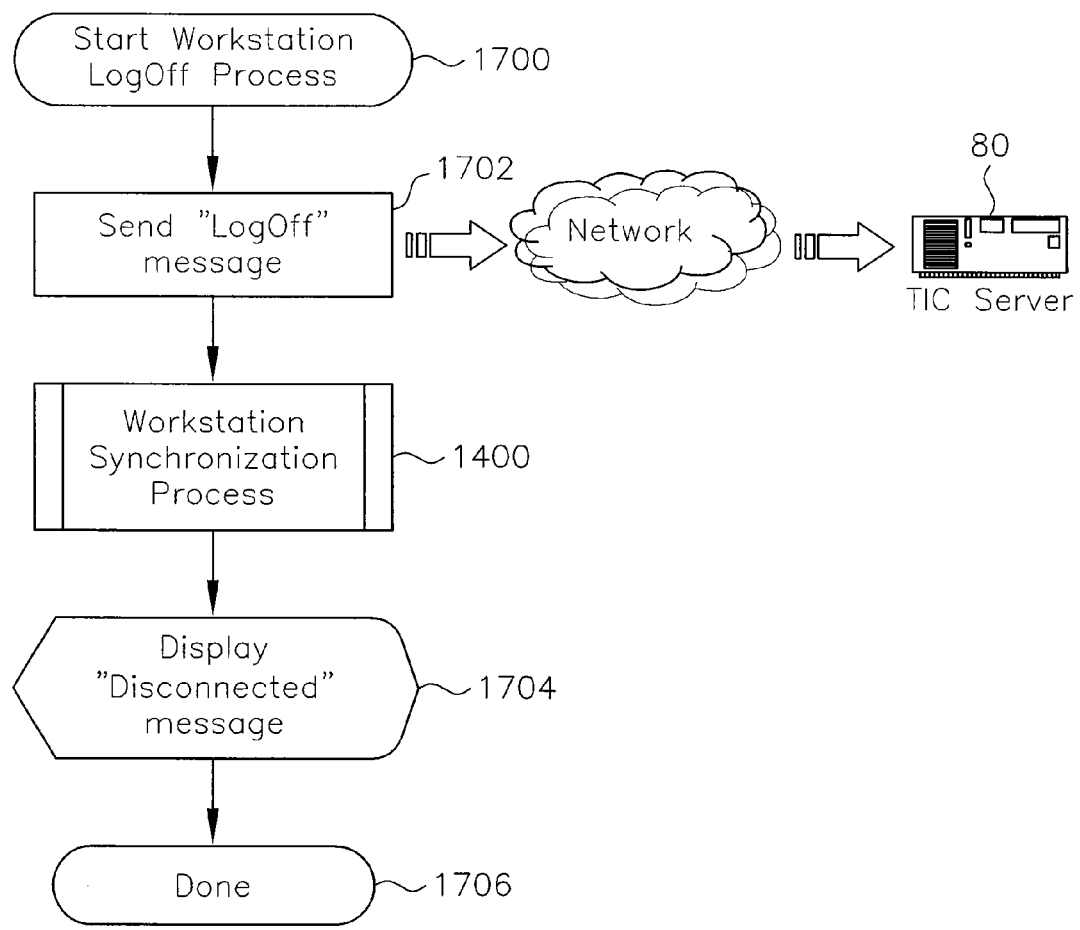
FIG. 18 is a flow chart illustrating a Workstation LogOff Process according to an exemplary embodiment of the invention.

FIG. 18 is a flow chart illustrating a Workstation LogOff Process 1700 according to an exemplary embodiment of the invention. Step 1700 is also shown in FIG. 11(b). When a user decides to log off of the collaboration system, workstation 90 sends a "LogOff" message to server 80 in step 1702. When server 80 receives the LogOff message, server 80 causes workstation 90 to begin the Workstation Synchronization Process 1400 as described in FIGS. 13(a) and 13(b). Server 80 initiates the synchronization process to ensure the user has the most current discussion version for later off-line work. After the synchronization process of step 1400 has been completed, step 1704 displays a "Disconnected" message indicating that workstation 90 has been disconnected from server 80 and, therefore, from the collaboration system. After the Disconnected message is displayed, the logoff process has been completed as indicated by step 1706.

A detailed description of an example of an operation of the method and system in accordance with an exemplary embodiment of the invention will now be presented. The following examples are included to more clearly demonstrate the overall nature of the invention. These examples are exemplary, not restrictive, of the invention.

Let us suppose that four people wish to collaborate on a new product with the code name Zebra using the TIC system: Allison in Atlanta (A), Bill in Boston (B), Cynthia in Chicago (C), and Dave in Denver (D). The TIC server is located in Troy, N.Y.

Figure 19:
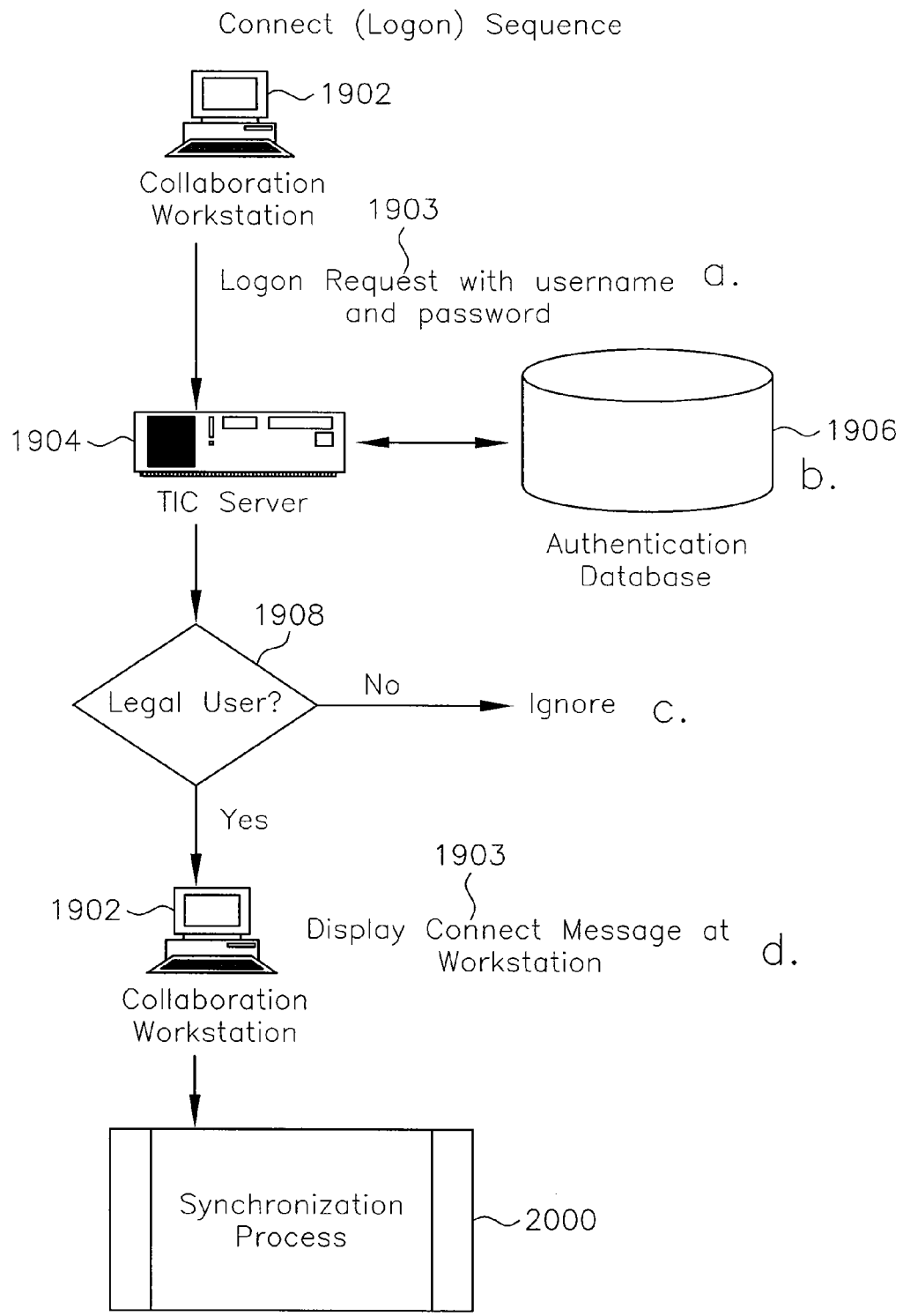
FIG. 19 is a flow diagram illustrating an example of a connect (logon) sequence in accordance with an exemplary embodiment of the invention.

FIG. 19 is a flow diagram illustrating an example of a connect (logon) sequence in accordance with an exemplary embodiment of the invention. To set up the conference on the TIC server 1904, the TIC administrator in Troy gives the conference a unique name ("Project Zebra" for example), and enters user names and passwords for all four participants under this conference name. This information is stored in a simple database format 1906 accessible by the TIC server 1904.

The TIC administrator sends each participant the conference name and his or her individual user name and password. He also provides each user with the Internet address (IP address) of TIC server 1904. The user launches the TIC workstation and enters this information by clicking on the SETTINGS menu item (shown, for example, in FIG. 22) and filling in the information in the form (not shown) that is displayed. This information need not be modified for the duration of the collaborative conference.

Figure 23:
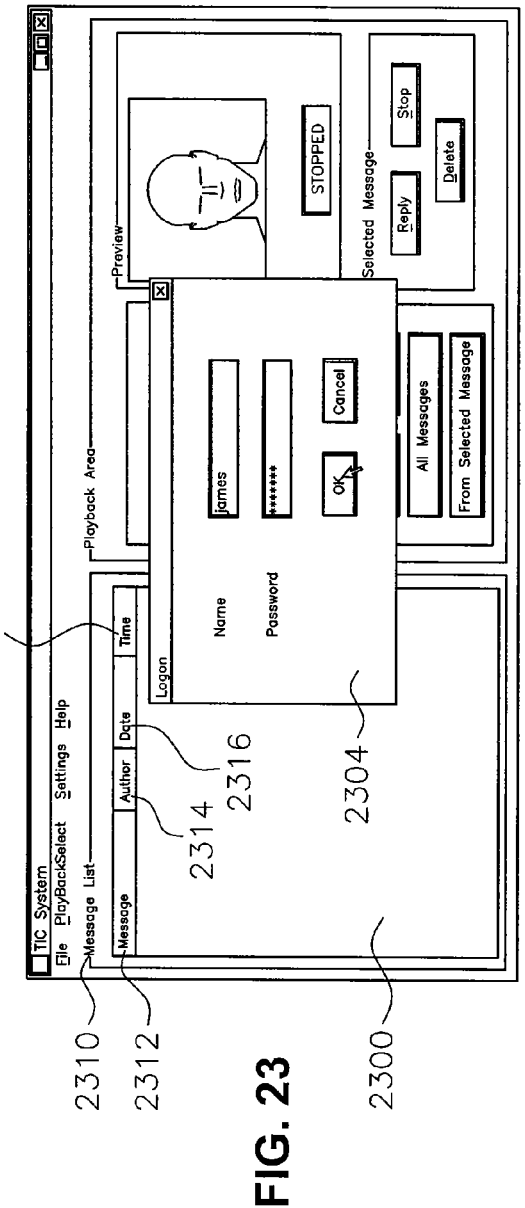
FIG. 23 is another illustration of a screen and an interface of a workstation in accordance with an exemplary embodiment of the invention.

The conference begins when a user, for example, Allison, logs onto the TIC server 1904. This is done by clicking on the CONNECT menu item on her workstation, shown, for example, in FIG. 22. The workstation software establishes a connection to TIC server 1904 using the specified IP address. The workstation then sends a special "Logon Request" message 1903 to TIC server 1904. TIC server 1904 responds by sending a "Request Logon Information" message to Allison's workstation. The workstation then displays a form for the user to fill in the user name and password. This process is also shown in FIGS. 6 and 11(a), and in Process 1100 of FIG. 12. An exemplary embodiment of the form is shown in FIG. 23.

After Allison enters her user name and password, these data are sent to TIC server 1904, which checks the data against the authorized conference members in the database 1906 and, in step 1908, asks if the person is a legal user. If the conference name, user name, and password match an authorized user, as they will in this example, the answer to the question in step 1908 is "Yes" and a session for Allison is established at workstation 1902. At step 1903, a message is displayed confirming that she is connected.

At this point, a synchronization process 2000 (also described in Process 300 of FIG. 7(*a*) and Process 1400 of FIG. 13(*a*)) in which workstation 1902 and TIC server 1904 compare AID media files and the DSOB discussion structure file to make sure workstation 1902 and TIC server 1904 have identical files is initiated. Referring to FIG. 20(*a*), this process begins with TIC server 1904 sending workstation 1902 a "Request DSOB Send" message 2002. Simultaneously, it implements a block against any other member of this conference beginning synchronization, to avoid two workstations attempting to update simultaneously.

Such simultaneity could result in an illegal pseudo-chronology if, for example, two participants tried to reply to the same prior message and thus occupy the same spot in the pseudo-chronology. One user must be placed in the pseudo-chronology before the other. Both cannot occupy the same position. Therefore, the first user requesting synchronization will occupy this spot, and the other one will be blocked from synchronizing until the synchronization process with the earlier user is completed.

Workstation 1902 responds in step 2004 by transmitting the DSOB from its local cache to TIC server 1904. A purpose of this DSOB is to contain identifiers for all video files that make up the conversation up to that point in time, and their organization into a pseudo-chronology. At step 2008, TIC server 1904 compares the master DSOB in server database 2006 with the DSOB received from workstation 1902. At step 2010, TIC server 1904 asks if the two DSOBs are the same. If they are the same, TIC server 1904 sends a "synchronization complete" message to workstation 1904.

Because there have been no comments posted yet, the DSOBs are empty in both workstation 1902 and TIC server 1904 at this point. Consequently, the DSOBs in the workstation cache (not shown) and TIC server database 2006 are identical and TIC server 1904 and workstation 1902 are considered synchronized; the answer to the question at step 2010 is "Yes." TIC server 1904 informs workstation 1902 that the process is completed by sending a "Synchronization Completed" message at step 2012. If the DSOBs had been different, the answer to the question at step 2010 would have been "No" and additional steps (not shown in these figures) would have occurred. These steps have previously been described.

Because the discussion is empty, workstation 1902 displays a standard "Beginning of Discussion" label (not shown) in the "Message" display area of workstation 1902. Allison may then post the first message to the discussion by clicking on the label "Beginning of Discussion" (selecting it) and then clicking on the "Reply" button on the workstation interface display shown, for example, in FIG. 27.

Workstation 1902 responds by displaying a message requesting entry of a text description of the message to be posted to the conference. Allison types in this description, for example, "Hello from Allison." Workstation 1902 then activates the Web camera and microphone and records Allison's message. When she is finished recording, she clicks on the "Stop" button shown, for example, in FIG. 30. Workstation 1902 turns off the camera and stores the resulting A/V file under a unique name that incorporates the user name and the date and time of recording. This is the AID file. This operation is shown in Process 1600 of FIG. 16.

Allison's workstation 1902 is now out of synchrony with TIC server 1904, as it now has a valid entry in its local DSOB and an associated AID file in its local cache. Workstation 1902 now checks to see if it is connected to TIC server 1904. If workstation 1902 is connected, it will request synchronization by sending a "Request Synchronization" message to TIC server 1904.

TIC server 1904 responds by beginning the synchronization process (also described in Process 300 of FIG. 7(*a*) and Process 1400 of FIG. 13(*a*)) as described above by sending to workstation 1902 a "Request DSOB Send" message 2002. As before, TIC server 1904 implements a block against any other member of this conference beginning synchronization until this operation is completed. Allison's workstation 1902 sends its DSOB to TIC server 1904 at step 2004.

In step 2008, TIC server 1904 compares the information in the DSOB from Allison's workstation 1902 with the information in the Master DSOB stored on TIC server 1904. The comparison finds, in step 2014, that Allison's DSOB refers to an AID file not stored at database 2006 on TIC server 1904. In step 2016, TIC server 1904 then sends Allison's workstation 1902 a "Request Send of AID file" message containing the requested AID file name (described in FIGS. 13(*a*) and 13(*b*)). In step 2018, workstation 1902 responds by sending the AID file to TIC server 1904, which places the AID file in the master archive 2006 maintained by TIC server 1904. TIC server 1904 then updates the Master DSOB by inserting the entry for Allison's AID file, as shown by arrow 2019. Because TIC server 1904 has no AID files that are not present in Allison's workstation 1902, the AID file transfers are complete and steps 2020 through 2026 are not needed.

To insure that the discussion structure implementing the pseudo-chronology is synchronized, TIC server 1904 then sends a copy of the Master DSOB to workstation 1902 in step 2028. Because both workstation 1902 and TIC server 1904 now have identical AID and DSOB files, they are synchronized. TIC server 1904 completes the process by sending workstation 1902 a "Synchronization Completed" message at step 2030. The DSOBs at both TIC server 1904 and workstation 1902 now look like Table 2100 in FIG. 21*a*. Table 2100 contains an entry only in fields AIDFileName and Description. This process is also described in Process 1400 of FIG. 13(*b*).

At a later time, let us suppose that Dave wishes to join the conference. He completes the logon sequence described above, TIC server 1904 requests his DSOB, and his workstation sends TIC server 1904 his local DSOB, which is empty. TIC server 1904 compares his (empty) DSOB with the Master DSOB, which now contains Allison's entry. In step 2022 of FIG. 20(*b*), TIC server 1904 then informs Dave's workstation that it is sending an AID file that he does not have (Allison's comments). This process is described in Process 1400 of FIG. 13(*a*). After the AID file is transmitted to the workstation in step 2024 of FIG. 20(*c*), the Master DSOB copy is sent as shown in step 2028 of FIG. 20(*c*) and Dave's workstation is now synchronized.

Dave's workstation now displays Allison's message description, "Hello from Allison," in its "Messages" area. Dave now adds his message by clicking on the "Hello from Allison" description, then clicking on the "Reply" button on the workstation. The workstation requests a message description, which he enters ("Denver Dave says hi, too"), and records and saves his comments in a new AID file at his workstation. The workstation adds an entry to the DSOB file identifying this new AID file and placing it after Allison's entry in the pseudo-chronology, because Dave entered it as a reply to her comment.

This is done by entering Dave's AID file name in the DSOB "RightSibling" pointer in the entry describing Allison's comments. This indicates that Dave's comments follow Allison's comments in the pseudo-chronology. The "LeftSibling" pointer in the entry describing Dave's comments is set to Allison's AID file name, indicating that this recorded comment comes before Dave's. The DSOB for this conference now looks like Tables 2110 and 2120 shown in FIG. 21b. Table 2110 contains entries in fields AIDFileName, Description, and RightSiblingItem. Table 2120 contains entries in fields AIDFileName, Description, and LeftSiblingItem.

By properly setting the RightSibling and LeftSibling pointers, a pseudo-chronology for the discussion can be maintained. This pseudo-chronology does not have to correspond to the actual order in which comments are recorded and transmitted to TIC server 1904. Whenever a user selects a message (clicks on its description in the "Messages" area) and clicks on the "Reply" button to record a new message, the new message is inserted in the pseudo-chronology after the selected message. This process was previously described as Process 1600 of FIG. 16.

As an example, suppose Cynthia now logs on, and has the AID and DSOB files at her workstation synchronized with those at TIC server 1904, as described above. Her "Messages" will have two entries:

"Hello from Allison," and

"Denver Dave says hi, too."

Cynthia can then reply directly to Allison by clicking on the "Hello from Allison" description line, and recording a reply as described above. Suppose she labels her comment, "Are you Allison from Marketing?" Because Cynthia replied directly to Allison, her comments will immediately follow Allison's in the pseudo-chronology. Dave's comments will then follow Cynthia's. The "Messages" area on Cynthia's workstation will now read:

"Hello from Allison,"

"Are you Allison from Marketing?" and

"Denver Dave says hi, too."

At the end of Cynthia's recording, her workstation and TIC server 1904 are synchronized by the following process.

Cynthia's workstation sends TIC server 1904 the "Request Synchronization" message. TIC server 1904 responds by sending the workstation a "Request DSOB Send" message in step 2002 of FIG. 20(a). As before, TIC server 1904 implements a block against any other member of this conference beginning synchronization until this operation is completed. At step 2002 in FIG. 29(a), Cynthia's workstation sends its DSOB to TIC server 1904.

Figure 20B:
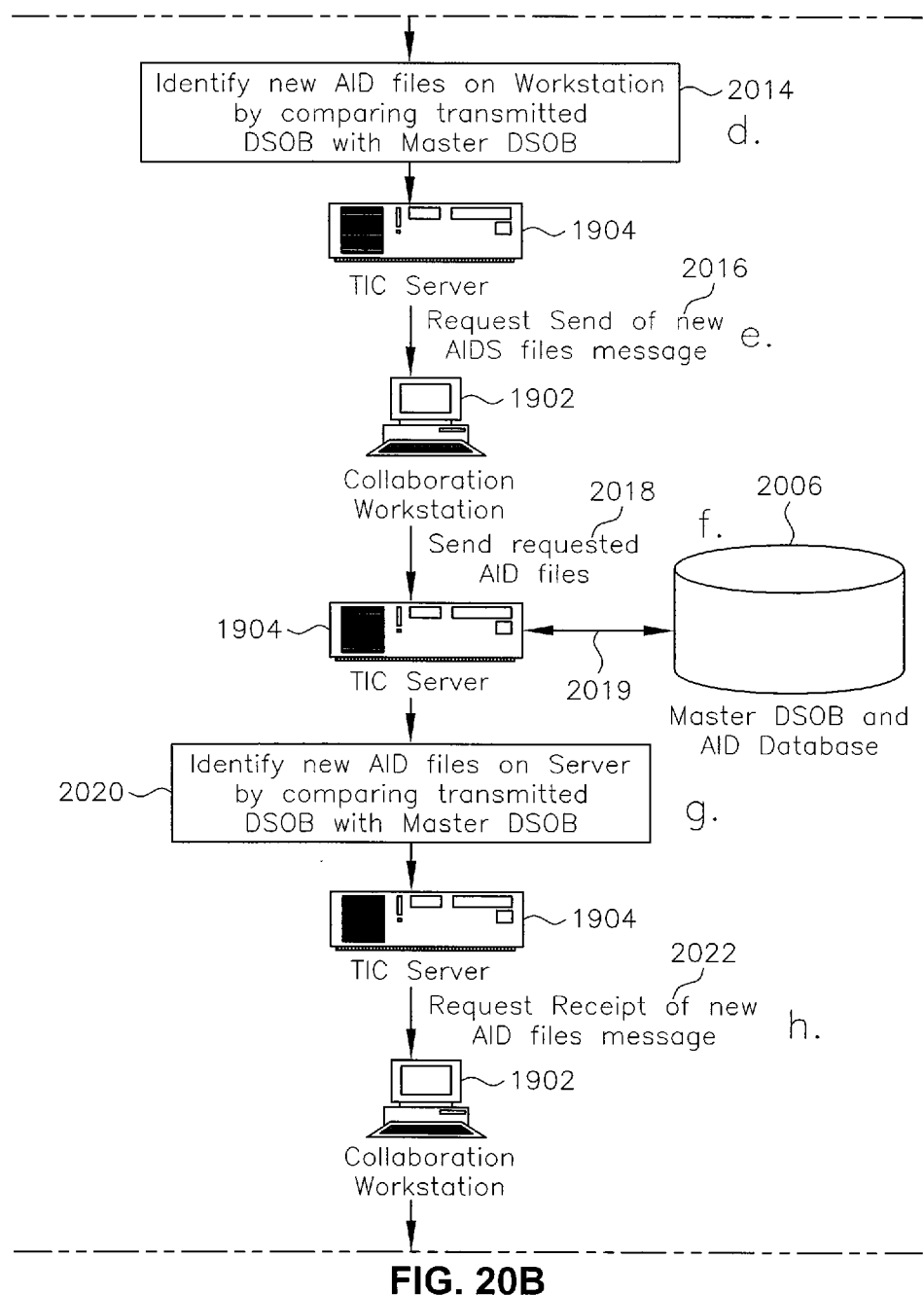
FIG. 20(b) is a continuation of the flow diagram illustrated in FIG. 20(a)

At step 2008 in FIG. 20(a), TIC server 1904 compares the information in the DSOB from Cynthia's workstation with the information in the Master DSOB stored on TIC server 1904. See Process 300 of FIGS. 7(a) and 7(b), Process 600 of FIGS. 10(a) and 10(b), and Process 1400 of FIGS. 13(a) and 13(b). At step 2014, the comparison finds that Cynthia's DSOB refers to an AID file not stored on TIC server 1904. At step 2016 in FIG. 20(b), TIC server 1904 then sends Cynthia's workstation a "Request Send of AID file" message containing the requested AID file name. At step 2018, the workstation responds by sending the AID file from Cynthia's workstation to TIC server 1904, which places the file in the master archive maintained by TIC server 1904.

TIC server 1904 compares the DSOB from Cynthia's workstation with the Master DSOB and determines that the AID file just transmitted should be placed after the message from Allison and before the message from Dave. TIC server 1904 then updates the Master DSOB by inserting the entry for Cynthia's AID file at this point in the pseudo-chronology. The Master DSOB now looks like Tables 2130, 2140, and 2150 shown in FIG. 21(c). Table 2130 contains entries in fields AIDFileName, Description, and RightSiblingItem. Table 2140 contains entries in fields AIDFileName, Description, and LeftSiblingItem. Table 2150 contains entries in fields AIDFileName, Description, LeftSiblingItem, and RightSiblingItem.

Figure 20C:
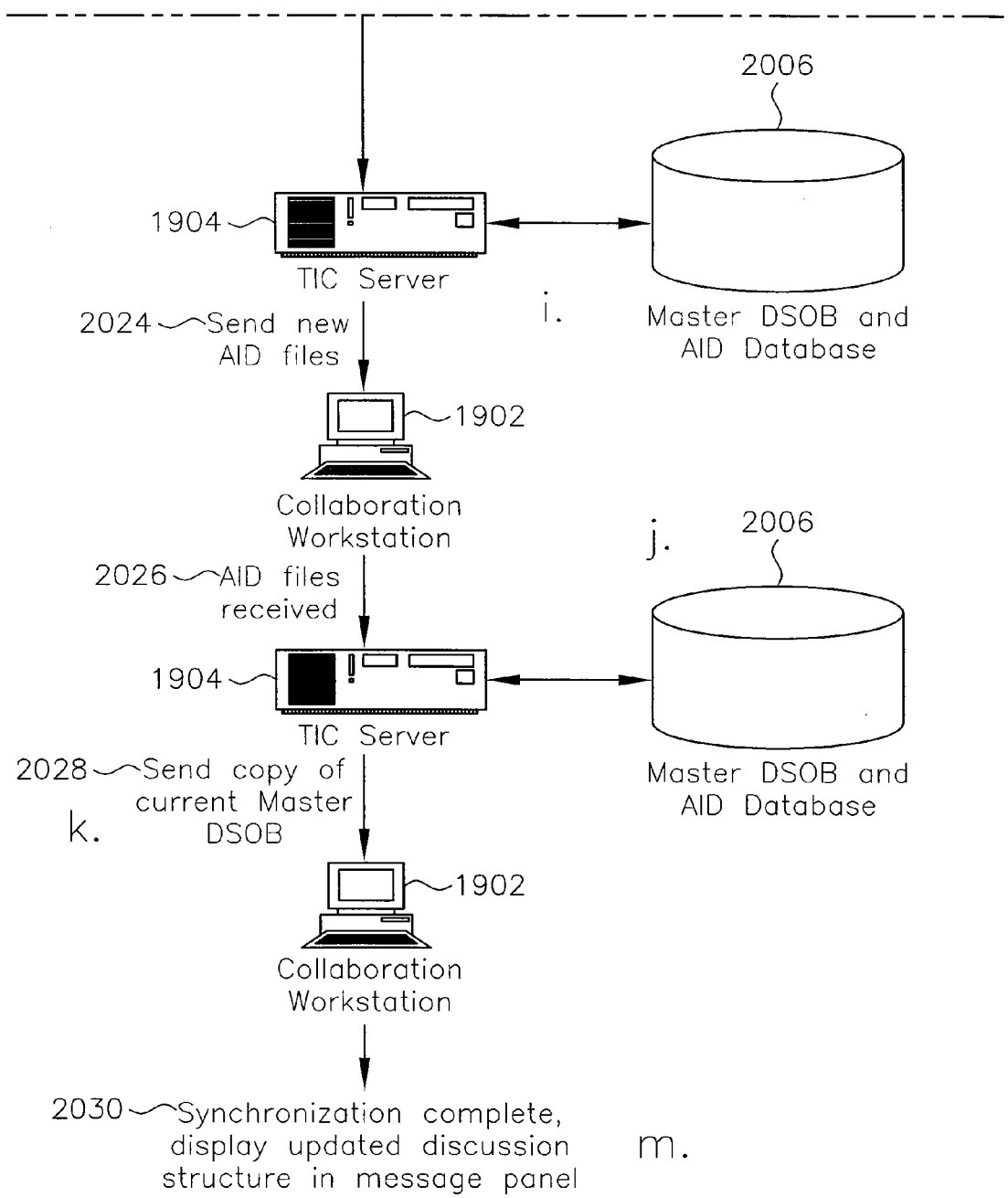
FIG. 20(c) is a continuation of the flow diagram illustrated in FIGS. 20(a) and (b)

In step 2028 in FIG. 20(c), to insure that the discussion structure implementing the pseudo-chronology is synchronized, TIC server 1904 then sends a copy of the Master DSOB to the workstation. Because both the workstation and TIC server 1904 now have identical AID and DSOB files, they are synchronized. In step 2030 in FIG. 20(c), TIC server 1904 completes the process by sending the workstation a "Synchronization Completed" message.

At this point, suppose Bill finally logs onto TIC server 1904. When he does so, the logon synchronization process described earlier will transfer Allison, Cynthia, and Dave's comments in individual AID files and a copy of the Master DSOB to Bill's workstation cache. Bill now has access to the full discussion, whether or not the other collaborators are logged onto TIC server 1904.

Bill can now play back the entire conversation to this point by selecting the first message ("Hello from Allison") and clicking on the "All Messages" button in the "Playback Messages" area of his workstation. The three messages will be combined into a single, near-real-time video playback which will be displayed at Bill's workstation, simulating a real-time synchronous discussion in which Allison, Cynthia, and Dave sequentially make comments. It is important to note that Bill can play back this conversation whether or not he is logged onto TIC server 1904. In fact, in this example, let us suppose that he plays back the discussion while traveling on an airplane. He then wishes to record a reply to Cynthia's comments.

Bill can record a reply using the same procedure he would use if connected to TIC server 1904. Suppose he records a reply to Cynthia's posting by selecting "Are you Allison from Marketing?" in the "Messages" area (the description Cynthia entered when she recorded her comments), clicking on the "Reply" button, entering the description of his message ("That Allison was downsized"), and recording his comment. His local "Messages" area would now read:

"Hello from Allison,"

"Are you Allison from Marketing?",

"That Allison was downsized," and

"Denver Dave says hi, too."

Because Bill is not logged onto TIC server 1904, his local cache of AID and DSOB files are not synchronized with the master archive in TIC server 1904. He can play back and record, however, as many comments locally as he wishes. His comment now follows Cynthia's in the pseudo-chronology. The DSOB on his workstation now is organized as shown in Tables 2160, 2170, 2180, and 2190 in FIG. 21(d). Table 2160 has entries in fields AIDFileName, Description, and RightSiblingItem. Table 2170 has entries in fields AIDFileName, Description, and LeftSiblingItem. Table 2180 has entries in fields AIDFileName, Description, LeftSiblingItem, and RightSiblingItem. Table 2190 has entries in fields AIDFileName, Description, LeftSiblingItem, and RightSibling Item.

Let us now suppose Allison logs onto TIC server 1904 while Bill is in the air and posts a message described as "Let's get started with Zebra." The Master DSOB will now contain this entry, and Bill's workstation will be even further out of synchronization. The next time Bill logs onto the TIC server, however, the following process occurs to resynchronize TIC server 1904 and his workstation.

Bill's workstation sends TIC server 1904 the "Request Synchronization" message. TIC server 1904 responds by sending the workstation a "Request DSOB Send" message. As before, TIC server 1904 implements a block against any other member of this conference beginning synchronization until this operation is completed. Bill's workstation sends its DSOB to TIC server 1904.

TIC server 1904 compares the information in the DSOB from Bill's workstation with the information in the Master DSOB stored on TIC server 1904. See Process 300 of FIGS. 7(*a*) and 7(*b*), Process 600 of FIGS. 10(*a*) and 10(*b*), and Process 1400 of FIGS. 13(*a*) and 13(*b*). The comparison finds that Bill's DSOB refers to an AID file not stored on TIC server 1904. TIC server 1904 then sends Bill's workstation a "Request Send of AID file" message containing the requested AID file name. The workstation responds by sending the AID file from Bill's workstation to TIC server 1904, which places the file in the master archive maintained by TIC server 1904. The comparison also indicates that TIC server 1904 has an AID file that is not present on Bill's workstation (Allison's new posting). TIC server 1904 sends the workstation a "Request Receipt of AID files" message, and when the workstation signals it is ready, sends the new AID file from the master archive on TIC server 1904 to Bill's workstation.

TIC server 1904 compares the DSOB from Bill's workstation with the Master DSOB and determines that the AID file just received from that workstation should be placed after the message from Cynthia and before the message from Dave, as shown at step 2008 in FIG. 20(*a*). TIC server 1904 then updates the Master DSOB by inserting the entry for Bill's AID file at this point in the pseudo-chronology by changing the LeftSibling and RightSibling pointers. The new posting by Allison is at the end of the pseudo-chronology in the Master DSOB and this is not reflected in the DSOB received from Bill, as Allison's new posting was done while he was off-line.

To update the pseudo-chronology at Bill's workstation to include Allison's new posting, TIC server 1904 then sends a copy of the Master DSOB to the workstation. This DSOB contains Allison's new posting, along with the updated pseudo-chronology just made as a result of Bill's new posting. Because both the workstation and TIC server 1904 now have identical AID and DSOB files, they are synchronized. TIC server 1904 completes the process by sending the workstation a "Synchronization Completed" message. The DSOB appears as Tables 2200, 2210, 2220, 2230, and 2240 in FIG. 21(*e*). Table 2200 has entries in fields AIDFileName, Description, and RightSiblingItem. Table 2210 has entries in fields AIDFileName, Description, LeftSiblingItem, and RightSiblingItem. Table 2220 has entries in fields AIDFileName, Description, LeftSiblingItem, and RightSiblingItem. Table 2230 has entries in fields AIDFileName, Description, LeftSiblingItem, and RightSiblingItem. Table 2240 has entries in fields AIDFileName, Description, and LeftSiblingItem. Bill's "Messages" are on the workstation and now read:

"Hello from Allison,"
"Are you Allison from Marketing?",
"That Allison was downsized,"
"Denver Dave says hi, too," and
"Let's get started with Zebra."

A detailed description of an example of an operation of the display and interface of the method and system in accordance with an exemplary embodiment of the invention will now be presented. The following examples are included to more clearly demonstrate the overall nature of the invention. These examples are exemplary, not restrictive, of the invention.

FIGS. 22 through 32 are illustrations of a screen and an interface of a workstation in accordance with an exemplary embodiment of the invention. The display area of the screen is generally indicated by reference number 2300. The interface area is generally indicated by reference number 2500. As shown in FIG. 23, for example, display area 2300 includes a message list 2310 including headings reflecting a message indicator 2312, an author indicator 2314, a date indicator 2316, and a time indicator 2318. As shown in FIG. 24, for example, underneath message indicator 2312 is a column of statements, each statement being a short description of the A/V comment that has been recorded and stored at the workstation. That is, displayed is the locally stored version of the discussion structure.

Underneath author indicator 2314 is a column of names. Respective names underneath author indicator 2314 indicate the author for the respective A/V messages described in column 2312. Underneath date indicator 2316 is a column of dates. Respective dates underneath the date indicator 2316 and the time indicator 2318 state the respective dates and times when the A/V messages listed in column 2312 were created. Features of interface area 2500 will be described below.

The display of the locally stored version of the discussion structure in FIG. 22 shows that the discussion structure has been stored in a pseudo-chronological order. Three messages were created on Sep. 16, 2002: a message from james on Sep. 16, 2002 at 10:47:21, a message from aaron on Sep. 16, 2002 at 14:24:53, and another message from aaron on Sep. 16, 2002 at 14:28:10. There are three messages, however, between the two messages created by aaron. The three messages are: a message from chris on Sep. 17, 2002 at 14:44:24; a message from melis on Sep. 18, 2002 at 13:42:00; and a message from lisa on Sep. 18, 2002 at Sep. 18, 2002 at 15:32:35. Because the messages from chris, melis, and lisa all follow the first message from aaron, their placement after the first message from aaron means that they were replying to the first message from aaron. Accordingly, the user of this workstation can see who responded to aaron's first message and can play back the four messages in that order, as if it were a real-time conversation.

After lisa's message, there is the second message from aaron, a second message from chris, and a second message from melis on Sep. 18, 2002 at 13:45:18. It can also be seen that there is another message from the list created on Sep. 18, 2002 at 15:37:35. There is an intervening message, however, from chris dated Sep. 24, 2002 at 14:46:36. Because this message from chris intervenes between two message on Sep. 18, 2002 it means that chris's message of Sep. 24, 2002 replied to melis' message created on Sep. 18, 2002.

Referring back to FIG. 22, clicking on the File icon 2301 above display area 2300 reveals a drop-down screen 2302. The entry at the top of drop-down screen 2302 states "Connect." When the user clicks on "Connect," Logon screen 2304 appears, allowing the user to enter a name and password. When the user connects, the system automatically synchronizes the A/V messages in the workstation with the A/V messages in the server so that the workstation has the current versions of the entire collaborative conversation. The updated discussion structure is displayed in display area 2300 in FIG. 24. This occurs after synchronization with the server has been completed, and a new DSOB and any new AID files with associated A/V messages are downloaded to the workstation. In this example, a comparison of the messages listed in FIG. 24 with the messages listed in FIG. 22 reveals that no new messages have been added to the workstation.

Referring to FIGS. 24 and 25, for example, reference 2502 displays the user of this workstation. The user can play back all of the messages displayed in column 2312, in near real-time, by clicking on the "All Messages" button 2504 on interface 2502. Referring to FIG. 25, as each message is played, the audio portion of the message is played while the video portion of the message is displayed in playback area 2506. Instead of playing all of the A/V messages, the user may is choose, for example, to play back only a selected message or a plurality of selected messages.

Figure 26:
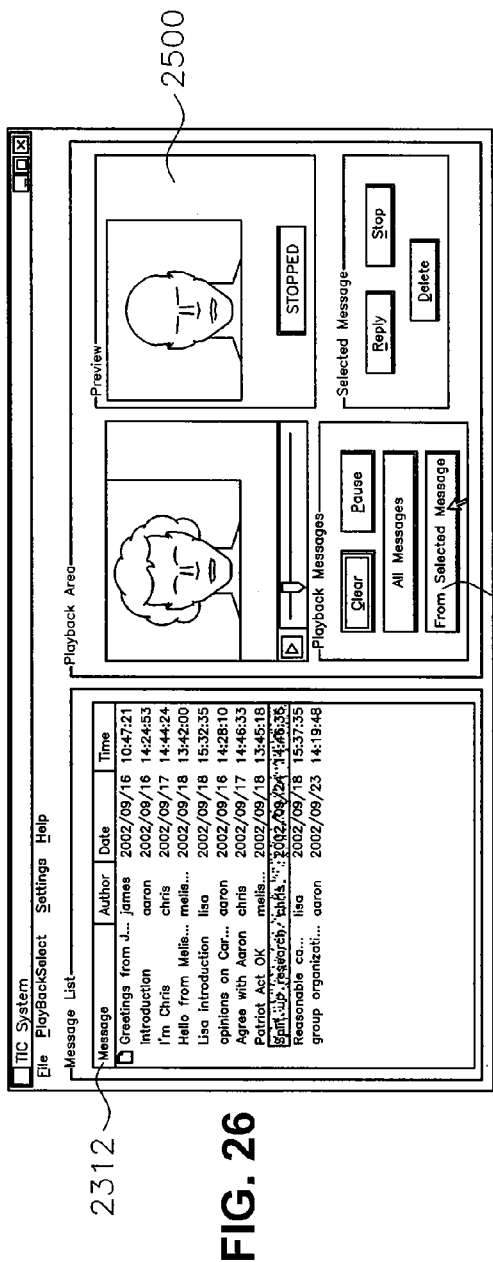
FIG. 26 is another illustration of a screen and an interface of a workstation in accordance with an exemplary embodiment of the invention.

Referring to FIG. 26, the user can select a message by clicking on the desired description in column 2312 and then clicking on the "From Selected Message" button 2508 on interface 2500. These actions will cause the selected and all subsequent messages to be played back, in the pseudo-chronological order displayed in the "Messages" 2310 area, in near real-time. For example, in FIG. 26, the user has clicked on the description of the message from chris dated Sep. 24, 2002. The user can review that message alone by double-clicking on the description, or can review all subsequent messages following chris' message by clicking on the "All Messages" button 2510 to review the entire conversation beginning with chris' message to the end of the messages.

Figures 28, 29:
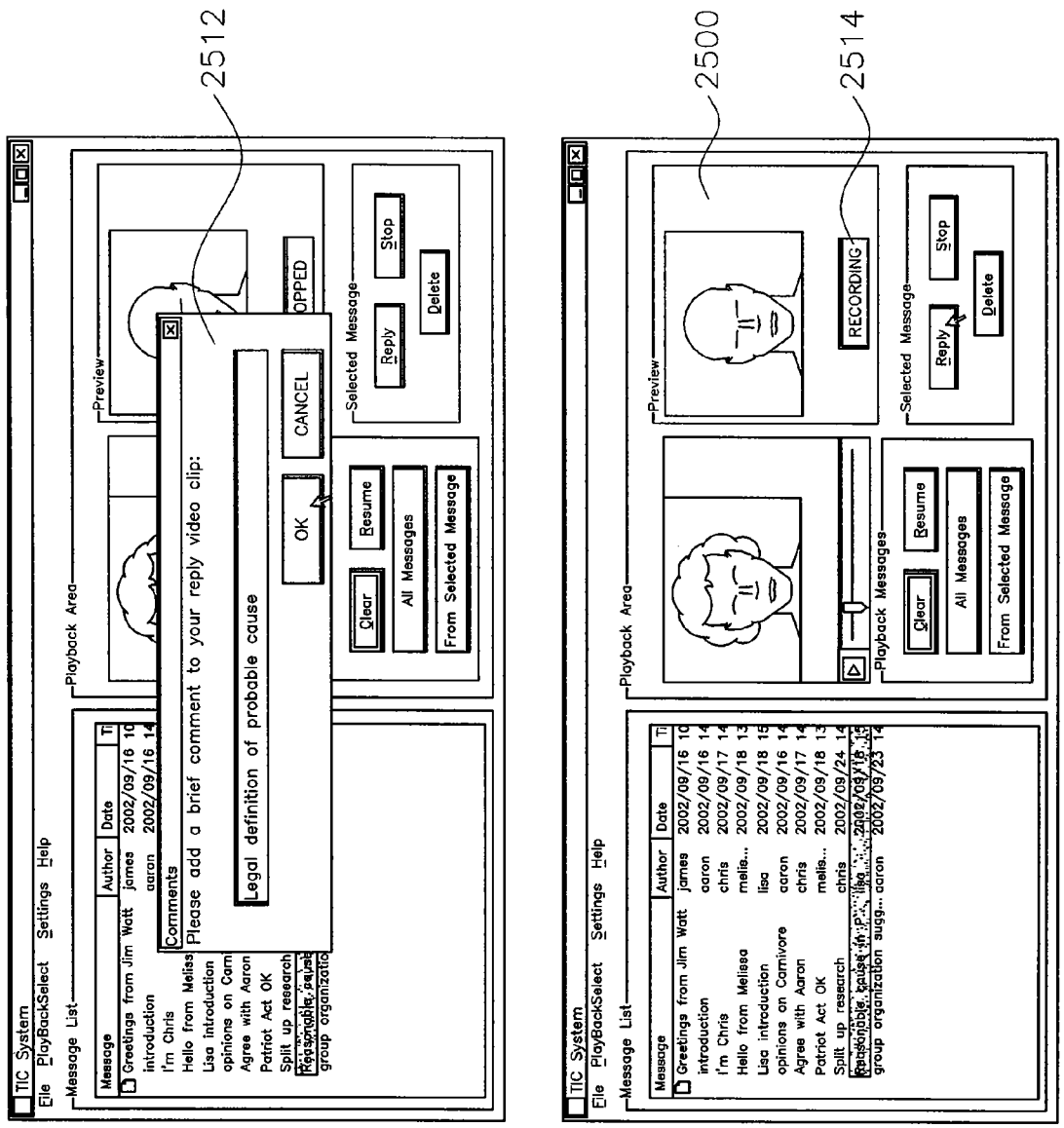
FIG. 28 is another illustration of a screen and an interface of a workstation in accordance with an exemplary embodiment of the invention.
FIG. 29 is another illustration of a screen and an interface of a workstation in accordance with an exemplary embodiment of the invention.

Referring to FIG. 27, the user can post a reply to any message by selecting it and then clicking on the "Reply" button 2510 in the interface area 2500. In the example shown in FIG. 27, the user has clicked on the message from lisa dated Sep. 18, 2002 and has clicked on the Reply button. Referring to FIG. 28, by clicking on the Reply button, the user is asked to supply an identifying comment that will be associated with the reply. The identifying comment may be entered in window 2512. The identifying comment will later be displayed in the message column to identify the message. After the identifying comment is entered, recording begins as indicated by the "Recording" message in window 2514 of interface 2500. At that point, the user speaks to record the verbal entry. The audio and video portion of the message is recorded by the workstation.

Referring to FIG. 30, the user's comments continue to be recorded until "Stop" button 2516 in interface 2500 is clicked upon. When the "Stop" button is clicked, the message by james dated Nov. 28, 2003 is added to column 2312. The comment has been added to the message list in the proper pseudo-chronological order as a reply to a previously posted message. To add a message at the end of the discussion, the user would reply to the last entry in the message list. If this workstation is on-line, the workstation informs the server that a new message from this user is available and the server and workstation resynchronize their DSOB and AID files, with associated A/V messages.

Figure 31:
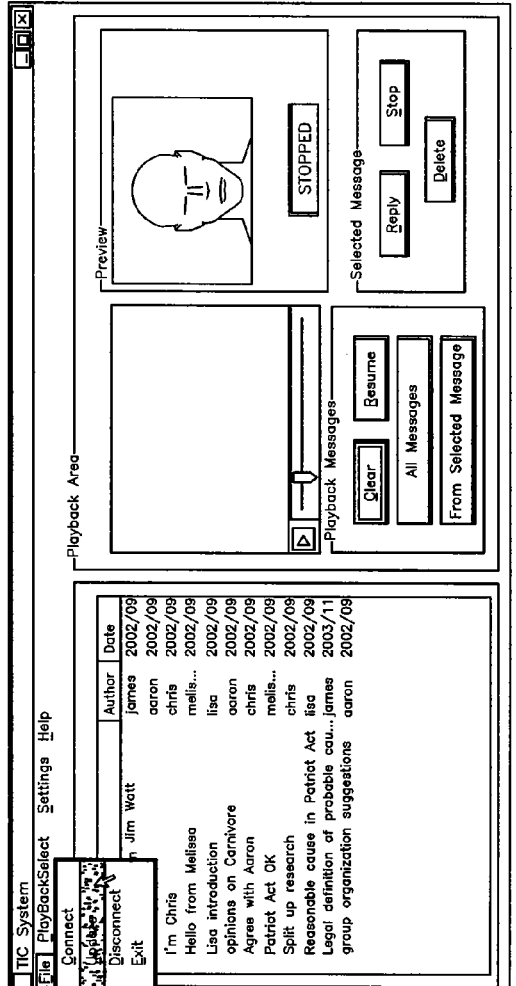
FIG. 31 is another illustration of a screen and an interface of a workstation in accordance with an exemplary embodiment of the invention.

Referring to FIG. 31, the user can manually request an update of the discussion structure. The drop down box 2302 of the File icon 2301 contains an entry for "Update." By clicking on the "Update" message, the same synchronization process is initiated and makes available any messages that were recently posted by other workstations and saved by the server in its master archive.

Figure 32:
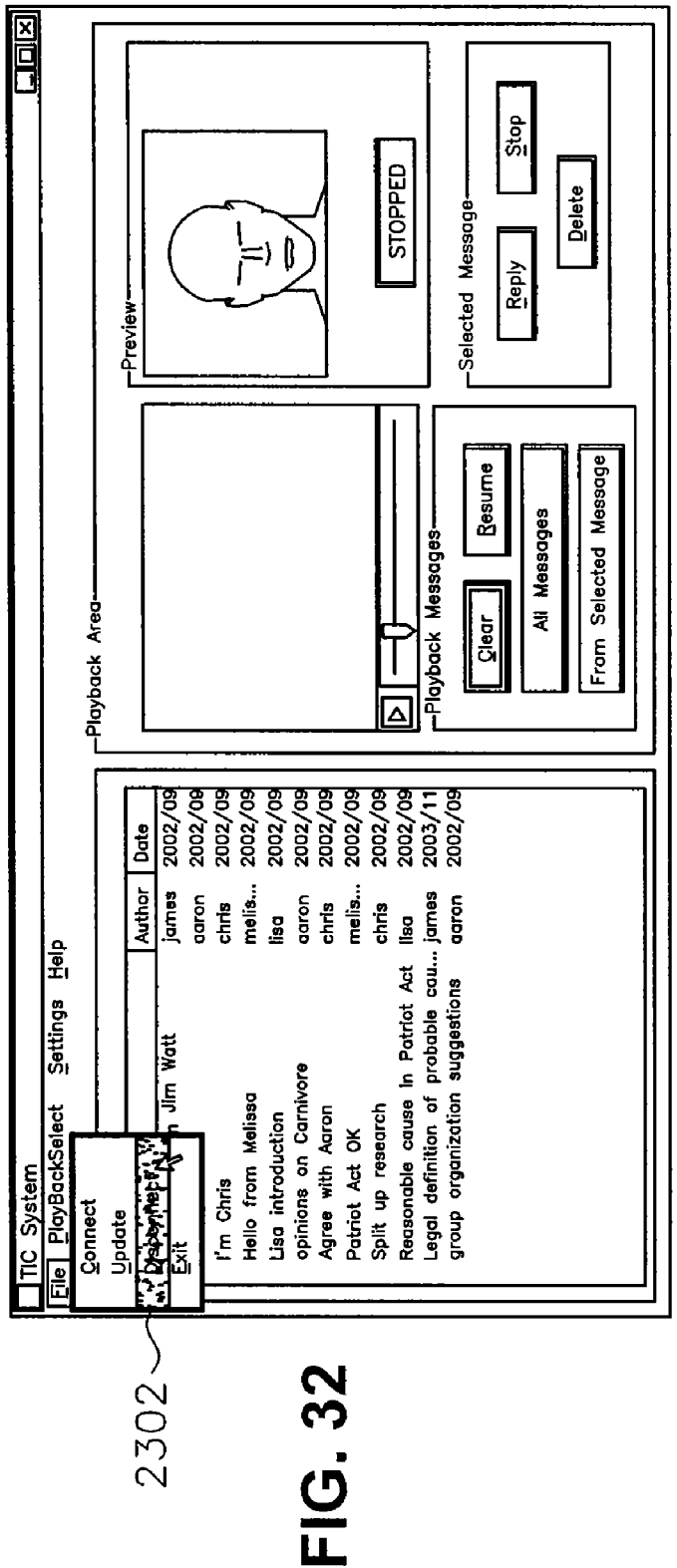
FIG. 32 is another illustration of a screen and an interface of a workstation in accordance with an exemplary embodiment of the invention.

Referring to FIG. 32, at the end of the session, the user can disconnect by clicking on the "Disconnect" message in drop down box 2302. This operation initiates another synchronization of the server and the workstation. If the user does not want to wait for such a synchronization, the user can use the "Exit" message in drop-down box 2302. Although the discussion stored at the workstation may be out-of-date (that is, out of synchrony) with the server, the synchronization will be completed the next time the user connects (logs on) to the server as part of the collaboration discussion.

What is claimed:

1. A method of modifying on a server an order of audio/video messages created by respective users at respective workstations, the method comprising:
    (a) creating a first audio/video message on a first workstation at a first time;
    (b) transferring a duplicate of the created first audio/video message to the server;
    (c) storing the duplicate of the created first audio/video message on the server;
    (d) creating at least a second audio/video message on a second workstation at a second time later than the first time;
    (e) transferring a duplicate of the created at least second audio/video message to the server;
    (f) placing the duplicate of the created at least second audio/video message on the server in a temporally independent pseudo-chronology relative to the duplicate of the created first audio/video message, a position of the duplicate of the created at least second audio/video message in the pseudo-chronology being determined by a user of the second workstation; and
    (g) storing on the server the duplicate of the created first audio/video message and the duplicate of the created at least second audio/video message in the temporally independent pseudo-chronology.

2. The method of claim 1, further comprising
    (h) creating a plurality of additional respective audio/video messages on the first workstation or on the second workstation or on respective additional workstations at respective times later than at least the first time;
    (i) transferring a copy of selected ones of the plurality of additional respective audio/video messages to the server;
    (j) placing the transferred selected additional respective audio/video messages in at least a second temporally independent pseudo-chronology relative to the first audio/video message and the duplicate of the created at least second audio/video message determined by respective users of the first workstation or of the second workstation or of the respective additional workstations; and
    (k) storing on the server the first audio/video message, the duplicate of the created at least second audio/video message, and the selected additional respective audio/video messages in the at least second temporally independent pseudo-chronology.

3. The method of claim 1, wherein transferring a duplicate of the created first audio/video message to the server is responsive to a connection between the first workstation and the server.

4. The method of claim 1, wherein transferring a duplicate of the created at least second audio/video message to the server is responsive to a connection between the second workstation and the server.

5. The method of claim 1, wherein the user of the second workstation is a creator of the at least second audio/video message.

6. The method of claim 1, further comprising:
    (h) creating at least a third audio/video message on one of the first workstation, the second workstation, or a third workstation at a third time, later than at least the first time;
    (i) transferring a copy of the at least third audio/video message to the server;
    (j) placing the at least third audio/video message on the server in a second temporally independent pseudo-chronology relative to the first audio/video message and the duplicate of the created at least second audio/video message determined by a user of the third workstation; and
    (k) storing on the server the first audio/video message, the duplicate of the created at least second audio/video message, and the at least third audio/video message in the second temporally independent pseudo-chronology.

7. A method of modifying a sequence of audio/video messages stored on a workstation, the method comprising:
(a) creating on the workstation at a first time a first audio/video message;
(b) storing the first audio/video message on the workstation;
(c) creating on the workstation at a second time later than the first time at least a second audio/video message;
(d) placing the at least second audio/video message on the workstation in a temporally independent pseudo-chronology relative to the first audio/video message, a position of the at least second audio/video message in the pseudo-chronology being determined by a user of the workstation; and
(e) storing the first audio/video message and the at least second audio/video message on the workstation in the temporally independent pseudo-chronology.

8. The method of claim 7, wherein the placing of the at least second audio/video message is performed concurrently with its creation.

9. The method of claim 7, further comprising:
(f) creating on the workstation a plurality of additional respective audio/video messages at respective times later than the first time;
(g) placing each additional respective audio/video message on the workstation in a respective temporally independent pseudo-chronology relative to the first audio/video message and the second audio/video message determined by the user of the workstation;
(h) storing on the workstation each respective temporally independent pseudo-chronology of audio/video messages as each respective temporally independent pseudo-chronology is created; and
(i) replacing an earlier respective temporally independent pseudo-chronology with a later respective temporally independent pseudo-chronology selected by the user of the workstation.

10. The method of claim 9, wherein the placing of each additional respective audio/video message is performed concurrently with its respective creation.

11. The method of claim 9, wherein the replacing of an earlier respective temporally independent pseudo-chronology with a later respective temporally independent pseudo-chronology is performed concurrently with the storing on the workstation of each respective temporally independent pseudo-chronology.

12. The method of claim 7, wherein the user of the workstation is a creator of the at least second audio/video message.

13. A method of modifying a sequence of audio/video messages stored on a workstation, the method comprising:
(a) receiving on the workstation at a first time at least one audio/video message from a server, the at least one audio/video message being a duplicate of an audio/video message created on a second workstation;
(b) creating on the workstation at a second time later than the first time at least a second audio/video message;
(c) placing the at least second audio/video message on the workstation in a temporally independent pseudo-chronology relative to the at least first audio/video message, a position of the at least second audio/video message in the pseudo-chronology being determined by a user of the workstation; and
(d) storing the at least one audio/video message and the at least second audio/video message on the workstation in the temporally independent pseudo-chronology.

14. The method of claim 13, wherein the placing of the at least second audio/video message is performed concurrently with its creation.

15. A method of modifying a sequence of audio/video messages stored on a workstation, the method comprising:
(a) receiving on the workstation at a first time a plurality of audio/video messages in a first chronology from a server, each of the plurality of audio/video messages being respective duplicates of audio/video messages created at respective other workstations;
(b) creating on the workstation at a second time later than the first time at least an additional audio/video message;
(c) placing the at least additional audio/video message on the workstation in a sequence relative to the plurality of audio/video messages, a position of the at least additional audio/video message in the sequence being determined by a user of the workstation to form a second temporally independent pseudo-chronology; and
(d) storing on the workstation the second temporally independent pseudo-chronology of audio/video messages formed in (c).

16. The method of claim 15, wherein the placing of the at least second audio/video message is performed concurrently with its creation.

17. A method of modifying a sequence of audio/video messages stored on a workstation, the method comprising:
(a) creating on the workstation at a first time a first audio/video message;
(b) storing the first audio/video message on the workstation;
(c) creating on the workstation at a second time later than the first time at least a second audio/video message;
(d) placing the at least second audio/video message on the workstation in a temporally independent pseudo-chronology relative to the first audio/video message, the temporally independent pseudo-chronology being determined when the at least second audio/video message is placed on the workstation; and
(e) storing the first audio/video message and the at least second audio/video message on the workstation in the temporally independent pseudo-chronology.

* * * * *

UNITED STATES PATENT AND TRADEMARK OFFICE
CERTIFICATE OF CORRECTION

| | |
|---|---|
| PATENT NO. | : 7,613,773 B2 |
| APPLICATION NO. | : 10/750605 |
| DATED | : November 3, 2009 |
| INVENTOR(S) | : James H. Watt |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this

Nineteenth Day of October, 2010

David J. Kappos
*Director of the United States Patent and Trademark Office*